United States Patent [19]
Cahill et al.

[11] Patent Number: 5,917,965
[45] Date of Patent: Jun. 29, 1999

[54] METHOD AND APPARATUS FOR STORING IMAGES OF DOCUMENTS HAVING MAGNETIC INK CODE LINE

[75] Inventors: Thomas Cahill, Newton; John J. McMonagle, Bayonne, both of N.J.; Richard H. Sferra, Plainview, N.Y.; Glenn Levine, Ossining, N.Y.; Saul Goldfisher, Brooklyn, N.Y.; Philip Wilson, Brooklyn, N.Y.

[73] Assignee: The Chase Manhattan Bank, N.A.

[21] Appl. No.: 08/435,748

[22] Filed: May 5, 1995

Related U.S. Application Data

[62] Division of application No. 08/342,265, Nov. 18, 1994.
[51] Int. Cl.⁶ ........................... G06K 9/54
[52] U.S. Cl. ........................... 382/305
[58] Field of Search ............... 382/305, 137, 382/138, 139, 140, 311

[56] References Cited

U.S. PATENT DOCUMENTS

| | | | |
|---|---|---|---|
| 4,315,246 | 2/1982 | Milford | 382/310 |
| 4,722,444 | 2/1988 | Murray et al. | 382/140 |
| 4,821,332 | 4/1989 | Durham | 382/140 |
| 4,876,735 | 10/1989 | Martin et al. | 382/310 |
| 4,914,709 | 4/1990 | Rudak | 382/311 |
| 5,040,227 | 8/1991 | Lyke et al. | 382/138 |
| 5,151,948 | 9/1992 | Lyke et al. | 382/311 |
| 5,161,214 | 11/1992 | Addink et al. | |
| 5,170,466 | 12/1992 | Rogan et al. | |
| 5,187,750 | 2/1993 | Behera | 382/7 |

(List continued on next page.)

FOREIGN PATENT DOCUMENTS

| | | |
|---|---|---|
| 0207468 | 1/1987 | European Pat. Off. ........ G06F 15/40 |
| 0573922 | 12/1993 | European Pat. Off. |
| 1487507 | 10/1977 | United Kingdom . |
| 2244583 | 4/1991 | United Kingdom . |
| 8605610 | 9/1986 | WIPO . |

OTHER PUBLICATIONS

Dialog File 636, Acc # 01463826 "Bank Get Big Response to Images Statements", *Electronic Imaging Report*, May 6, 1992, vol. 1, No. 9 (3 pages).

Dialog File 198, Acc # 06397449: "NCR's ATM captures images at the point of deposit", Financial Services Report, Jan 20, 1993 v. 10 n.2 p. 8 (2 pages).

Dialog File 15, Acc # 00806174: "Banks Turn Imaging Into Speedy New Delivery Products", D.A. Arnette Corp Cashflow, Jan. 1994, v. 15, n.1, pp. 12–13 (3 pages).

(List continued on next page.)

*Primary Examiner*—Yon J. Couso
*Attorney, Agent, or Firm*—Ostrolenk, Faber, Gerb & Soffen, LLP

[57] ABSTRACT

A method and apparatus for storing and retrieving images of documents, e.g. checks. The method comprises placing a plurality of documents in a document imaging machine and forming an electronic image of each document, storing each electronic image in an electronic storage device, providing at least one user interface device in communication on a communication link with the electronic storage device, placing a request for at least one document image on the user interface device, transmitting the request by the communication link to the electronic storage device, searching the electronic storage device for the requested electronic image of the document, retrieving the at least one electronic image or providing an indication that the image was not found, storing the electronic image, if found, in an electronic file, for transmission to the user interface device at user option, providing the electronic image to the user interface device at command of a user at the user interface device for storage at the user interface device and displaying the requested electronic image on a display of the user interface device. Preferably, the electronic, images are stored with embedded identifying information in a TIFF® (trademark of Aldus Corp.) file format and the check images can be displayed on a display device which permits the user to view both sides of the checks simultaneously and perform functions such as zooming and rotation of the images.

42 Claims, 39 Drawing Sheets

U.S. PATENT DOCUMENTS

| | | | |
|---|---|---|---|
| 5,193,121 | 3/1993 | Elischer et al. | 382/311 |
| 5,208,869 | 5/1993 | Holt | 382/138 |
| 5,257,323 | 10/1993 | Melen et al. | 382/311 |
| 5,274,567 | 12/1993 | Kallin et al. | 364/478.01 |
| 5,287,497 | 2/1994 | Behera | 395/600 |
| 5,301,350 | 4/1994 | Rogan et al. . | |
| 5,321,238 | 6/1994 | Kamata et al. | 235/379 |
| 5,321,816 | 6/1994 | Rogan et al. . | |
| 5,321,831 | 6/1994 | Hirose | 395/600 |
| 5,325,443 | 6/1994 | Beatty et al. | 382/152 |
| 5,359,667 | 10/1994 | Borowski et al. | 382/138 |
| 5,444,794 | 8/1995 | Uhland, Sr. | 382/137 |
| 5,455,875 | 10/1995 | Chevion et al. | 382/311 |
| 5,495,929 | 3/1996 | Batalianets et al. | 382/137 |
| 5,506,691 | 4/1996 | Bedner et al. | 382/137 |
| 5,519,786 | 5/1996 | Courtney et al. | 382/311 |
| 5,526,447 | 6/1996 | Shepard | 382/311 |
| 5,530,773 | 6/1996 | Thompson | 382/138 |
| 5,550,932 | 8/1996 | Blaylock et al. | 382/139 |
| 5,602,936 | 2/1997 | Green et al. . | |
| 5,768,446 | 6/1998 | Reasoner, Jr. et al. | 382/304 |

OTHER PUBLICATIONS

Dialog File 15, Acc # 00897187: "Why Digitization Means Dollars", B. Wells, *Corporate Cashflow*, Aug. 1994, v. 15, n. 9, pp. 30–32 (5 pages).

FIG. 10

Select/Display Check Images

| Rec No | Account No. | Check No. | Amount | User Ref No | Status | Requested | Received |
|---|---|---|---|---|---|---|---|
| 1 | 9104003109 | 20788388 | $717.57 | | RECEIVED | 09/09/93 | 09/10/93 |
| 2 | 9104003109 | 21315565 | $527.26 | | RECEIVED | 09/09/93 | 09/10/93 |
| 3 | 9104003109 | 21318253 | $1,096.89 | | RECEIVED | 09/09/93 | 09/10/93 |
| 4 | 9104003109 | 21336413 | $772.94 | | RECEIVED | 09/09/93 | 09/10/93 |
| 5 | 9104003109 | 21349755 | $257.20 | | RECEIVED | 09/09/93 | 09/10/93 |

[Print] [Delete] [Report] [Cancel]

FIG. 11

Chase ImageStation – Request Items

Page: 1     Read 9   Selected 4   Total 9   % 100     Page 1 of 1

461

Chase ImageStation
Items To Be Requested

| Account No. | Check No. | Amount | User Ref No. | Service | Date |
|---|---|---|---|---|---|
| 9104020632 | 101 |  | for Peter | Same Day | 11/17/94 |
| 9104020632 | 445 | 45,434 00 | 543453 | Overnight | 11/17/94 |
| 9104020632 | 5353 | 434,534 00 | ablanda | Same Day | 11/17/94 |
| 9104020632 | 5656 | 4,555 00 | testsfddfif | Same Day | 11/17/94 |

Total Items To Be Requested: 4

Enter Check Request

| Account Number | Check Number | Amount | User Ref No. | Service |
|---|---|---|---|---|
| 9104020632 ⇩ | 101 | | for Peter | Same Day ⇩ |

465 Account No./Check No.  Amount

| Rec No | Account No. | Check No. | Amount | Ref No. | Date | Service |
|---|---|---|---|---|---|---|
| 1 | 9104020632 | 0000000101 | | for Peter | 11/17/94 | Same Day |
| 2 | 9104020632 | 0000000445 | $45,434.00 | 543453 | 11/17/94 | Overnight |
| 3 | 9104020632 | 0000005353 | $434,534.00 | ablanda | 11/17/94 | Same Day |
| 4 | 9104020632 | 0000005656 | $4,555.00 | testsfddfif | 11/17/94 | Same Day |

[Clear Entry Fields] [Update Item] [Delete] [Report] [OK]

400  463  460  464

Setup Options

Workstation Information

Company ID: Chase

User ID: user

Workstation ID: 0000000

Chase Archive Phone No.: 1.315.433-2425

Word Processing/Template Information

Word Processor: C:\WINWORD\winword.exe

Installation and Document Directory: C:\IMGSTAT\

Image Directory:

No. of Days to Retain an Image: 31

Default State: NY

[OK] [Cancel]

FIG. 21

Image Database Maintenance – 5 Checks

The following checks are older than 31 days and may be purged from the system. They may be deleted one by one or all at once.

Account No./Check No.   Amount   Date

| Rec No | Account No. | Check No. | Amount | Ref No. | Service | Requested | R |
|---|---|---|---|---|---|---|---|
| 1 | 9104003109 | 20788388 | $717.57 | | Overnight | 09/09/93 | 0 |
| 2 | 9104003109 | 21315565 | $527.26 | | Overnight | 09/09/93 | 0 |
| 3 | 9104003109 | 21318253 | $1,096.89 | | Overnight | 09/09/93 | 0 |
| 4 | 9104003109 | 21336413 | $772.94 | | Overnight | 09/09/93 | 0 |
| 5 | 9104003109 | 21349755 | $257.20 | | Overnight | 09/09/93 | 0 |

Free space on Drive C: 1,224,704 Bytes
You have space for 61 Additional Check images Delete    Delete All    OK

FIG. 23

Customer Information Screen

| Dear ⇩ | Mr. ⇩ | First Name | Last Name |

Address Line 1

Address Line 2

| City | NY ⇩ | Zip Code |

OK    Cancel

FIG. 24

November 17, 1994
Chase Manhattan Bank, N.A.
2 CMP – 12th Floor
New York, NY 10081
Mr. ------
Chase Manhattan Bank
4 Chase Metrotech Center
Brooklyn, Ny 11245
Dear sir
Here is the copy of the check you requested.  Please call us if need any additional information.
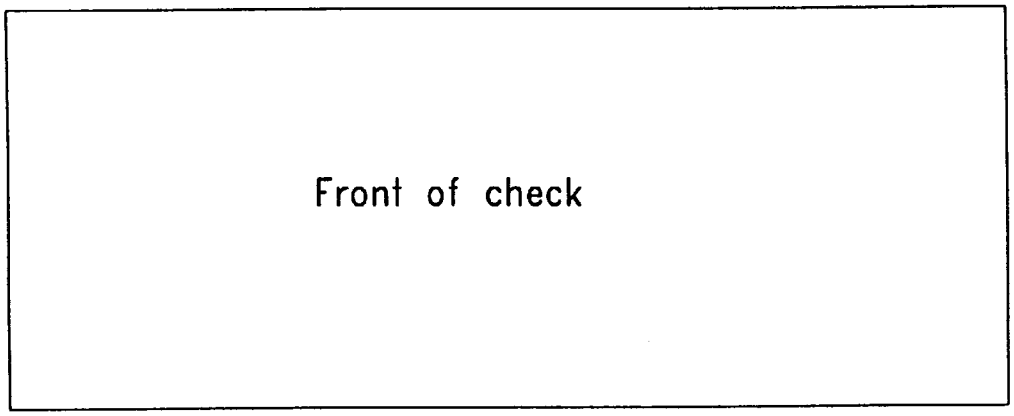
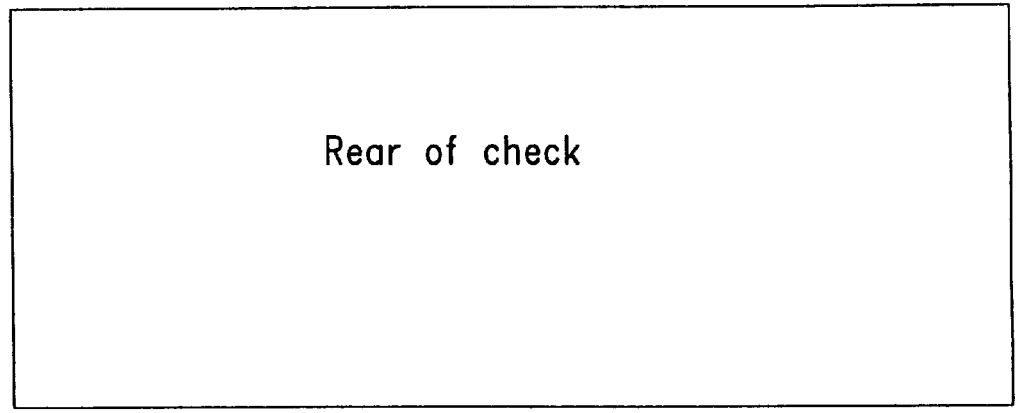
Sincerely,
Ann White, 2VP
Relationship Administrator
Chase Manhattan Bank, N.A.
FIG. 25

November 17, 1994

Chase Manhattan Bank, N.A.
2 CMP — 12th Floor
New York, NY 10081

[Mr. ------]
[Chase Manhattan Bank]
[4 Chase Metrotech Center]
[Brooklyn, Ny 11245]

[Dear sir]

Here is the copy of the check you requested. Please call us if need any additional information.

Sincerely,

Ann White, 2VP
Relationship Administrator
Chase Manhattan Bank, N.A.

METHOD AND APPARATUS FOR STORING IMAGES OF DOCUMENTS HAVING MAGNETIC INK CODE LINE

This is a division of application Ser. No. 08/342,265, filed Nov. 18, 1994 now pending.

BACKGROUND OF THE INVENTION

With the present day increase in the number of checks and other financial instruments processed by banking institutions, there is an increased need to automate the requesting, delivery and display of check and other financial instrument copies. This invention accordingly relates to an electronic system for storing and retrieving electronic images of checks and other financial instruments. The system of the invention is particularly adapted to the storage and retrieval of check images and the images of other commercial paper instruments, but could also be employed to store and retrieve images of other documents.

The financial services industry has provided for more than a century the ability for its customers to write checks and similar instruments. In current practice a payor or customer writes a check representing an amount to be deducted from its account. The check is given to the payee. Checks are normally presented for payment by the payee to the payee's banking institution (the "payee bank"). In turn, the payee bank presents the check to the payor bank. The payor bank then pays the payee bank, and deducts the check amount from the payor's account, against which the check is drawn. The check is then marked "PAID" and is often made available in some form (e.g. the original check or a photocopy) to the customer/payor as a record of the payment.

For several decades now the U.S. Government has also required that financial institutions maintain a seven year library (e.g. on microfilm, microfiche or original hard copy) of all checks deposited and/or paid from the institution's accounts. Because the payor bank is required to maintain this library, it makes and archives a copy of both sides of the "PAID" check prior to forwarding the original instrument, or a copy of it, to the customer.

Accordingly, payor banks must maintain millions upon millions of copies of checks in their files. For example, if a single large customer/payor writes 2,500 checks each business day, seven years of records will comprise over 4,500,000 checks for that customer alone. Thus, banks fill tremendous storage spaces with copies of checks.

At some future date, the payor may be required to produce a copy of a check as proof of payment. This often requires that the payor retrieve the bank copy of the instrument from the payor bank's archive. Certain financial institution customers, particularly those that write large numbers of checks to the general public, often are required to produce check copies systematically. The situation is the following: the payor/customer writes a check, sends it to the payee and receives through its standard checking account reporting mechanism (e.g. statement) notification that the check has been paid. The payor/customer subsequently receives an inquiry or complaint from the payee stating that payment (i.e. the check) has not been received.

As proof of payment, the payor/customer must produce the original "PAID" check, or a front and back photocopy of the "PAID" check. From this record, it can determine who cashed it and where it was cashed. If the payee is in error, and has been paid, the payor will typically forward to the payee a correspondence enclosing a copy of the "PAID" check.

The actual number of requests to a payor bank for check copies based upon a payee claim that payment has not been received varies by the type of check. Some known example statistics are:

| Type of Check | Request/Checks Written |
|---|---|
| health insurance refunds | 1/2000 |
| personal income tax refunds | 1/200 |
| social security payments | 1/100 |
| welfare payments | 1/50. |

To accommodate these requests, financial institution customers often maintain their own extensive check libraries.

Often such customer-maintained check libraries are kept on microfilm, which can be made by the customer itself from the returned check or can be purchased directly from the financial institution. The financial institution's seven year library of check microfilm is often used as a backup source for check copies. In some cases, due to the cost of maintaining an archive, and fulfilling payee requests, the bank's seven-year library is the customer's primary source.

Furthermore, depending on the type of customer and account, the institution is often subpoenaed by the government to produce photocopies or originals from its seven year library.

Whether the original checks are kept or they are reduced to microfilm, and regardless of whether it is maintained by the payor bank or the customer, it is readily understood that there are many costs associated with maintaining a check archive and retrieving check copies upon request. For example, the production and manipulation of microfilm libraries is a labor intensive process and the quality of the photocopies produced is often low. Although storing a high resolution digital image of the front and rear surface of a check could be used as a potential replacement for microfilm, the cost of storing all checks in such format, and the difficulty inherent in locating and retrieving them, made this storage media impracticable in the past.

To fulfill its customers' requests or comply with subpoenas, countless man-hours of searching are required to locate copies of the requested instruments. Due to the immense volume of stored information, the average turn-around time—the time elapsed from when the request is made until the copy is received—for fulfilling such requests can vary from a minimum of 24 hours to one to two weeks or more. Importantly, if a check copy cannot be found or its quality is too poor to reconcile the inquiry, the payor may be required to write the check again and send it to the recipient—incurring the expense of double payment despite the expense of maintaining a check library, and searching for a check.

Further, to facilitate processing of checks, the banking industry has, for many years, used a Magnetic Ink Character Recognition (MICR) line on each check. The MICR line of a check is a series of alpha-numeric digits encoded on a check in magnetic ink. The MICR line is also optically readable. A MICR line is found along the bottom of most checks. The encoded information in the MICR line usually includes the account number and check number. Where the check writer (or some intermediate in the check handling process) chooses, the encoded information in the MICR line also includes the amount of the check. Frequently, a large company that prints its own checks may encode the check amount in the MICR line. Normally, when a check is processed, the information contained in the MICR line is scanned, interpreted, and becomes part of the bank's electronic record of the check.

While previously many banking institutions were forced to maintain large staffs of people to handle manually the time-consuming and tedious task of processing check copy requests, it is desirable to provide a system whereby a customer of the banking institution can request, retrieve, and display copies of checks and, preferably, generate correspondence with a copy of a check, i.e. a check image, all without bank staff involvement. Thus, the present application is directed to an automated system which retains images of the front and back of each check and data associated with that check. The associated data includes the account number, the check number and the check amount as well as image data. The system allows a user to request, retrieve and display check copies with turnaround time much faster than in the prior art.

SUMMARY OF THE INVENTION

There are obvious inefficiencies in the current methods of handling customer service inquiries about checks and in the present costly and labor intensive paper and microfilm archives required to support such inquiries.

The invention provides a new financial services product and computer system. In particular, it is an object of the present invention to provide a new method and apparatus for providing traditional features of bank services related to check microfilm and commercial paper archives in electronic form.

It is another object of the invention to provide a new method and apparatus for capturing, processing and storing check images for on-line access.

It is yet another object of the invention to provide a new method and apparatus for communication for the purpose of requesting and receiving check images.

It is yet a further object of the invention to provide a new method and apparatus for locally storing, displaying and utilizing check images in industry standard computer office automation environments.

It is yet a further object of the invention to provide an electronic check storage and retrieval system which eliminates the need to maintain costly and inefficient microfilm or paper check archives.

It is yet a further object of the present invention to provide a document storage and retrieval system which is applicable to documents other than checks and commercial paper instruments.

It is yet still another object of the invention to provide a system which facilitates error correction in the MICR line of checks, and furthermore which facilitates such error correction in an efficient manner, requiring a small number of keystrokes or minimal operator interaction to accomplish such error correction.

It is furthermore an object of the invention to provide at the financial service customer's request, a system with the ability on a daily basis to scan a customer's paid checks at a resolution level superior to that available from traditional microfilm and photocopy methods and in excess of all readability requirements for the customer service investigation functions described above as well as other applications such as signature verification, check fraud evaluation, return item processing, etc.

It is another object of the invention to provide a system having the ability to index and store check images in a relational database supporting appropriate access and inquiry requirements.

It is furthermore an object of the invention to provide a system having the ability to create a permanent, reliable, legal and auditable store record of check images, superior to that available in the current system of microfilm, photocopy and paper records.

It is also an object of the invention to provide a system having the ability for the financial services institution customer or user to request access to images in an efficient, reliable and orderly way that allows for the maintenance of both electronic and permanent records of the inquiries for both management and audit control.

It is furthermore an object of the invention to provide a system allowing a requester user to transmit check copy requests to the financial institution and receive information back (e.g. the electronic check images) by means of a new method consistent with current telecommunications file transfer standards.

It is furthermore another object of the invention to provide a system having the ability to return electronic check images at the customer's request in the following ways:

a—by direct and immediate on-line transmission, b—by electronic batch request and batch return of files of check image requests and check images, c—by bulk transmission of image files according to standing orders (e.g. all return items, all items above $1,000, etc.)

d—by delivery on magnetic or other media such as magnetic tape or disk, e—by delivery on electronic optical or other media such as WORM disk, CD-ROM or magneto-optical disk, etc.

f—by all of the above ways of returning the image supported by an implementation of industry standard image formats with new features specifically designed to support the recipient's effective handling of individual electronic check images or arbitrarily large files of electronic check images.

It is yet still a further object of the invention to provide a system having the ability to display the received electronic images in a windowed graphical user interface consistent with industry standard office automation and computer workstation environments.

It is yet still another object of the invention to provide a system having one or more user workstations where a user has the ability to manipulate the displayed, received image in a manner required to support the objectives of the underlying check investigation applications (e.g. to enlarge, enhance, rotate, etc. the image).

It is yet still a further object of the invention to provide a system having a user workstation where the user can review and maintain the local database of check images within the constraints of the possibly limited local disk space available to industry standard office automation and computer workstation environments.

It is yet still a further object of the invention to provide a system having the ability to create reports and audit records of all check image related events at the requester workstation level.

It is yet still a further object of the invention to provide a system having the ability to accomplish all the above functions when the requester's workstation is part of an industry standard LAN environment and software and/or data and/or telecommunications support are executed at the LAN server level.

It is yet another object of the invention to provide a system having the ability to accomplish all the above functions (save the last mentioned) when the recipient wishes to originate and/or receive transmissions from a mainframe computer system.

As is evident from the above description of current check processing system, a highly sophisticated problem is presented when copies of hundreds or thousands of checks requested by a customer or customers need to be processed by a banking institution and the need arises to verify the check information. The system described herein provides a solution to this problem. For example, the inventive system can accomodate all the check image requests generated at today's largest check processing institutions on their peak days.

The invention provides a solution to this customer service problem which heretofore involved intensive manual processing. The invention provides an electronic document image storage and retrieval system including a customer service workstation that can request, retrieve, display, manipulate and print copies of documents, particularly checks, and furthermore create correspondence for a client incorporating copies of document images.

The system of the invention includes an electronic host archive storage and retrieval system for storing and retrieving copies of checks or check images. This host archive system is linked via a communications link, e.g., modems and telephone line, to one or more generally remotely located customer workstations.

For the purpose of this application, a customer is the customer of the banking institution and which utilizes a workstation according to the invention to request and retrieve copies of checks from the banking institution. For the purpose of this application, an operator, user or requester is the individual who operates a workstation according to the invention.

For the purpose of this application, a workstation or image station may be a standard desktop computer that utilizes a graphical user interface. Also, a workstation preferably has local magnetic disk storage or other storage, contained in the unit or is linked to a magnetic disk drive or other storage unit via a network communications device commonly referred to as a file server.

In the invention, use is made of multi-tasking and multi-windowing environments such as Microsoft Windows™ or IBM OS/2™ to provide a graphical interface for the system of the invention that the operator uses to interact with the retrieved check image copies.

According to the invention, the operator or customer can make requests by account number and check number for a specific check at the local workstation. The requests are stored locally until the operator is ready to forward the requests to the banking institution.

Once an operator is ready to forward the requests to the banking institution, the workstation will dial the host computer controlling the archive system at the banking institution. Once connected to the host computer, the host will prompt the operator or customer for a user-ID and password to initiate the file transfer. Once the ID and password are verified, the requests are translated into a file and transferred to the host archival system.

After a predetermined processing time to retrieve and sort the check images, the workstation operator can initiate a download or file transfer from the host archival system. The host system will transfer a front image and a separate back image for each check.

Each check image has the MICR line information embedded in the check image file for identification. The identification information contains the account number, the check number, amount and date of the check.

Once downloaded to local storage of the workstation, the system software resident at the workstation will read the data stored within each check image file to obtain the account number, check number and amount of the check. When check images are received at the local workstation, the system software will correlate the check request entry with the check images. The filename of the check in the local database as well as a status field will be updated so as to indicate that the item has been downloaded, processed and received from the host archive system.

Once all of the downloaded check images have been processed, they are available for review by the operator.

According to the invention, an operator can select a menu item to present a Select/Display screen at the workstation that lists alpha-numerically the downloaded checks and those requests for check download which are pending. On this Select/Display screen, an operator has the option to sort the check images by account number/check number, amount, a user reference number, status and date. Status indicates whether the item is Pending, Received or Exported. A pending item is a request that has been sent or uploaded to the host archive but not yet downloaded. A Received item is an item that has been downloaded to the workstation, processed and is ready for viewing. An Exported item is a check image that has been downloaded to the workstation but not requested. According to the invention, a customer has an option of indicating if it wants all check images sent to the workstation (exported) without the need to request each image specifically.

Preferably, according to the invention, an operator may click with a mouse or other pointer device to select an item indicated on a screen display of the workstation or select an item for viewing by using cursor arrow keys of a computer keyboard and striking the enter or return key. Once selected, the system will read the file names for the front and the back of the check images. The system of the invention preferably will read and display the front and back check images into a separate window for each check image. The separate windows for each front and back check image are referred to herein as a check-centric display interface. This check-centric display optimizes (i.e. minimizes) the amount of time a user would have to search for information on the check images.

According to the invention, the front of the check may be displayed in maximum width horizontally in the left window. The back of the check then may be displayed in the right window vertically and enlarged to display the endorsement section. The endorsement section of a check is the section where a payee would indicate its account number and signature or endorsement stamp. This feature saves the operator from rotating the check image vertically in order to read the endorsement. At this point, an operator has the option of manipulating the check image to enhance the readability of the information.

The system of the invention provides a toolbar or button zone, preferably as a screen icon, for each check display window. The operator may, for example, enlarge, reduce, rotate relative left, rotate relative right, invert the image absolute 180 degrees, and invert the colors of the image from black on white background to white on black background. The inverting of colors from black to white helps an operator read check endorsement stamps that federal and banking institutions use to indicate processing. Thus, an operator or customer may obtain information regarding where the check was presented for payment.

According to the invention, a facility to highlight a specific area of a check image has been provided for fast enlargement. This facility allows an operator to zero in on specific information and enlarge it so it is more readable to the human eye.

In addition to the toolbar or button zone, an operator may select the manipulation options from a menu zone that lists all the options in text rather than graphical representation. Furthermore, to expedite the selection process, the system will allow a user to select the manipulation options by clicking a mouse or other pointer device's button on any area of a check display window to display a pop-up list of the manipulation options in text.

In addition to the Select/Display screen to select a specific check, the system preferably has two navigation buttons located at the bottom of the screen. One button is a graphical representation of an arrow facing down to move forward through the local database of check images. Another button is a graphical representation of an arrow facing up to move backward in the local database of check images. Once the operator operates these navigation buttons, the system will automatically display next/previous check images in a default order (account number and check number) or any other order specified by the user. These navigation buttons allow an operator the ability to quickly review the downloaded check images. This is a significant improvement over manually handling physical paper checks.

A facility to store a customer account number is also provided by the invention. An operator can add or delete any corresponding account numbers that are supplied to and processed by the host archive system. This account number facility allows a customer to manage its accounts without the intervention of the banking institution. Further, the Select/Display screen will read this account number file to facilitate the fast selection of the specific account number from a graphical list box.

Further according to the invention, a database maintenance facility is provided to manage downloaded check images. The invention provides a configuration parameter to indicate when a check image should be listed in the database maintenance screen. This configuration parameter is used to indicate the threshold number of calendar days before a check image should be included in a database maintenance screen report. Each downloaded check image is stored locally at the workstation.

It is conceivable that at some point in time the check images available for downloading will exceed the amount of physical storage space available at the workstation. An operator can select the database maintenance option to purge or physically delete check images and the corresponding database record. An operator preferably has two options according to the invention: one is to select a check individually for deletion and the other is to delete all the check images and entries that appear in the database maintenance screen.

A facility to copy the front or back check image to a temporary storage area, e.g., a Microsoft Windows™ clipboard, is provided. The ability to share the image with other desktop applications improves the operator's ability to create correspondence or additional documentation in today's office computing architecture.

According to the invention, a facility to incorporate the check images into customer correspondence is preferably provided. An operator may select a document template that is created with an industry available word processing package. The document and check images are merged along with address information of the recipient (payee) to create a document that can be sent to the payee to confirm that the check was received by the payee and paid. An operator may print out the document to send to a payee via conventional mail delivery service such as the Postal Service. However, if the system software is installed on a workstation that supports outgoing fax services via modem communications, an operator may fax the correspondence directly to a payee's fax machine. This automated correspondence processing represents a significant improvement in the time it takes to prepare correspondence and send it to a payee.

The objects of the invention described above are achieved by a method for storing and retrieving images of documents comprising placing a plurality of documents in a document imaging machine and forming an electronic image of each document, storing each electronic image in an electronic storage device, providing at least one user interface device in communication on a communication link with the electronic storage device, placing a request for at least one document image on the user interface device, transmitting the request by the communication link to the electronic storage device, searching the electronic storage device for the requested electronic image of the document, retrieving the at least one electronic image or providing an indication that the image was not found, storing the electronic image, if found, in an electronic file, for transmission to the user interface device at user option, providing the electronic image to the user interface device at command of a user at the user interface device for storage at the user interface device and displaying the requested electronic image on a display of the user interface device.

The objects of the invention are furthermore achieved by apparatus for storing and retrieving images of documents comprising a document imaging machine for receiving a plurality of documents and forming an electronic image of each document, an electronic storage device for storing each electronic image, a user interface device in communication on a communication link with the electronic storage device, the user interface device having an input device for placing a request for at least one document image and for transmitting the request on the communication link to the electronic storage device, a computer for searching the electronic storage device for the requested electronic image of the document and for retrieving the at least one electronic image or providing an indication that the image was not found, an electronic file for storing the electronic image, if found, for transmission to the user interface device at user option, the computer adapted to provide the electronic image to the user interface device at command of a user at the user interface device for storage at the user interface device, and a display for displaying the requested electronic image at the user interface device.

According to the preferred embodiment of the method of the invention, the step of forming an electronic image comprises forming an electronic image of two sides of a two sided document.

Also according to the preferred embodiment, the step of storing each electronic image in an electronic storage device comprises storing the electronic image in a mass storage device.

Further according to the preferred embodiment, the step of storing in a mass storage device comprises storing each electronic image in an electronic optical storage device.

According to the preferred embodiment, the document comprises a check and the step of placing a request for a document image comprises entering an account number and a check number for the requested check.

Also according to the preferred embodiment, the step of placing a request for a document comprising a check further comprises entering an amount of the check.

According to the preferred embodiment, the step of placing a request for a document comprising a check further comprises entering a user defined reference field.

Furthermore, according to the preferred embodiment, the step of transmitting the request over the communication link comprises transmitting the request over a telephone communication link.

Also according to the preferred embodiment, the documents comprise checks each having a magnetic ink code line thereon, and the invention further comprises electronically reading and decoding the magnetic ink code line to form decoded magnetic ink coded data and the step of storing comprises merging the electronic image and the decoded magnetic ink coded data into a tagged image file format (TIFF® [a registered mark of Aldus Corp.]) file, with the decoded magnetic ink coded data stored in a tag field in the TIFF file, each check being associated with a TIFF file, and storing the TIFF file in the electronic storage device.

According to the preferred embodiment, the invention further comprises storing the TIFF file in a queue prior to transmitting the TIFF file to the electronic storage device.

Also according to the preferred embodiment, the invention further comprises forming a plurality of the TIFF files for respective checks and storing the plurality of TIFF files in the queue, grouping a plurality of the TIFF files into a binary large object (BLOB) and transmitting the BLOB to the electronic storage device.

According to the preferred embodiment, the invention further comprises forming a plurality of BLOBs and transmitting each BLOB to the electronic storage device.

In accordance with the preferred embodiment, the invention further comprises generating an index record for each of the pluralilty of TIFF files in the BLOB, and storing each index record in an index database.

According to the preferred embodiment of the invention, the step of generating an index record comprises generating the decoded magnetic ink coded data for each check and a BLOB pointer to the BLOB containing the image of a particular check.

In the preferred embodiment of the invention, the step of storing each electronic image in an electronic storage device comprises bundling a plurality of the images together in a grouping and storing the grouping as a unit in the electronic storage device, to increase the speed at which images can be stored in and retrieved from the electronic storage device.

According to the preferred embodiment of the invention, the step of searching the electronic storage device for the requested electronic image comprises searching the index database by using the account number and check number of the requested check, thereby determining the BLOB containing the image of the check, and using the determined BLOB pointer to find the check image in the electronic storage device.

According to the preferred embodiment, the invention further comprises the step of checking for errors in the decoded magnetic ink coded data.

In the preferred embodiment, the invention further comprises the step of correcting the decoded magnetic ink coded data comprising determining if the decoded data requires correction, assigning a specified character to characters requiring correction in the decoded data, displaying the uncorrected decoded data on a display device with the specified character replacing characters requiring correction, entering data to replace the specified characters, and replacing the specified characters with the entered data.

According to the preferred embodiment, the invention further comprises checking if the number of characters in the data entered is equal to the number of specified characters and if so replacing only the specified characters with the entered data; if the number of characters in the data entered is less than the number of specified characters, replacing all the decoded data with the entered data; and if the number of characters in the entered data is greater than the decoded data, generating a warning message to confirm that the entered data is longer than the decoded data prior to replacing the decoded data with the entered data.

According to the preferred embodiment of the invention, the step of displaying the requested document image comprises displaying a screen identifying at least one document, and further comprising selecting at least one document for display on the display.

In the preferred embodiment of the invention, the document is a check having two sides, and wherein the step of displaying the requested electronic image comprises displaying an image of each side of the check.

Still further in accordance with the preferred embodiment of the invention, the check has a front and a back side and the step of displaying comprises displaying the front side of the check in a first screen window in an initial horizontal format for normal reading by a user and displaying the back side of the check having an endorsement thereon in a second screen window so that the endorsement is disposed in an initial format horizontally for normal reading by a user.

According to the preferred embodiment of the invention, the first and second screen windows are displayed simultaneously.

According to the preferred embodiment, the invention further comprises providing user operated controls to allow selected ones of enlarging and reducing the size of the displayed images of the front and back sides of a check, rotating the images to improve readability and scrolling through the images.

According to the preferred embodiment, the invention further comprises the step of providing a word processing function for the creation of a secondary document and loading the requested document image into the secondary document.

According to the preferred embodiment, the invention further comprises providing the user defined reference field back to the user at the user interface device to enable sorting of check images according to the user reference field.

According to the preferred embodiment, the invention further comprises sorting the check images provided to the user interface device from the electronic storage device by at least one of account number, check number or amount.

In accordance with the preferred embodiment, the invention further comprises storing request data for each requested check at a local database at the user interface device, and the step of displaying the requested electronic image comprises selecting an image for display, comparing the request data for the requested check to the electronic file supplied from the electronic storage device and displaying the electronic image whose request record coincides with the data representing the requested check.

Thus the invention provides solutions to the problems of customer service regarding processing of requests for copies of checks and delivering copies of checks to customers by providing an all electronic check image requesting, retrieval and delivery system.

Other features and advantages of the present invention will become apparent from the following detailed description of the invention.

BRIEF DESCRIPTION OF THE DRAWING(S)

The invention will now be described in greater detail in the following detailed description with reference to the drawings in which:

FIG. 10 shows the Enter Check Request screen displayed by selecting the Enter Check Request option of the menu of FIG. 7;

FIG. 11 shows the Select/Display Check Images screen containing a plurality of check items;

FIG. 12 shows the format of a screen report that formats and displays checks requested by the user;

FIG. 16 is an example of the Enter Check Request screen after entry of four checks;

FIG. 21 shows the Setup Options screen;

FIG. 23 shows the Image File Maintenance screen;

FIG. 24 shows the Customer Information screen employed in entering document header data to be inserted into documents incorporating check images that are sent to a client;

FIG. 25 shows a document selection dialog screen for allowing the selection of a particular letter template;

DETAILED DESCRIPTION OF THE INVENTION

1. Introduction

Figure 1:
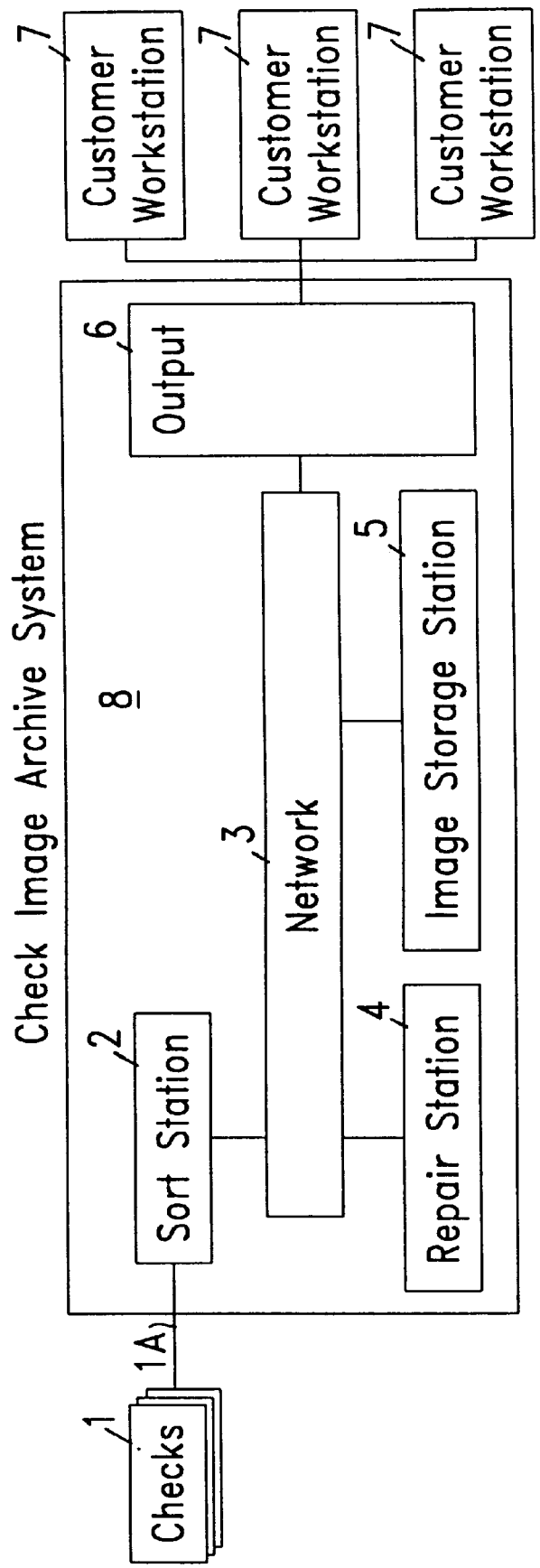
FIG. 1 is a block diagram which gives an overview of the electronic check image storage and retrieval system including a check image archive (host) system and a plurality of customer service workstations or check image stations.

Referring now to the drawings wherein like numerals indicate like elements, FIG. 1 is a block diagram of the overall electronic check image storage and retrieval system according to the present invention. The system comprises a check image archive system 8, also known and referred to herein as the host system 8, and at least one customer workstation 7, also known and referred to herein as an image station 7. Preferably, there are a plurality of workstations 7. The workstations 7 may be remotely located from the host system 8 and also from each other.

The host system 8 includes at least one sort station 2, which preferably is a check imaging and sorting machine and a controller, as known in the art. Sort station 2 receives checks 1, generates digital images of the checks, decodes the MICR line of each check and sorts them to one of a plurality of pockets, to be described in more detail below. The sort station 2 is coupled to a host system communication link or network 3 such as a LAN, WAN or bus, as known in the art. Also coupled to the network 3 are at least one repair station 4, an image storage station 5 and an output station 6. The repair station 4 is provided to permit checks which have not been normally processed to be repaired, i.e., to have any errors in the decoded MICR corrected, as explained more fully below. The image storage station 5 includes a digital mass storage device, to be described in greater detail below, which stores digital images of the checks generated by the sort station 2 as well as identifying information to enable the images to be retrieved. The output station 6 controls communication and transmissions between the host system 8 and the customer workstations 7 and provides data comprising the digital images of the checks and check identifying data to the customer work stations 7 on request. Additionally, the output station 6 provides other output, including, for example, tape, CD-ROM and/or WORM output of electronic check images for the bulk export of check images. These components of the host system 8 will be described in more detail below. As will be evident, more than one sort station 2 can be provided to improve throughput. Similarly, a plurality of repair stations 4, image storage stations 5 and output stations 6 can also be provided.

Figure 2:
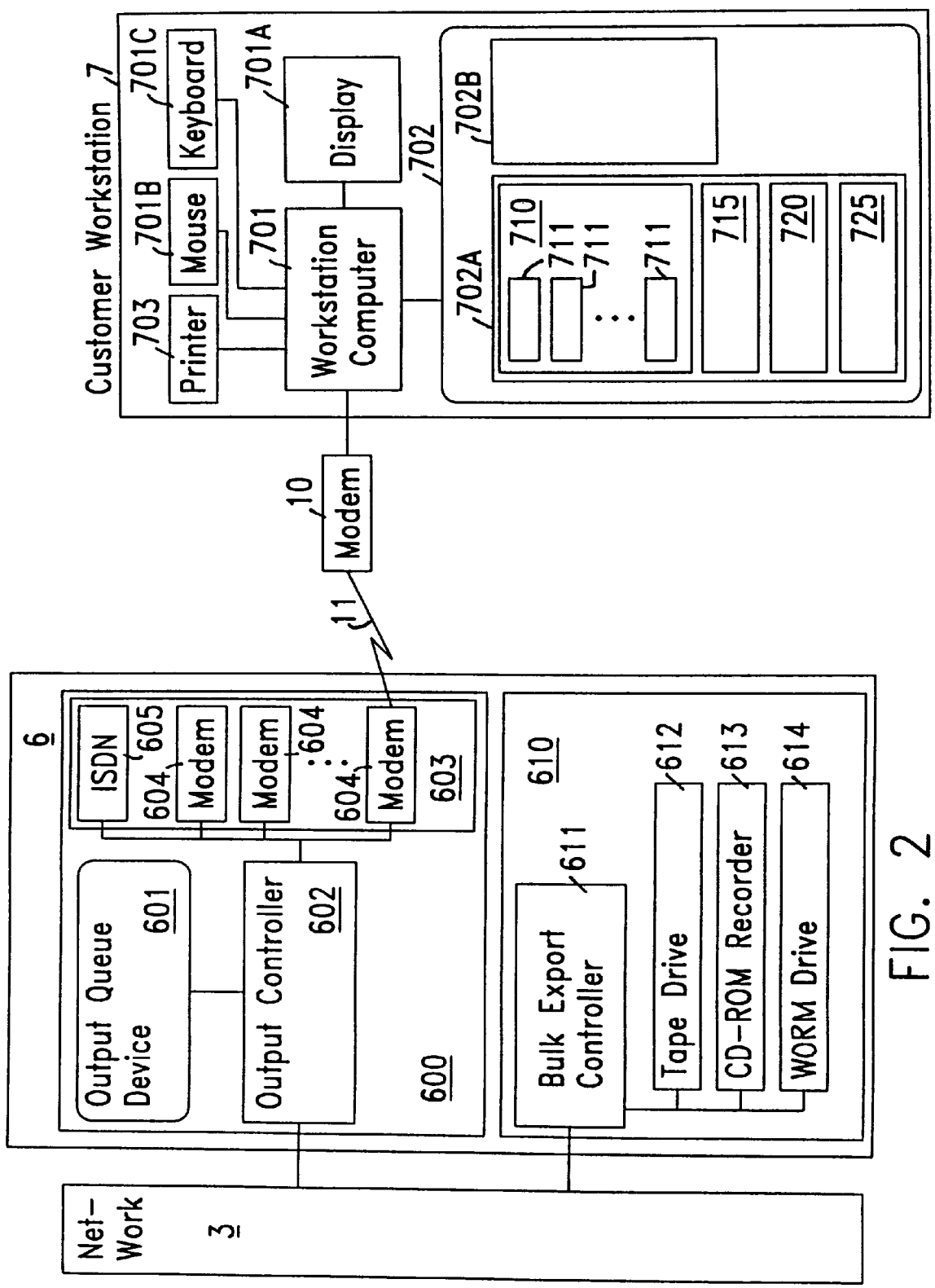
FIG. 2 is a block diagram showing further details of part of the host system and a customer service workstation, and the connection therebetween.

FIG. 2 shows the customer workstation 7, its communication link 11 with the output station 6 of the host system 8 and the output station 6 itself in greater detail. Output station 6 includes a communication station 600 and an export station 610. The communication station 600 provides communication control between the host system 8 and each of the customer work stations 7. The communication station 600 includes an output controller 602, an output queue storage device 601, and an output gateway 603 having at least one modem 604, ISDN (Integrated System Digital Network) controller 605, or other communication device for communication with a workstation 7, as explained more fully below.

The export station 610 of the output station 6 includes a bulk export controller 611, which is preferably coupled to at least one device capable of exporting, or providing as an output, a large amount of data comprising digital images of checks processed by the host system 8. In accordance with this capability, bulk export controller may be coupled to a digital storage device such as a tape drive 612, CD-ROM recorder 613, WORM drive 614, and/or any other suitable device.

Each customer workstation 7 includes a workstation computer 701 and a display device 701A for displaying check images and other screen information. The computer 701 is coupled to a local storage device 702. The workstation computer 701 is also preferably coupled to a printer 703 for printing images of checks as well as other documents incorporating check images, for example.

In the preferred embodiment, the customer workstation 7 is coupled to a modem 10 which transmits/receives information over a telephone line 11 connected to a modem 604 of the output station 6.

The output controller 602 is coupled to output queue device 601 and the network 3. According to the preferred embodiment, the output controller 602 may be a SUN SparcStation 2. The output queue device 601 may be a RAID disk array. The device 601 is provided for the storage of customer, user and account information and temporary storage of check image requests and check images requested by one or more of the workstations 7 and which are to be downloaded to one or more of the workstations 7. As described, the communication gateway 603 preferably includes a plurality of modems 604, one or more ISDN controllers 605 and/or other communication equipment to form a suitable communication link 11 to provide requested check images to one or more customer workstations 7 located at the customer sites or elsewhere.

The bulk export controller 611 of the export station 610 may provide output to devices to deliver check images and other data to customers in mediums other than by on-line communication. For example, the bulk export controller may write check images and data to the tape drive 612, the CD-ROM recorder 613 or the WORM drive 614 or on any other suitable media or for transmission by any other means. The export station 610 is useful for the large scale delivery or transmission of check images to customers who must process requests for large numbers of checks or who require, for example, that all checks paid by them be provided to them.

Figure 3:
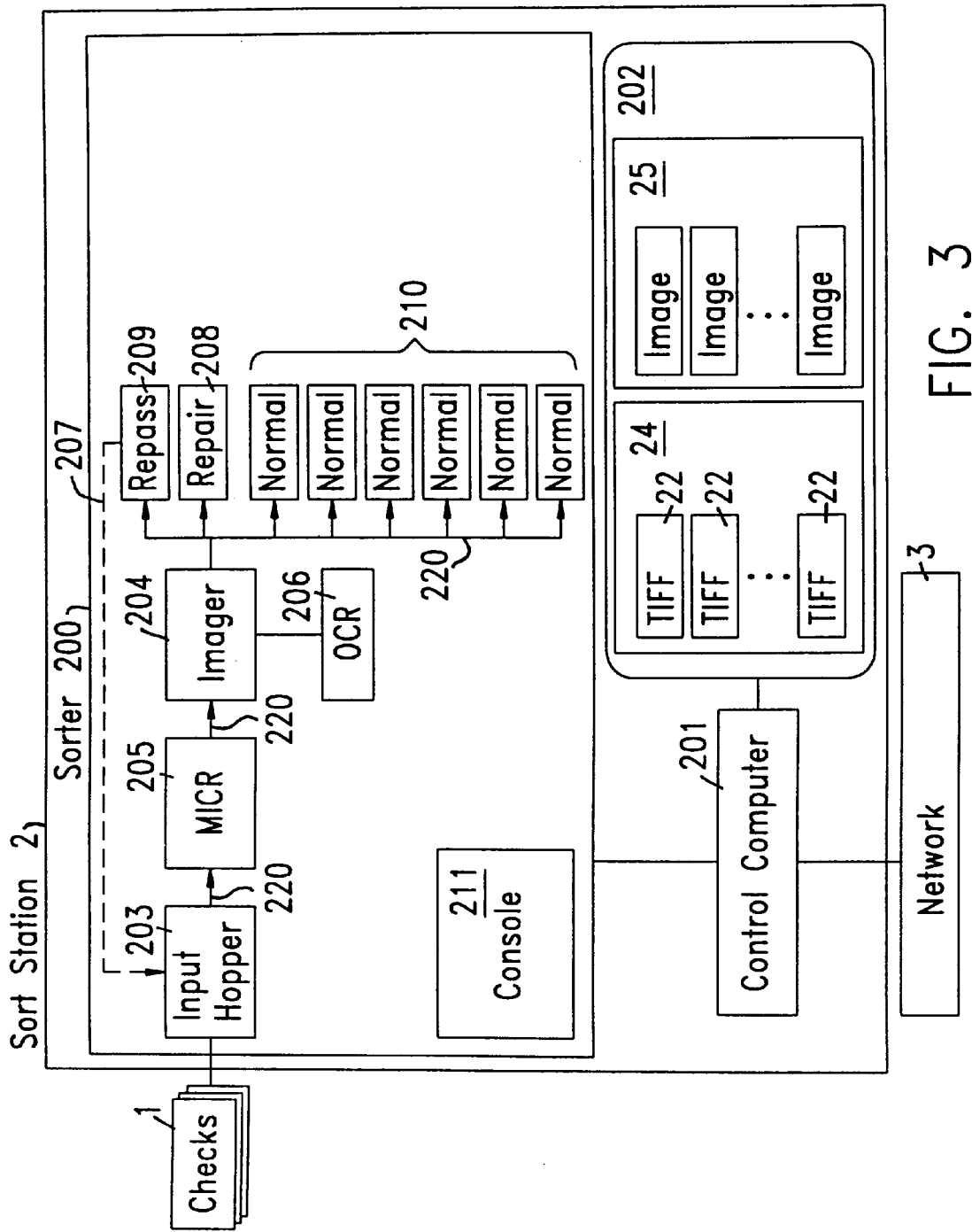
FIG. 3 is a more detailed block diagram of part of the host system and the manner in which check images are made and queued in the host archive system.

FIG. 3 shows the sort station 2 in greater detail. The sort station 2 comprises a sorter 200, having an input hopper 203, imaging device 204, optical character reader (OCR) 206, MICR reader 205, and a plurality of sort pockets 208, 209 and 210. Checks are conveyed mechanically along a track 220 which connects the various stations, eventually being sorted to and deposited in one of the pockets 208, 209 and 210. In the embodiment illustrated, 6 normal processing sort pockets have been shown, although there can be a larger or smaller number of such pockets. The track 220 is not shown in detail in FIG. 3, because its construction, employing a mechanical track and mechanical elements including motors, belts, rollers, etc., is well known.

The sort station 2 also includes a control computer 201 and a storage device 202. The control computer 201 is coupled to the host system network 3.

With reference to FIG. 3, checks 1 are fed into input hopper 203 of the sorter 200. The checks 1 are then conveyed along the track 220 sequentially to digital imager 204 and MICR line reader 205. The check images made by the imager are passed to the Optical Character Recognition device (OCR) 206. After the MICR line is decoded by station 205, the checks 1 are passed to one of the eight output pockets, i.e. the repair pocket 208, the repass pocket 209 or one of the six normal sort pockets 210. Checks 1 that are routed to the repass pocket 209 are again placed in the input hopper during the repass run of the sorter 200. During the repass run, checks 1 are manually placed in the input hopper 203 as shown by dashed lines 207, processed to the repair pocket 208 (described in greater detail below), one of the six normal pockets 210 or killed (removed from processing). According to the preferred embodiment, the sorter 200 may be an NCR 7780 check reader/sorter, which processes approximately 370 checks/minute.

The control computer 201 controls the operation of the sorter 200. The control computer 201 may be an NCR 486 type computer or any other suitable device. Storage device 202 is operatively coupled to the control computer 201, as is the network 3. In the preferred embodiment, the storage space 202 may be a RAID disk array. In the preferred embodiment, the array 202 may comprise three disks of about one gigabyte each. The amount of storage space is not crucial. Enough must be provided to serve its purpose, which is to provide temporary storage of check images and associated data before the images are provided on the network 3. Additionally, the storage device 202 is useful to queue check images when processing in an off-line mode, storing checks without transmitting the check images across the network 3. This is useful especially if the network 3 goes down, and it is still desired to continue the operator intensive check sorting and processing function implemented by the sorter 200 and store the resultant images.

Generally, to process a check 1, it is fed into the input hopper 203 of the sorter 200. The check 1 is transported along the mechanical track 220 and reaches the imager 204 which generates digital images of the front and back of the check 1. The digital image of at least the MICR line of the check 1 is passed to the OCR device 206 which, through optical character recognition, decodes the MICR characters optically from the image. When the check 1 reaches the MICR reader 205, the MICR is then magnetically decoded, as known in the art.

In accordance with the preferred embodiment of the invention, the digital images of the front and back of the check 1 are merged, by the control computer 201, into a single TIFF (Tagged Image File Format) file 22. Additionally, the control computer 201 preferably merges the decoded raw MICR, a parsed MICR, the customer ID, the work date, the processing date and time, a machine ID and a repair ID into the TIFF file 22 as tag fields. The control computer then stores the TIFF file 22 in queue 24, repair queue 25 of the storage device 202, or on storage space 505 (FIG. 5) of the image storage device. In a preferred embodiment, queues 24 and 25 are FIFO (first-in-first-out) queues.

Figure 4:
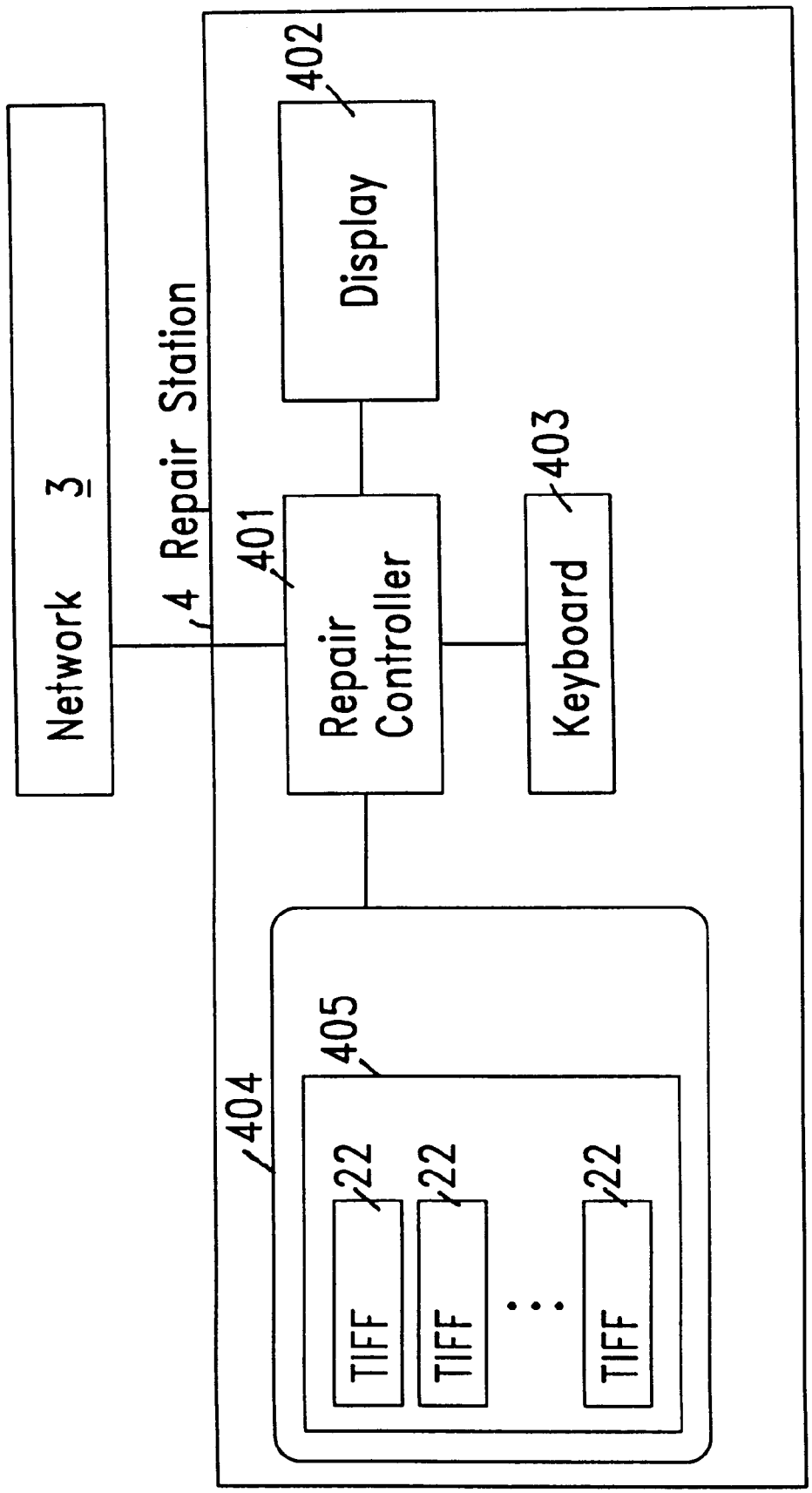
FIG. 4 is a further detailed block diagram of a portion of the host system which facilitates repair of checks in which errors are present.

FIG. 4 shows the repair station 4 in greater detail. The host system network 3 is coupled to a repair controller 401. The repair controller 401 is coupled to a display 402 and a keyboard 403. The repair station 4 is provided for an operator to repair data associated with check images prior to storing the image for customer retrieval in the host system 8.

Figure 5:
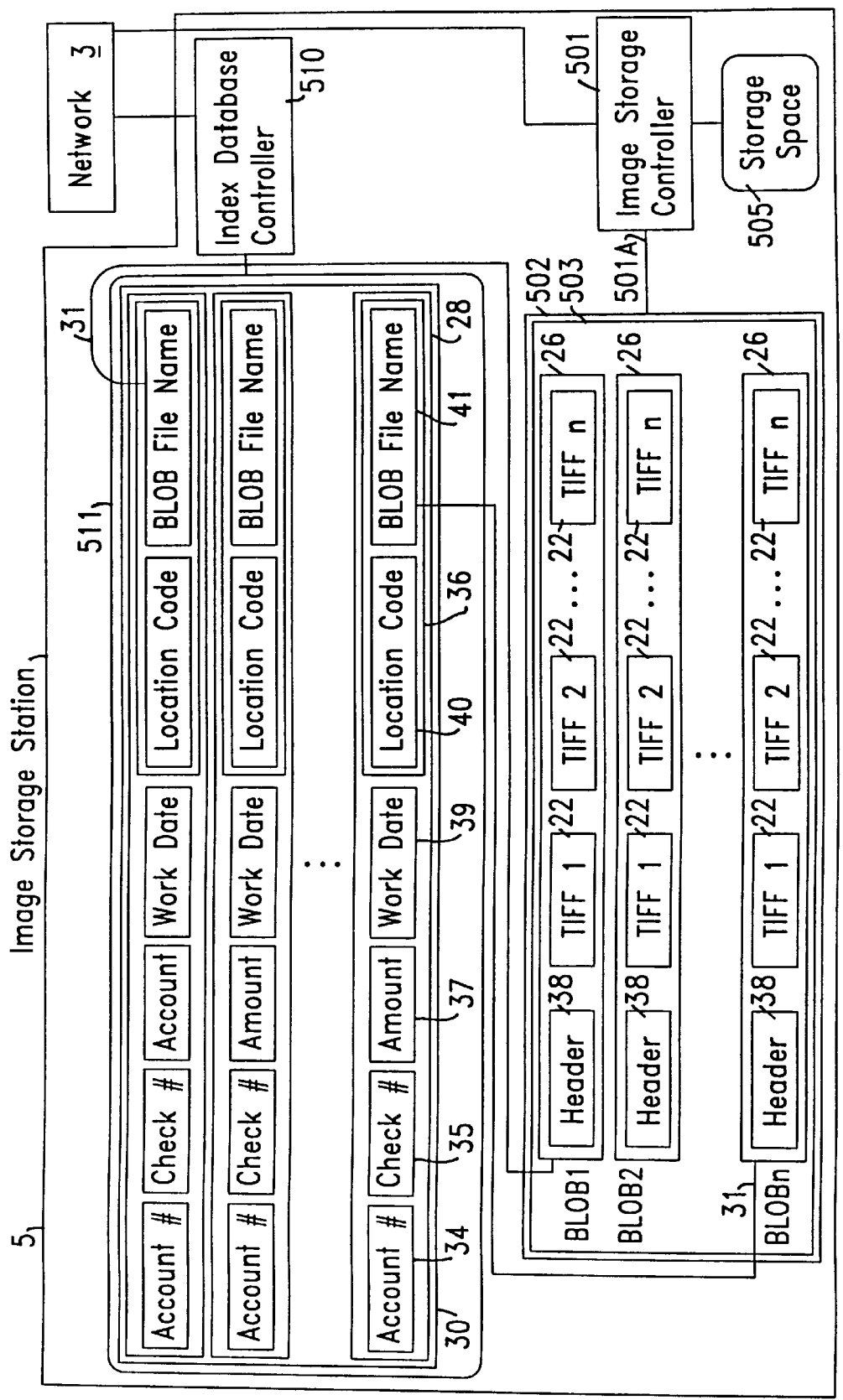
FIG. 5 is a more detailed diagram of one embodiment of part of the host system showing how check images are stored in/retrieved from the mass storage device of the host archive system.

FIG. 5 shows one embodiment of the image storage station 5, containing the check image mass storage device, in greater detail. The host system network 3 is coupled to a storage space 505 via an image storage controller 501. The image storage controller 501 is also coupled to an image storage device 502. The image storage device 502 preferably is a mass storage device, e.g., a Kodak 6800 optical jukebox. The storage space 505 is provided for temporary storage to maintain administrative data (or meta-data) for the image storage device 502. The network 3 is also coupled to an index database controller 510. The index database controller 510 is coupled to an index database device 511. In the preferred embodiment, the image storage controller 501 and the index database controller 510 may be Sparcstation 20 computers manufactured by SUN and the index database device 511 may be a RAID disk array.

Figure 5A:
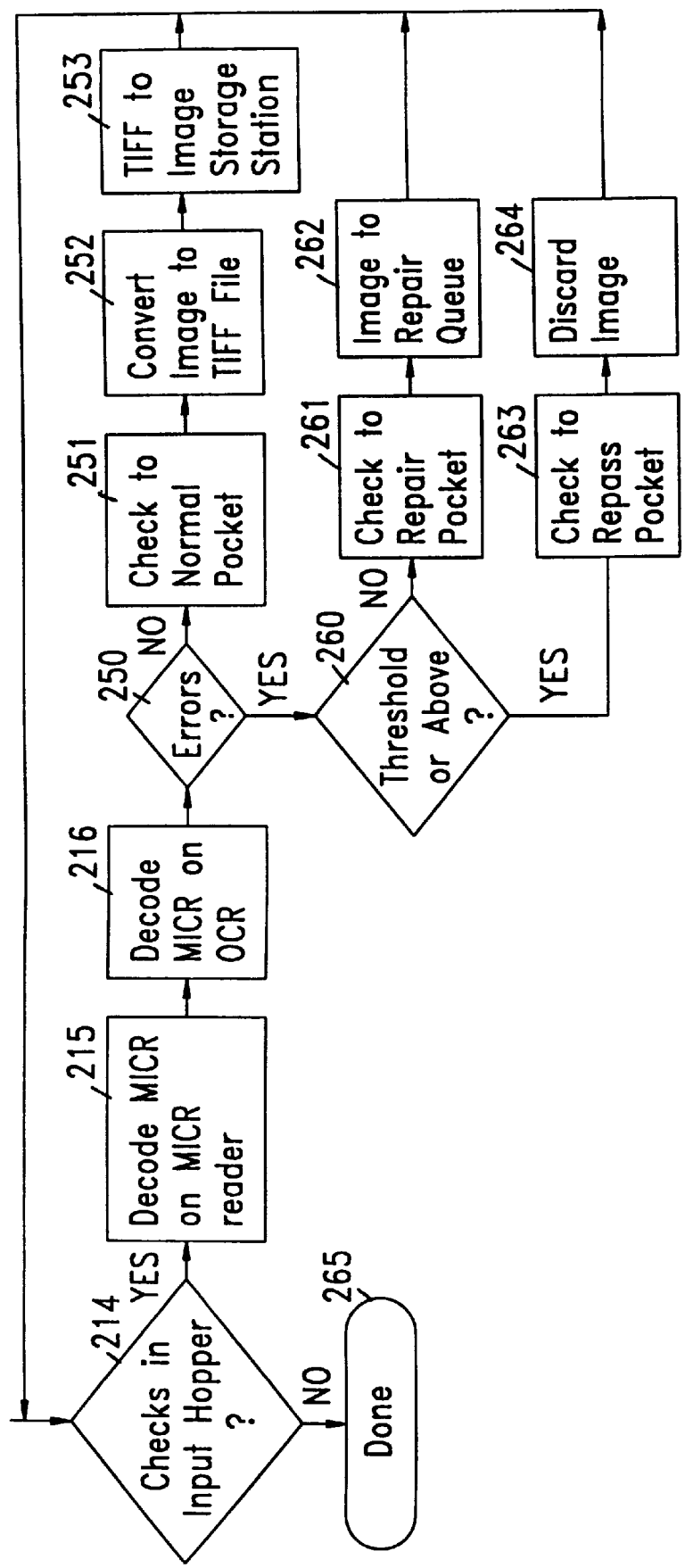
FIG. 5A shows the normal and repass processing employed by the check reader/sorter device utilized in the invention to generate check images and data.
Figure 5B:
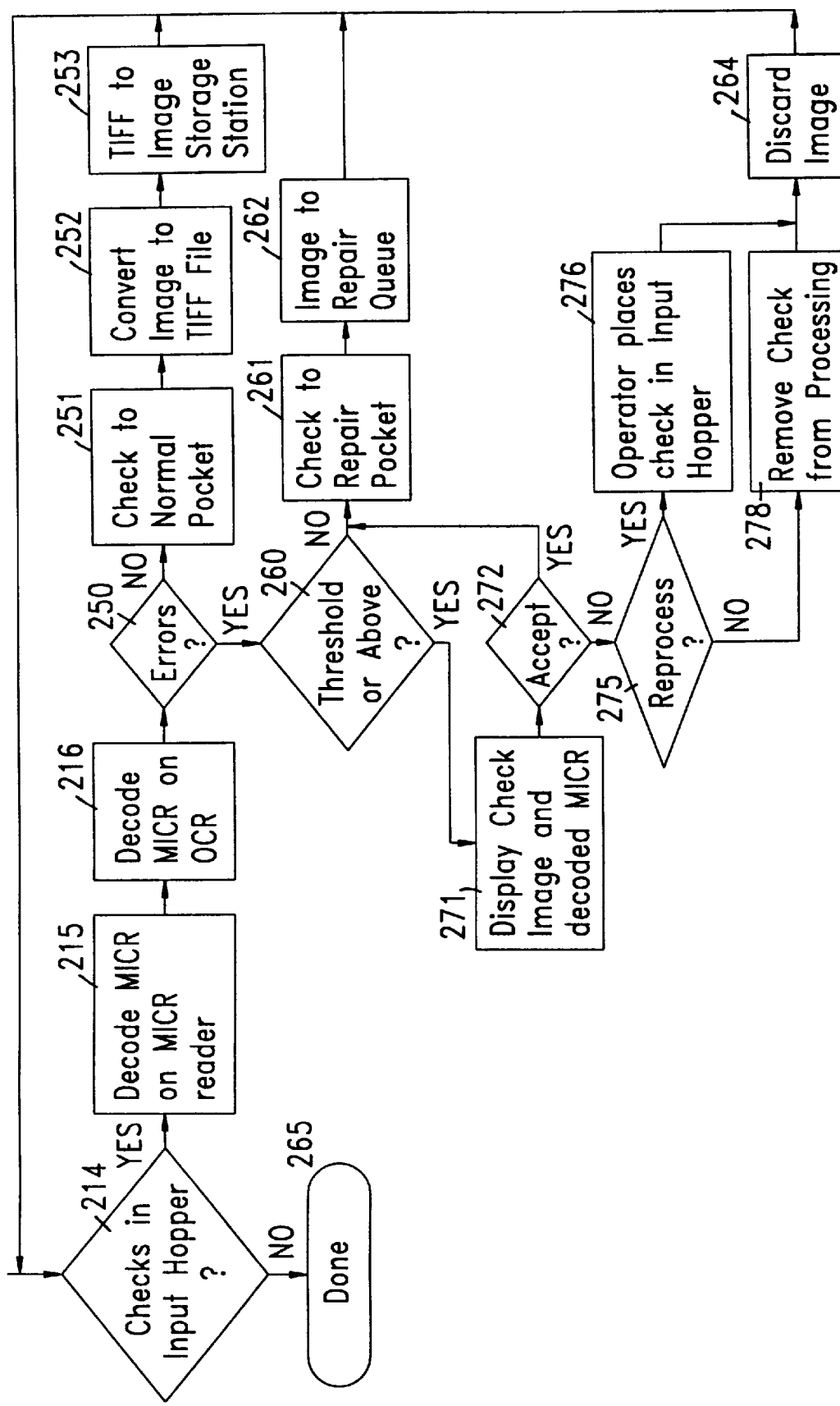
FIG. 5B shows further process steps used in the invention to store check images.
Figure 5C:
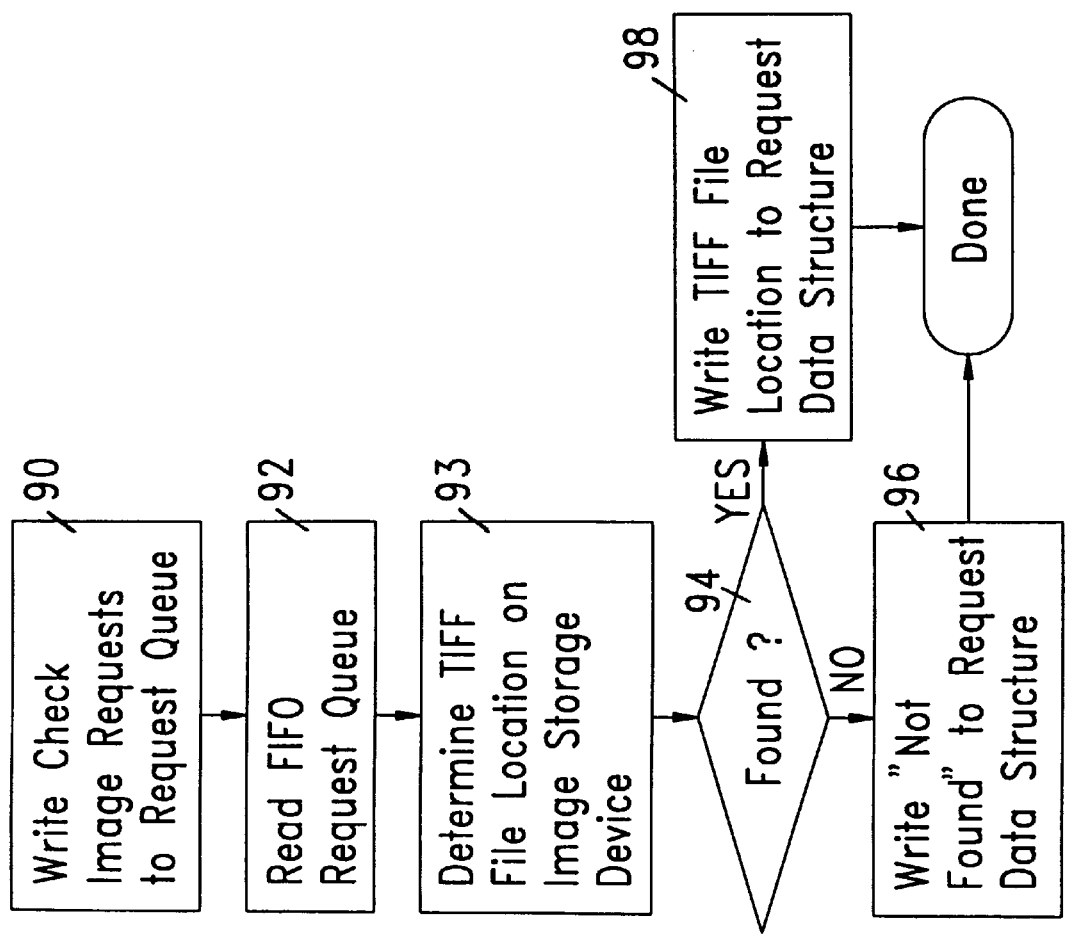
FIG. 5C shows the Requester Process implemented at the host system when it processes a check request from a workstation.
Figure 5D:
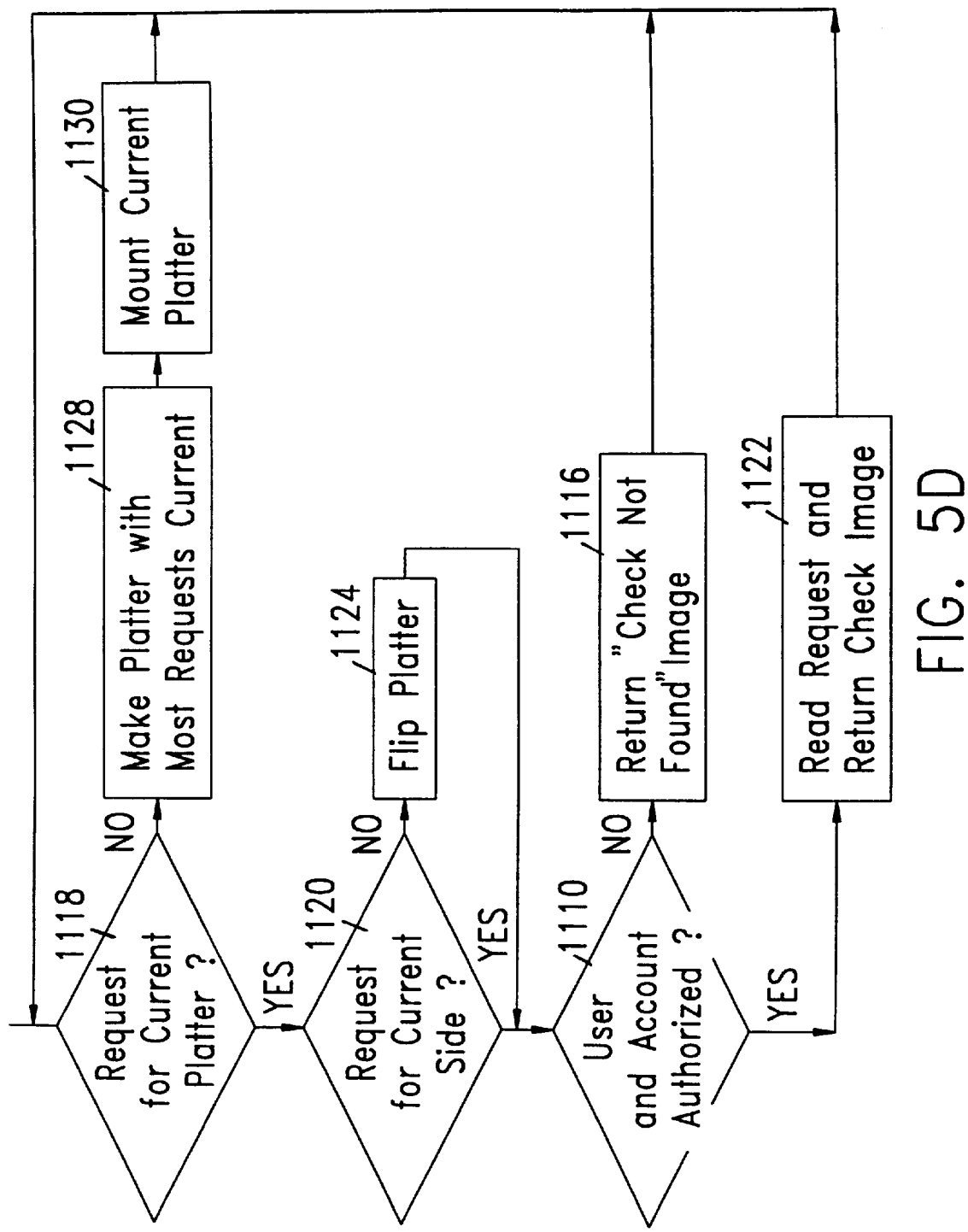
FIG. 5D shows the Retrieval Process implemented at the host system when it processes a check request from a workstation.
Figure 5E:
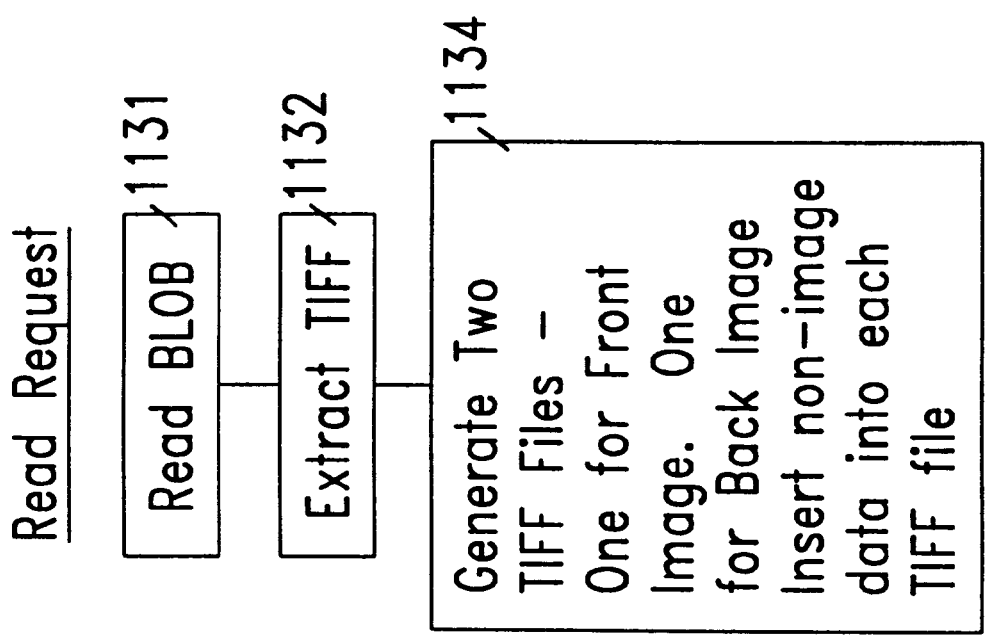
FIG. 5E shows how a check image is recovered by the host system.
Figure 5F:
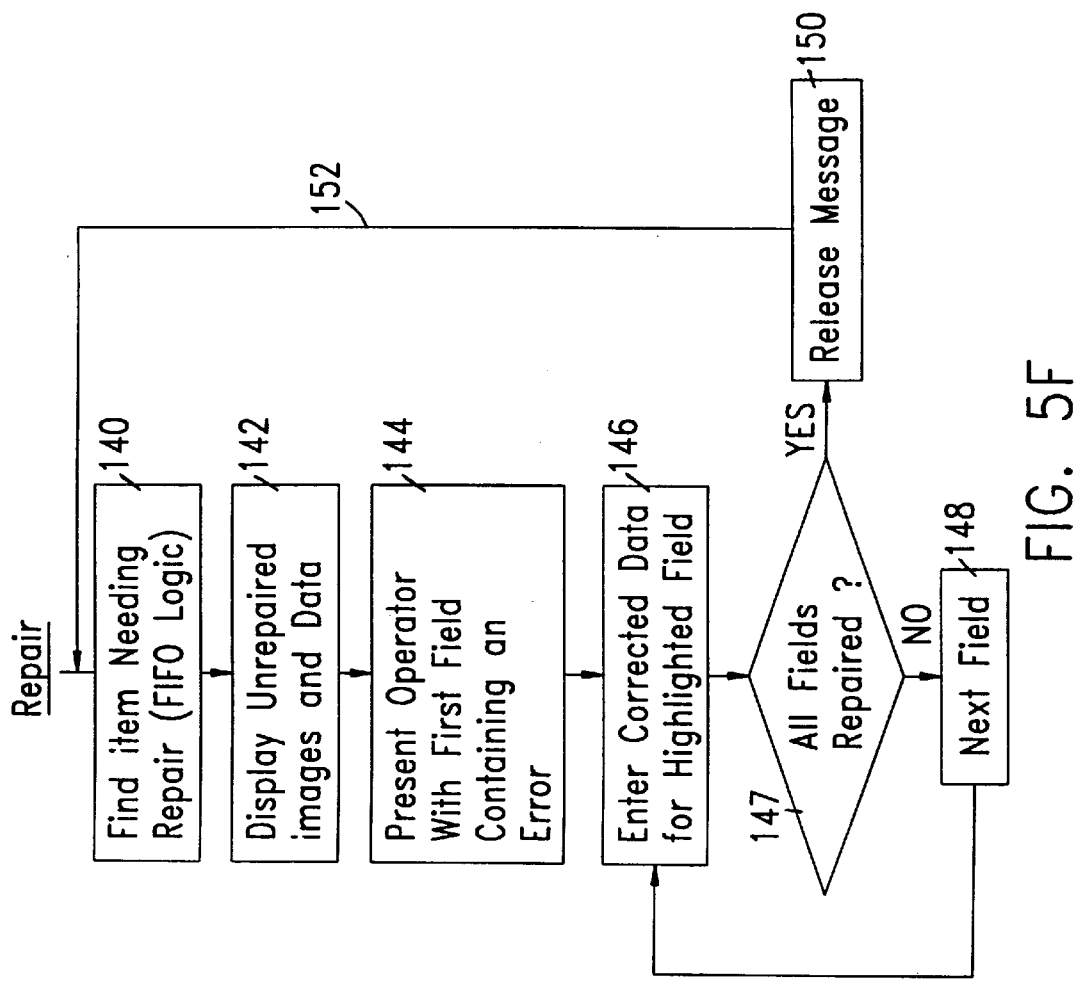
FIG. 5F shows the Reject/Repair Flow Process.
Figure 5G:
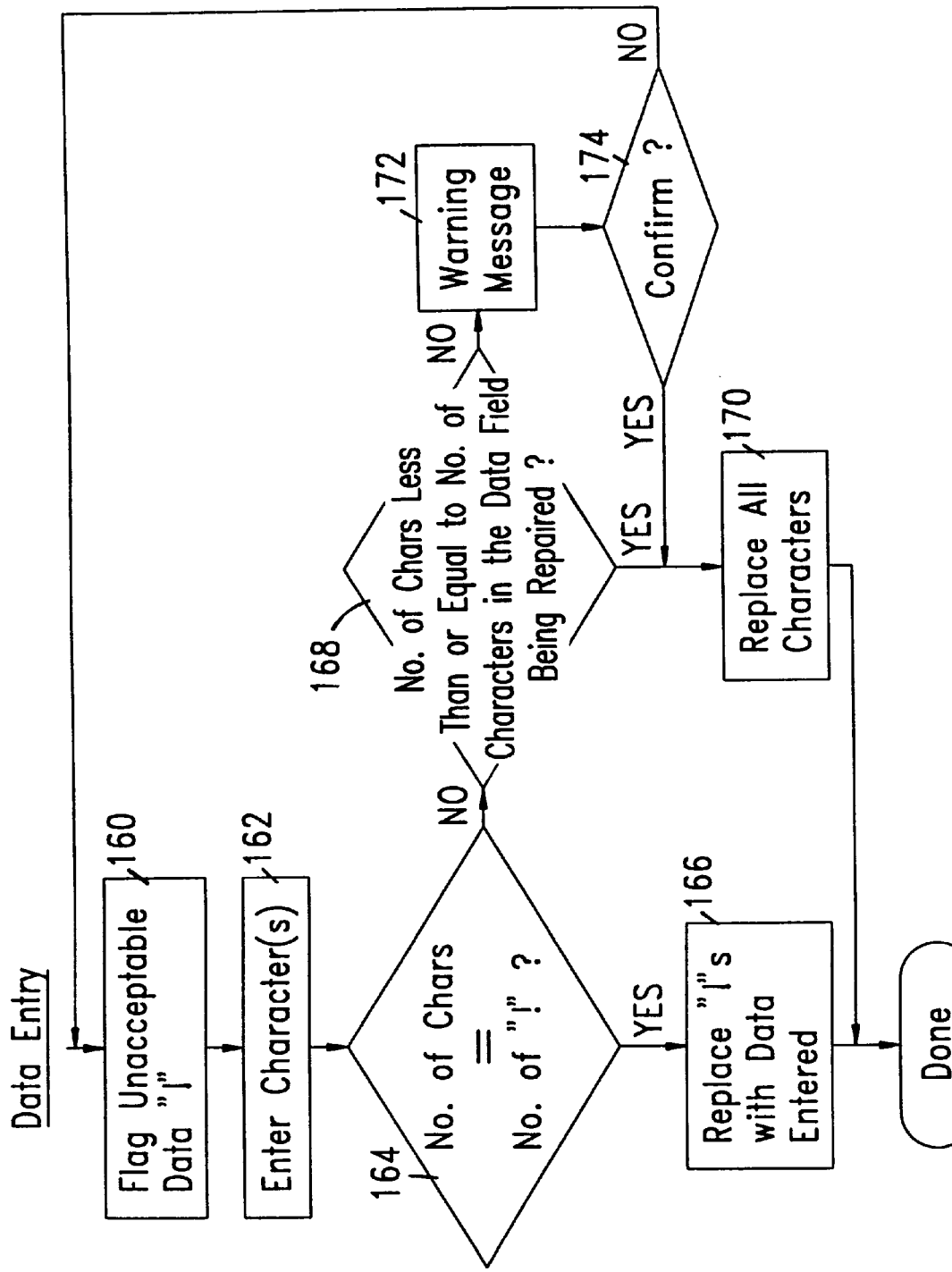
FIG. 5G shows the Data Entry procedure implemented during the repair process.
Figure 5H:
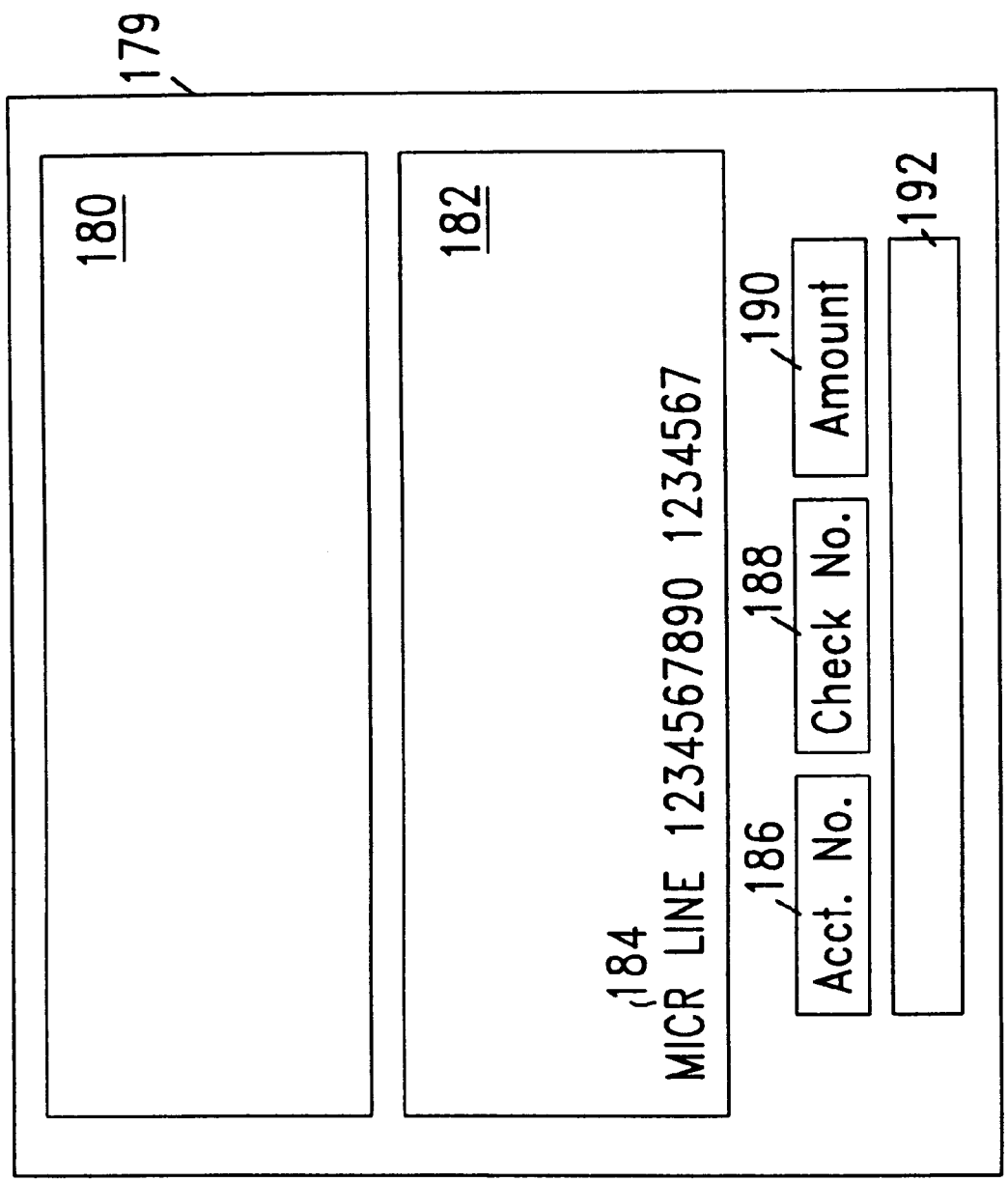
FIG. 5H shows a representation of the data entry screen utilized in the check repair process.
Figure 5I:
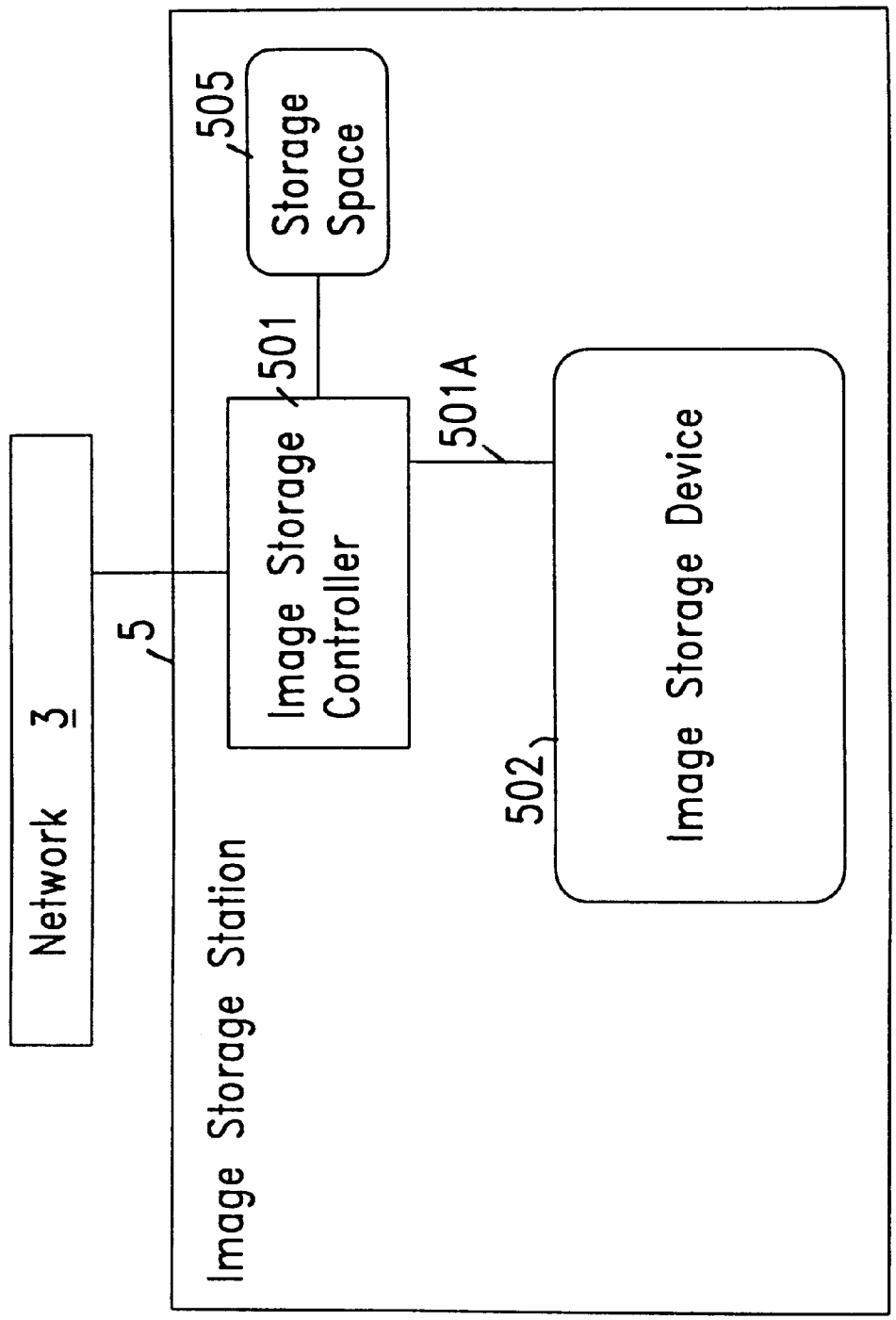
FIG. 5I shows another embodiment of part of the host system, particularly, the image storage station.

FIG. 5I shows an alternative embodiment of the image storage station. As in FIG. 5, the host system network 3 is coupled to an image storage controller 501. The image storage controller 501 is coupled to a storage space 505 and an image storage device 502. The storage space 505 and image storage device 502 are provided for the same purpose as before. In this alternative embodiment, however, no index database device 511 or controller 510 is necessary.

With reference to FIGS. 3 and 5, when at least a predetermined number of TIFF files 22 on storage space 505 await processing by the image storage controller 501, they are grouped by account number and written to the image storage device 502 as a Binary Large OBject (BLOB) 26. Once the BLOB 26 is successfully written, information for each TIFF file 22 is sent to the index database controller 510 and written to the index database 30 as an index record 28. After the index records 28 are written, the TIFF files 22 are deleted from storage space 505.

Each BLOB contains a header 38 and a variable number of TIFF files 22. The header 38 contains data which can be used to locate and extract a TIFF file 22 from the BLOB 26.

The indexing of the TIFF files 22 referred to above is carried out by creating an index record 28 (FIG. 5) for each TIFF file 22. The index record is written to the index database 30 which is stored in the index database device 511. As shown, each index record 28 includes the account number 34, check number 35 and amount 37 for a particular check 1, the work date 39, and a BLOB pointer 36 to the particular BLOB containing that particular check comprising a location code 40 and a BLOB file name 41. Heavy reference lines 31 are provided in FIG. 5 to illustrate this relationship.

2. Host System Architecture

Details of each of the components of the host system 8 will now be described. With reference again to FIG. 1, in the preferred embodiment of the invention, the host system 8 consists of several pieces of hardware connected to each other via the network 3, which may be, for example, a 10 Base-T Ethernet network, preferably running TCP/IP and NFS. As described previously, the network 3 is connected to the sort station 2, the repair station 4, the image storage station 5 and the output station 6. More specifically, the network 3 is connected to the control computer 201 (FIG. 3), the repair controller 401 (FIG. 4), the index database controller 510 (FIG. 5), the image storage controller 501 (FIGS. 5 and 5I), the output controller 602 (FIG. 2) and the bulk export controller 611 (FIG. 2).

a. Sort Station 5
i. Sorter 200

With reference now to FIG. 3, the check sorter 200 may be a medium speed check processing machine, e.g. an NCR type 7780, enabled with both front and back of check imaging capability. In a preferred embodiment, as shown in FIG. 3, the sorter 200 is also provided with a MICR line reader which decodes the check MICR line. Also in the preferred embodiment, the MICR line decoding function is also accomplished by decoding the MICR line from a portion of the image made by the imaging capability of sorter 200.

The control computer 201 is coupled to the sorter 200 and interfaces with the network 3. The control computer 201 controls the functionality of the sorter 200 and converts the front and back check image and the MICR line, as decoded by the sorter 200, into a single TIFF file 22. Once complete, the TIFF files 22 are written to storage space 505 (FIGS. 5 and 5I) for later storage by the image storage controller 501. Due to its direct connection to the control computer 201, however, storage space 202 is intended to function as the site for TIFF file 22 storage in the event that the network 3 is temporarily not functioning. With this configuration, the operator intensive work, e.g. processing of checks 1 through the check sorter 200, can proceed without interference in the event of a network 3 problem, and the TIFF files 22 can later be written to storage space 505.

The sorter 200 decodes the MICR line of each check. For each check with a successfully decoded MICR line, front and back digital images of the check and other data generated by the sorter 200 are converted into a single TIFF file 22 for each, and stored in the storage space 505. Where the MICR line is not successfully decoded, however, and less than a predetermined number of errors are present, the digital images and data requiring repair are sent to a repair queue 25 of the storage space 202. Repair station 4, which will facilitate repair of questionable or incompletely decoded MICR data from the sorter 200, obtains its input from the repair queue 25. This is accomplished via a suitable network connection, preferably an NFS mount, between the control computer 201 and the repair station 4. Where more than predetermined numbers are present, the images and data are discarded.

A file system, e.g., a UNIX based file system, is used to store the TIFF files 22 in the storage space 505 while they await processing by the image storage station 5 (FIG. 5). It was found that overburdening a single directory by storing all of these files in a single location of storage space 505 can cause a degradation in file insertion and extraction times.

Overburdening a directory depends upon the particular hardware and file system used. Generally, when a directory has many entries and becomes very long, searching the directory may require many disk reads and compares, and, accordingly, the time required to store or retrieve a file rises dramatically. This is referred to as the directory being overburdened. This characteristic, for any particular file system, can be measured by empirical experimentation in a particular configuration. In the preferred embodiment, using the UNIX file system and hardware described, a directory with more than several thousand files is overburdened.

According to the invention, to alleviate overburdening, a multiple directory structure and round-robin directory allocation is used to prevent over-population of a single directory. Preferably, ten directories are used to receive the incoming files. This number was determined experimentally, based upon the components employed and the throughput desired. Accordingly, in the preferred embodiment, files are written to a specific directory until the number of files within that directory reaches the currently configured maximum amount allowed for the directory. Files are then sent to the next directory and when that directory is full, to the next one, etc.

Accordingly, each TIFF file 22 written to storage space 505 is written to the appropriate directory to await processing by the image storage station 5. The image storage controller 501 reads files from the earliest written directory first. As a directory of storage space 505 empties out, the image storage controller 501 begins reading files from the next directory. In other words, if files were stored in the first directory first, and then in the second directory, the image storage controller 501 will process the files in the first directory first, and subsequently, it will process the files in the second directory, etc.

As should be evident to one of skill in the art, the number of directories used, and the maximum number of files per directory, can be configured according to need. As also should be evident to those of skill in the art, the considerations for configuration include: the number, size and rate of files expected; the average and maximum number of files pending in storage space 505; the characteristics of the file system; and the characteristics of the hardware. In the preferred embodiment, the number of directories utilized and the maximum number of files contained in any directory can be reconfigured as appropriate.

b. Control Computer 201

Referring now to FIG. 3, where the path of the paper check 1 is shown by the darkened line 220, as described previously, the sorter 200 processes each check 1 by feeding it from the input hopper 203, along the mechanical track 220 past individual stations where the various check processing functions of imaging and MICR line reading are performed. Each check 1 is sent to one of the output pockets 208, 209 and 210. Control of the movement of each check 1 down the track 220 (and the operation of the sorter 200 generally) is directed by a program, e.g., in C language, written to run on the control computer 201. Information on programming the illustrative NCR 7780 check sorter 200 is available in the NCR 7780 Application Support Environment manual NCR Enhanced IPS Application Programming (DI-2430-A) and will not be discussed herein.

In the preferred embodiment of the invention, the imager 204 generates digital images of the front and back of each check using a pair of cameras (not shown), as known in the art, which convert the analog image data of the front and back of the checks into digital image data.

MICR reader 205 captures the information magnetically encoded in the MICR line of the check for inclusion in the TIFF file 22. The information magnetically encoded in the MICR line includes the account number, the check number and often includes the amount.

As in any character recognition operation, especially one employing mechanical movement of documents, errors can be introduced into the process. A common problem in check processing is when two checks 1 pass down the track 220 at the same time, commonly referred to as a piggy-back. In a standard check processing environment, this could result in the second check being missed by the check sorter. In an image capture environment, this situation will result in the front image of the first check being associated with the back image of the second check.

In addition, a more significant problem results from the information extracted from the MICR line being incorrect. An example of these problems is where a MICR line read error results from the second check's MICR line information "bleeding" through the first check, resulting in incorrect information being received by the MICR reader 205. Thus, the check image would be stored in a storage device under an incorrect account number, making it, for all practical purposes, unretrievable.

In order to identify this situation and take corrective action while the checks 1 are still in the sorter 200, a "best read" comparison is performed on the data retrieved from the MICR line prior to making the decision relating to which of the output pockets 208, 209, 210 to send the check 1. As is well known in the art, in character recognition, whether optical or magnetic, an algorithm determines what character is represented to a given confidence level. Below that confidence level, the algorithm will not determine what the character is. A "best read" is determined by the sorter 200, from the results of the decoded MICR from the OCR 206 and the MICR reader 205, in accordance with a known technique, not described in detail here. In the preferred embodiment, the check sorter 200 is instructed to provide a "best read" on the MICR line, and returns a decoded MICR line with "!" characters replacing any questionable data in the MICR line. If the "best read", i.e., the decoded MICR line contains no "!" characters, the control computer 201 causes the check image to be converted to a TIFF file 22 and directs the check to one of the six normal output pockets 210. The front and back check digital images are converted from the camera digital image format, e.g., NCR image format, into a standard Tagged Image File Format (TIFF, which is a registered trademark of ALDUS Corp.) The front and back digital images are combined into a single TIFF file 22 along with other data, described below, relating to the check and its processing. The TIFF file 22 is in industry standard TIFF format. The non-image data is given TIFF tags and stored within the file as financial information. The following fields are each stored as tag fields:

| | |
|---|---|
| Raw MICR line | A copy of the MICR line as received as "best read" from the check sorter 200, in reverse order. |
| Parsed MICR line | MICR line data, parsed to remove bank information, leaving the account number, check number and amount in proper order. |
| Account number | Account number of the check. |
| Check number | The check number. |
| Amount | The amount of the check. |
| Customer | The customer ID for this check. |
| Work Date | Date checks were processed. |
| Machine ID | ID of check sorter which processed the check. |
| Capture Date/Time | Time and date when image was generated. |
| Repair ID | Repair Station ID used to repair this check. |
| Repair Date/Time | Time and date when check was repaired. |

When inconsistencies exist between the optically and magnetically decoded MICR lines or, where one or more characters were not decoded by either the MICR reader 205 or the OCR device 206, the check 1 can either be directed to the repass pocket 209 for re-processing on the sorter 200 or to the repair pocket 208 for MICR line correction at the repair station 4 (FIG. 1).

Referring now to FIGS. 5A and 5B for procedure and FIG. 3 for hardware, two distinct processing modes are established for the sorter 200, normal mode (FIG. 5A) and repass mode (FIG. 5B).

The objective of the normal mode is to process all checks 1 as quickly as possible. Checks 1 are processed from the input hopper 203. If checks 1 are present in the input hopper 203 (step 214), a check 1 is automatically removed from the input hopper 203 and processed. During processing, the MICR line is decoded by the OCR device 206 (see step 216) and the MICR reader 205 (see step 215) as described above. Some of the time the "best read" contains "!" characters, and therefore, errors. This can result if one or more characters are not recognized by either of the decoders. The reasons for such non-recognition are well known in the art.

If the "best read" contains "!" characters, errors are present (250). If no errors are present, the sorter 200 is controlled to send check 1 to one of the normal pockets 210 (see 251), the image and associated data are converted to a TIFF file (252) and the merged TIFF file 22 is written to the storage space 505. (See 253).

Where "best read" contains "!" characters, the number of such characters is compared with a threshold number (260). Checks 1 containing some "!" characters, but fewer than the threshold level, are sent to the repair pocket 208 (see 261) and the associated image for that check is sent to a repair queue 25 (see 262). Checks 1 with an equal or a greater number of inconsistencies than a threshold number are sent to a repass pocket 209 (see 263) and the associated image is discarded. In a preferred embodiment, the threshold number of "!" characters, or errors, is four, meaning that if there are four or more errors, or unreadable characters, the check is sent to the repass pocket. Normal processing continues until there are no more checks 1 in the input hopper 203 (see 214), at which time normal processing is complete (265).

After all checks 1 have been processed in normal processing, the operator may switch to the repass mode (FIG. 5B). The objective of the repass mode is to have an operator review each check 1 having a number of inconsistencies at or above the threshold level, individually. If the number of errors is still at or above the threshold when the check is reprocessed, the operator determines the disposition of the check 1.

In repass mode, checks in the repass pocket 209 are moved to the input hopper 203 and again conveyed along the track 220. A "best read" is again obtained for the check. The repass mode differs from normal processing only in the way checks are handled if a threshold number or more errors are present. If the number of errors is equal to or greater than the threshold for this second processing, the check is stopped in the track 220 and the image is displayed on the console 211 along with the decoded MICR line (see 271). The operator can decide to accept the check 1 (see 272), which causes the check 1 to be guided to the repair pocket 208 (see 261) and the image is sent to the repair queue 25 (see 262), to facilitate later correction at the repair station 4. The operator can also decide to reprocess the check 1 on the sorter 200 (see 275), at which time the operator removes the check 1 from the track 220 and places it in the input hopper 203 (see 276). The image and data associated with that check 1 are then discarded (see 264). If the operator chooses not to accept (272) or reprocess (275) the check 1, the check must be killed by removing the check from processing (step 278).

The image and data associated with that check 1 are also discarded (see 264). A check 1 is killed if, for instance, the check 1 is for an account other than the account currently being processed. When the operator chooses to kill a check, the number of expected checks and the dollar total of the expected checks will be reduced appropriately. Repass processing continues until there are no more checks 1 in the repass processing pocket 209 (see 214), at which time repass processing is complete (265).

In addition to controlling the sorter 200, several ancillary functions are also resident in the control computer 201. These include maintaining statistics and performing file maintenance.

c. Repair Station 4

Turning now to FIG. 4, repair station 4 comprises a repair controller 401 display device 402, a keyboard 403, and temporary storage device 404. In the preferred embodiment, controller 401 may be a PC, e.g., an NCR 486 PC, connected to the network 3 via a TCP/IP protocol. It preferably utilizes the Network File System (NFS) to read its input from the queue 25 of the storage space 202 (FIG. 3). It writes the corrected files in the form of TIFF files 22, via NFS, to the storage space 505.

In the event that the network 3 is unavailable, for example, due to network 3 failure, the corrected TIFF files 22 are written to the corrected files database 405 on the temporary storage device 404. When the network 3 becomes available, the TIFF files 22 are then written to the storage space 505.

The repair station 4 is designed to expedite the correction of MICR line data which fails to meet acceptance criteria when it is decoded by the check sorter 200.

The repair station 4 provides the operator with a convenient and efficient method of correcting MICR line information for a potentially large number of checks. Reject percentages, i.e., the percentage of checks which cannot reliably have the MICR decoded—vary by account from under 1% to over 6%.

The processing followed by the repair station 4 facilitates rapid correction of a large volume of MICR lines. With reference now to FIG. 5F, once initiated, the repair station 4 automatically searches the repair queue 25 of storage space 202 for items needing repair (140). Preferably, the system follows FIFO logic, by account, for presenting items requiring repair to the operator. The check image and partially decoded data for each item requiring repair is presented to the operator (142).

After displaying the images and the data on the repair station display device 402 (142), the repair station 4 checks each of the three data fields that were encoded in the MICR line, specifically, the account number, the check number and the amount, and highlights the first field requiring correction to the operator (144). In the preferred embodiment, the first field containing errors is highlighted in reverse video. The operator can now enter the corrected data on the keyboard 403 (146).

FIG. 5H shows the display screen of the repair station 4 which will be provided on the display 402. A data entry field 192 is provided at the very bottom of the screen (FIG. 5H), and is used as a single point of entry for all three fields. Preferably, the field highlighted on the screen is the only field which will be affected by data entry.

Once corrected data is entered by the operator, the repair controller 401 checks the next field for errors (147), and if necessary, highlights it for correction (steps 146, 148). After all data fields are corrected (147), the repair controller 401 displays a release message (150). By pressing the return or enter key on the keyboard 403, the repaired item is then released. When a repaired item is released, image and data associated with that item are removed from the repair queue 25 and converted into a TIFF file 22, as above. The TIFF file 22 is written to the storage space 505. After releasing the item, the repair station automatically returns to the step of finding the next item needing repair (140). Thus, the design of the repair station 4 encourages the use of a minimal number of keys by the operator to facilitate rapid processing.

In the preferred embodiment, the specific logic employed in data entry also speeds up the repair process implemented by the repair station 4. FIG. 5G shows in detail the process carried out by step 146 of FIG. 5F. Each of the three fields contains the decoded data, as derived from the MICR line. Any character for which the recognition confidence falls below the acceptable level is flagged by the use of a single character, e.g., the "!" character (160).

Accordingly, if a single or small number of characters in a large field need correcting, the repair function allows correcting only the single or few characters marked with a "!".

According to the preferred embodiment of the invention, therefore, if the number of characters entered by the operator is equal to the number of "!" characters in the field being repaired, then only the "!" characters will be replaced (162, 164). The replacement characters are used to replace the "!" characters one for one in the order entered (166). Thus, once the replacement characters are entered, they will automatically replace the "!" characters in the order entered. This saves unnecessary data entry. Only the characters to be corrected need be entered.

According to the preferred embodiment, if the number of characters entered is not equal to the number of "!" characters (164) and less than or equal to (168) the number of characters in the data field requiring repair (including "!" characters), the new data will automatically replace all existing data (170).

Further, according to the preferred embodiment, if the number of characters entered is greater than the number of characters in the data field being repaired (including "!" characters), a warning message requiring the operator to confirm that the new entry is longer than the current data (172) will be displayed. If the operator confirms, then the new data replace the current data (174, 170). If the operator does not confirm, the workstation software resumes at step 160 and the operator may reenter the data.

The screen layout of the repair station is, accordingly, designed to clearly identify what data fields require correction and also to relieve the operator from having to search the screen to find the incorrect information.

The repair screen 179 (FIG. 5H), generated by the repair controller 401 on the display device 402, displays both the front 182 and back 180 image of the check, along with three fields showing the account number 186, check number 188 and amount 190. As mentioned above, a single input field 192 is present on the repair screen 179. Preferably, the back image 180 of the check is displayed on the top of the screen since it is the image least relevant to the repair task. The front image 182 of the check is displayed below the back image 180. Directly below the front image, and aligned with the displayed MICR line 184 are the account number 186, check number 188 and amount 190 fields. The data fields show the values of the three fields as determined by the sort station 2. Alignment with the actual MICR data 184 aids in rapid identification of necessary corrections. The repair function highlights the field being worked on by showing the data in reverse video. At the very bottom of the screen, directly under the three data fields 186, 188, 190, is the single data entry field 192 by which the operator enters the new data for correcting the incorrect data, as described. By utilizing a single data entry field, the operator can focus attention on one location on the screen and avoid wasting time searching the screen for the next area of the screen requiring attention.

d. Image Storage Station 5

With reference now to FIG. 5 and 5I, which show two alternative embodiments of the image storage station 5, the TIFF files 22 are stored on an image storage device 502, which preferably comprises a mass storage device. Further, the image storage station runs a pair of asynchronous processes, described below, the Requester Process and the Retrieval Process, to process incoming requests for check images from a customer workstation 7. In a first embodiment, shown in FIG. 5I, the image storage station 5 comprises an image storage controller 501 coupled to the network 3, an image storage device 502 and a storage space 505. In a second embodiment, shown in FIG. 5, the image storage station additionally comprises an index database controller 510 coupled to the network 3 and an index database device 511.

In the preferred embodiment of the invention employing either embodiment of the image storage station 5 of FIG. 5 or 5I, the image storage device 502 is a Kodak 6800 optical disc library system configured in its "A" option. This configuration consists of a single drive and 50 slots for 50 fourteen inch 10.4 GB optical platters. The device 502 is controlled by the image storage controller 501, preferably a SUN SparcStation 20 computer running AMASS 4.2.1 software. Further, according to the preferred embodiment, the storage device 502 communicates with controller 501 via a SCSI connection for data transmission and an RS-232 connection for robotics control. These are shown only schematically in FIGS. 5 and 5I by the line 501A.

By mass storage device standards, an optical disk jukebox such as the Kodak 6800 is a relatively slow device. This storage device is used in the preferred embodiment of the invention as the preferred image storage device 502, however, because of its half-terabyte capacity, and low cost per unit of storage. Other devices could also be used. In the preferred embodiment, the image storage device 502 contains a single drive, and up to 50 optical platters.

Request File Processing

A customer desiring a check image can cause a workstation 7 to transmit a request file to the host system 8. The operation of the workstation 7 and creation of requests will be described in greater detail below in connection with the detailed description of the workstation. The request file from the workstation 7 is stored on the output queue device 601 (FIG. 2) until it can be processed. The following is a description of request file processing.

Generally, a request file can contain a request for one or more check images. When a requested check image is found, it is queued on the output queue device 601 for later transmission to the customer workstation 7.

Request file processing is performed by a pair of asynchronous processes, the Requester Process and the Retrieval Process.

In the embodiment of FIG. 5, the Requester Process runs on the index database controller 510. In the embodiment of FIG. 5I, it runs on controller 501. The Requester Process analyzes each request made in each request file stored in output queue device 601 to determine whether the requested image exists in the image database 503, and if so, where the image is located. The Requester Process places each request which can be satisfied into a data structure called the request data structure for subsequent processing by the Retrieval Process.

The Retrieval Process reads requests from the request data structure and retrieves the check image files, depositing them in the appropriate user's download directory on the output queue device 601 of the output station 6.

With reference both to FIGS. 5 and SI, TIFF files 22 containing front and back check images and the embedded MICR line and optionally other data are written to the storage space 505, as described above, by the sort station 2 and the repair station 4. The TIFF files 22 awaiting processing by the image storage controller 501 are maintained on the storage space 505 in a round robin directory structure described above. The image storage controller 501 archives the TIFF files 22 to the image storage device 502 where they can be found and retrieved by the Requester Process and the Retrieval Process.

The image storage controller 501 preferably uses a UNIX file system as a means of storing and retrieving files on the image storage device 502. Preferably, the image storage device 502, which in the illustrated embodiment is an optical storage device, is a write-once read-mostly (WORM) type device. Once data is written, it cannot be erased. As will be evident to one of skill in the art, to permit the addition of files and directories to the image storage device 502, the administrative information (also known as meta-data), such as the directory structure of image storage device 502, is maintained on storage space 505.

A UNIX-type file system is used to maintain the data on the image storage device 502. The number of files (e.g. TIFF files 22 or BLOBs 26) stored on the image storage device 502 is potentially enormous, i.e., several orders of magnitude larger than an optimum size for a UNIX-type file system directory. As is known in the art, in a UNIX-type file system, each directory and file name consume resources. Since UNIX-type file systems implement directories as a linear list of file names, directory search and insertion times are, essentially, a linear function of the number of names in the directory. As a consequence, very large directories are inefficient, also known as overburdened. To prevent overburdening of a directory on the image storage device 502, causing, e.g., a deterioration in insertion, deletion and retrieval response times because too many files are stored in a single directory, the invention uses a method of distributing the files over a number of directories on the image storage device 502. As is known on UNIX-type file systems, every file must have a unique file name including its path, i.e. no two files of the same name can be stored in the same directory. In the present invention, an algorithm is used to break down the information unique to a given file into a path and file name.

As input, the algorithm requires a unique string of digits (or characters) corresponding to a file to be stored, and constructs therefrom a unique path and file name insuring sufficient distribution over the file system directories. The algorithm also requires a prespecified maximum directory size. For any given UNIX-type file system, the size can be determined empirically, or as is evident to one skilled in the art, calculated, by using the approximate number of files to be stored, the population characteristics of the unique identifiers, and the characteristics of the file system and the storage device.

With the above-described inputs, the algorithm outputs a path and file name under which the file is stored to the image storage device 502. Unlike hashing algorithms, which are known in the art, it is evident that no decoding algorithm (save removing path separation characters) is required to correlate the path and file name with the underlying unique string identifying the file. It can be seen from the following illustrative embodiment that, for a given unique identifier, the algorithm can be used to limit the number of files which will be placed in any directory. For example, where one to nine digit numbers represent the entire population of unique identifiers, it can readily be seen that the one billion unique files can be stored using ten thousand "root" directories, each comprising one thousand sub-directories, and each sub-directory having one hundred unique files.

The algorithm to segment purely numeric unique identifiers can be described as follows. First, leading zeroes are removed from the unique identifier. Subsequently, the least significant n digits form the rightmost, or file name segment. If less than n digits are present in the unique identifier, all digits present form the rightmost or file name segment. Next, the remaining digits are segmented into a minimum number of segments, such that no segment is longer than m digits. If the segments are not equally sized, the largest segment or segments are used for the most significant digits in the unique identifier. Thus, as is evident from the above, the total number of possible sub-directory entries in a parent directory will be at least as large as the total number of possible entries in each one of its first level sub-directories (children directories). In the preferred embodiment, n=2 and m=4, this can be seen from the following table:

| Unique Identifier Length (Digits) | First Segment Length (Digits) | Second Segment Length (Digits) | Third Segment Length (Digits) |
|---|---|---|---|
| 1 | 1 | | |
| 2 | 2 | | |
| 3 | 1 | 2 | |
| 4 | 2 | 2 | |
| 5 | 3 | 2 | |
| 6 | 4 | 2 | |
| 7 | 3 | 2 | 2 |
| 8 | 3 | 3 | 2 |
| 9 | 4 | 3 | 2 |
| 10 | 4 | 4 | 2 |

Thus, for example, where the unique identifier is seven digits long, or more, the first and second segments are used as the path i.e., the name of subdirectories, and the third segment is used as the file name. Where the unique identifier is six digits long, the first segment is used as the path and the second segment is used as the file name. For example, the unique identifier "123456789" would have a path (i.e., list of directories) and file name of "1234/567/89", whereas the unique identifier "1234" would have a path (i.e., list of directories) and file name of "12/34"

In the preferred embodiments, only digits (0 through 9) (and, as described below, the "." character) are used in the unique identifier. One of ordinary skill can, however, see that the algorithm is equally well adapted to unique identifiers containing any number of characters. Furthermore, in the preferred embodiment, the algorithm is optimized for use with unique identifiers of one to nine digits; however, it can readily be seen that any number of digits or characters could be accommodated.

i. First Embodiment

In a first embodiment (FIG. 51), in order to spread out the files over as many directories as necessary to maintain satisfactory response time, preferably each account is given a separate directory. Although the check images, and therefore the TIFF files 22, in the host system 8 can be uniquely identified by account number, check number and optionally check amount, only part of this information is used in the above algorithm. Preferably, a subdirectory exists for each account for which check images are to be archived. The check number is used, according to the above algorithm, to return segments used for the path within the account directory, and as part of the file name. The amount is appended to the last segment returned by the algorithm to create a file name. Thus, check number 123456 in the amount of $222.22 drawn on account 33333 would have a path and file name, pictorially shown, of:

```
        33333 (directory)
          1234 (sub-directory)
            56.22222 (file name)
```

Accordingly, check number 1234567 for the same amount, drawn on the same account would have a path and file name, pictorially shown, of:

```
        33333 (directory)
          123 (sub-directory)
            45 (sub-directory)
              67.22222 (file name)
```

As can be seen from the examples, the amount is appended to the last segment returned by the algorithm to create a unique file name.

The image storage controller 501 stores each TIFF file 22 which was placed in the round-robin directory structure on the storage space 505. The TIFF file is stored on the image storage device 502 in its appropriate directory, under the name constituted as described above.

(1) Requester Process

With reference to FIG. 5C, a Requester Process is generated (spawned) on the image storage controller 501 by the output controller 602 for each request file on the output queue device 601. The Requester Process writes each check image request therein to a request queue on the image storage controller 501 in order to serialize the individual check requests. See step 90. In the illustrative embodiments, the request queue is a UNIX FIFO queue. The Requester Process reads (92) the request queue in a FIFO fashion, and processes each request independently.

The Requester Process analyzes each check image request in the request queue to determine whether or not one or more TIFF files 22 corresponding to that request, is present on the image storage device 502. The Requester Process uses the algorithm, as described above, to turn the account number, check number and amount into a path and file name of one or more TIFF files 22 which satisfy this request (93). If the amount of the check is not present, a wildcard search, as known in the art, can be performed. If the TIFF file 22 exists, the meta-data on storage space 505 can be interrogated to determine the platter upon which the TIFF file 22 is present. For each request for which a TIFF file 22 is located (94) an entry is inserted in a request data structure specifying the location of the TIFF file 22 which will satisfy the request (98). For example, the path and file name, along with the platter location (volume and side) are passed to the Retrieval Process via a request data structure. Preferably the request data structure comprises the following fields: volume; side; priority; username; customer name; request date; request time; account; check number; check amount; and request number (in batch).

In the case where more than one TIFF file 22 is located to satisfy a particular request, for example, where two checks have the same account and check numbers and no amount was specified in the request, an entry in the request data structure is made for each TIFF file 22, that satisfies the request (98).

If no TIFF file 22 can be located for a particular check request (94), the Requester Process places the request into the request data structure corresponding to the "not found" directory (96), in other words, specifying the location of a "Check Not Found" image.

(2) Retrieval Process

Turning now to FIG. 5D, the Retrieval Process processes each request which has been placed in the retrieval data structure.

In order to minimize platter thrashing, all requests are sorted for retrieval. Preferably, the request data structure is set up to have sortable fields corresponding to the physical characteristics, e.g., platters and sides, of the image storage device 502. Since the Requester Process has determined the location for each request, the Retrieval Process simply sorts all of the requests by platter and then by platter side. The Retrieval Process first checks if there are check image requests pending for the platter currently in the drive (1118). If there are, the Retrieval Process then checks to see if there are any requests for the side of the platter currently under the read heads of the optical storage device (1120). If there are no requests for the current side, the platter is then flipped (1124).

The Retrieval Process then first verifies that the request is made by an authorized user (1110) or an authorized account. This check to confirm that the user is authorized is done by verifying that the account with which the request check is associated is on the user's valid accounts file, which file is maintained on the output queue device 601. Once the user has been verified, the Retrieval Process confirms that the account number of the check requested is in the user's valid accounts file. This is done by reference to the list of the accounts a user is permitted to access, which is maintained in an accounts file on the output queue device 601.

If the user is not authorized, or if the account number selected is not in the valid accounts file, the Retrieval Process will generate a "Check Not Found" check image to return to the user (1116), thus not giving any further information to anyone trying to access an account for which they have not been authorized.

If the user and account are authorized, the image storage device is accessed, and the TIFF file 22 corresponding to the request is read (1122) from the image storage device 502.

The Retrieval Process then re-inspects the request data structure to see if any other requests for this platter are pending (1118). If there are, they are fulfilled as above (1118, 1120, 1110, 1122). If there are no other requests for the current platter, the Retrieval Process requests the platter (1128) with the most outstanding requests in the request data structure, and mounts that platter (1130). The Retrieval Process satisfies each request as described above.

The TIFF file 22 contains images of both the front and back of the check, as well as tagged data fields containing the raw MICR line, the parsed MICR line, the account number, the check number, the amount, and the customer ID.

The Retrieval Process generates two TIFF format files from this TIFF file 22: one comprising the front image (the ".f file") and one comprising the back image (the ".b file") of the check. As discussed above, TIFF tags are utilized to store descriptive data about the check directly in TIFF files 22 and the TIFF format .f and .b files. The MICR line and all of the other non-image tagged data fields are placed in both files. This information may be used by the customer workstation 7 to identify each file and match the .f and .b files to the specific. request. The front image file and the back image file preferably are named utilizing a sequential number scheme to insure uniqueness. The file name extensions may be used to identify front (.f) and back (.b).

All generated "Check Not Found" files are in the TIFF format as well, and contain the requested account number and check number of the check requested. If amount was specified in the request, preferably it too is placed in the "Check Not Found" file if the image was not found. This ensures consistent processing in identifying this image file with the request on file at the customer workstation 7.

ii. Second Embodiment

With reference to FIG. 5, the required throughput of the huge number of TIFF files 22 which must be written to and read from the image storage database 503 residing on the relatively slow optical media creates a bottleneck, thus presenting a performance problem. The TIFF files 22 can not, without the means described below or equivalents to the means described below, be written to the image storage device 502 at a pace comparable to the throughput of the sort station 2. Accordingly, in the first embodiment, there exists a need to cache a greater number of TIFF files 22 in storage space 505 during peak processing times. Thus, the storage space 505 in the embodiment of FIG. 5I allows for temporary storage during peak processing times when the image storage device 502 cannot receive images at the rate at which they are generated. According to the embodiment of FIG. 5, another solution to the problem is to write a smaller number of larger files to the image storage device 502 to improve throughput. This can be achieved by bundling a number of TIFF files 22 into a BLOB 26. The total number of files stored in the image storage device 502 is thereby reduced by a factor of one/the number of TIFF files 22 bundled into each BLOB 26. In the preferred embodiment, fifty TIFF files 22 are bundled into each BLOB 26.

With reference to FIG. 5, the index database 30 resides on the index database device 511 controlled by the index database controller 510. In the preferred embodiment, the index database 30 is accessed using a database engine, e.g., Sybase or Informix program as known to those in the art, and the index database device 511 is a RAID disk array.

TIFF files 22 containing both front and back check images and the non-image tag data are written to the round robin directory structure on the storage space 505 coupled to the image storage controller 510, as described above, by the sort station 2 and the repair station 4. The rate at which these files are created, and therefore become ready for storage, may be greater than the rate at which the individual TIFF files 22 can be indexed and stored by the image storage station 5.

As will be discussed in more detail below, the image storage controller groups the TIFF files 22 in the round-robin directories of the storage space 505 by account number. When a predetermined number of TIFF files 22, preferably for one account, are present, the image storage controller 501 groups these files into a Binary Large Object (BLOB) 26, and writes the BLOB 26 to the image storage device 502. As will be evident to one of skill in the art, the BLOB 26 need not comprise only TIFF files 22 from one account.

Preferably, provision is also made to flush a particular account from the round-robin directories, or all pending TIFF files 22, even when less than the predetermined number of TIFF files 22 are present. This is done, for example, when daily processing for a particular day or account is complete. In that case, a BLOB may be written to the image storage device 502 consisting of less than the predetermined number of TIFF files 22.

The BLOB 26 contains a header 38 and a plurality, illustratively, fifty TIFF files 22 each representative of one check. The BLOB header 38 comprises the fields listed below.

The following fields occur once at the beginning of each BLOB 26:

| Field | Description |
|---|---|
| Byte Order | Intel or Motorola |
| Version Number | Software version |
| Account Number | Self-explanatory |
| Customer ID | Self-explanatory |
| Date committed | Date placed in archive |
| Number of checks | Number of TIFF files 22 in BLOB 26 |
| File length | Total file length |
| CRC value | For error correction |
| The following fields occur in the header 38 once for each TIFF file 22 contained in the BLOB 26: | |
| Check Number | Self-explanatory |
| Amount | Self-explanatory |
| Start Offset | Offset of TIFF file 22 in BLOB 26 |
| Length | Length of TIFF file 22 |

The BLOB 26 also contains each of the plurality of TIFF files 22 stored at the offset and having the length indicated. Once assembled, the BLOB 26 is given a unique sequence number.

According to the algorithm described above, the sequence number is used to determine a path and file name on the image storage device 502 at which to store the BLOB 26. The image storage controller 501 then writes the BLOB 26 to the image storage device 502 under the path and file name determined. After the write function has been successfully completed, the image storage controller 501 sends the account number for the the check images stored in the BLOB 26, along with the check number and amount associated with each of the TIFF files 22 and the sequence number of the BLOB 26 in which they were stored, to the index database controller 510.

The index database controller 510 then creates an index record 28 in the index database 30 for each of the TIFF files 22 stored on the image storage device 502, i.e, in a BLOB 26. The TIFF files 22 that have been written on the BLOB 26 are then deleted from storage space 505.

Each index record 28 contains information pertinent to one check 1, for example, an index record may include:

| Field | Description |
|---|---|
| Account Number 34 | Self-explanatory |
| Check Number 35 | Self-explanatory |
| Amount 37 | Self-explanatory |
| Work Date 39 | Date check was processed |
| Location Code 40 | Image storage device 502 containing the BLOB 26 (i.e., support for multiple image storage devices) |
| BLOB File Name 41 | Sequence number for BLOB 26 |

Preferably, the location code 40 (that indicates which image storage device 502 has been used to store the image where multiple devices 502 are used), and the BLOB file name 41, which is a sequential number assigned to the BLOB 26, together, form a BLOB pointer 36.

Since TIFF files 22 in the host system 8 can be uniquely identified by account number, check number and optionally check amount, this information, as stored in the index record 28, is preferably used as primary keys to the index database 30. The work date may be used as an alternate key.

(a) Requester Process

With reference to FIG. 5C, a Requester Process is generated (spawned) on the image storage controller 501 by the output controller 602 for each request file on the output queue device 601. The Requester Process writes each check image request therein to a request queue on the index database controller 501 in order to serialize the individual check requests. See step 90. In the illustrated embodiment, the request queue is a UNIX FIFO queue. The Requester Process reads (92) the request queue in a FIFO fashion, and processes each request independently.

The Requester Process performs a search of the index database 30 for each check image request in the request queue to determine whether or not an index record exists corresponding to that request, and thus, the check image is present on the image storage device 502. Where the check image is present, the Requester Process obtains its location e.g., a BLOB pointer 36 and passes this information to the Retrieval Process via the request data structure. Preferably the request data structure comprises the following fields: volume; side; priority; username; customer name; request date; request time; account; check number; check amount; request number (in batch); and the sequence number of the BLOB 26 in which the TIFF file 22 exists.

For each check image request, to determine whether a corresponding TIFF file 22, and therefore a check image is present on the image storage device 502, the Requester Process queries the index database 30 (93). Preferably, for each request for which an index record 28 is located, the meta-data on storage space 505 is interrogated to determine the platter and side upon which the BLOB 26 containing the corresponding TIFF file 22 is located (93). If an index record is found (94) an entry is then inserted in the request data structure specifying the location of the BLOB 26 containing the TIFF file 22 which will satisfy the request (98). In the case where more than one index record 28 is located to satisfy a particular request, for example, where two checks have the same account and check numbers and no amount was specified in the request, an entry in the request data structure is made for each index record 28, and thus TIFF file 22, that satisfies the request (98).

If no index record 28 is found for a particular check request (94), the Requester Process places the request into the request data structure corresponding to the "not found" directory (96), in other words, specifying the location of a "Check Not Found" image.

(b) Retrieval Process

Turning now to FIG. 5D, the Retrieval Process processes each request which has been placed in the retrieval data structure. The Retrieval Process in the second embodiment functions essentially the same as the Retrieval Process of the first embodiment of the image storage station 5. However, in this second embodiment Retrieval Process, once the user and account are authorized, and the image storage device 502 is accessed, instead of reading a TIFF file 22, the BLOB 26 containing the desired TIFF file 22 is read. Thus, turning to FIG. 5E, for every read request (e.g. step 1122 of FIG. 5D), the Retrieval Process reads the BLOB 26 containing the TIFF file 22 from the image storage device 502 (1131). The TIFF file 22 is then extracted from the BLOB 26 (1132) using the header 38 information. Subsequently, as performed in the first embodiment Retrieval Process, .f (front) and .b (back) files are created from the TIFF file 22.

e. Output Station 6 i. Communication Station 600

Turning to FIG. 2, the communication station 600 includes an output controller 602 that controls the electronic interface between the customer workstation 7 and the host system 8. A communication gateway 603 is provided for communication between the host system 8 and the individual workstations 7. The communication gateway 603 is coupled to the output controller 602. For example, the communication gateway may comprise six modems 604 and/OR an ISDN controller 605. In the preferred embodiment, the modems 604 may be Telebit 3000 14,400 bps modems providing dial-up capability, and the ISDN controller 605 may, for example, be a Combinet 400. Six modems 604 are preferred to support, for example, six concurrent dial-up sessions with six customer workstations 7.

The output controller 602 is also coupled to the output queue device 601. The output queue device 601 is used to store customer, user and account information, check requests transmitted by customers, and check image files that are to be automatically downloaded to customers' workstations 7 via the communication gateway 603 mentioned above. In the preferred embodiment, the output queue device 601 may be a RAID disk array.

In the preferred embodiment, the output controller 602 may be used to create customers, users and accounts. These functions are described in more detail below.

ii. Export Station 610

The Export Station 610 controls bulk export of check images. For example, check images can be sent to clients on a periodic cycle, e.g., daily, weekly, monthly, etc. A variety of export media are available, for example, CD-ROM and digital tape.

The bulk export controller 611 is linked to the Network 3 and one or more recording devices, such as a CD-ROM recorder 613, a tape drive 612 or a worm drive 614. Check images can be recorded, using the recording devices (612, 613, 614), for forwarding or archival purposes. The check images recorded for forwarding to a customer are in the form of .b (back) and .f (front) files, discussed below.

The Export Station 610 controls all physical devices for media output, i.e., output to CD-ROM, tape or other media. Export of check images via electronic transmission are controlled by the output controller 602. Each output media necessitates different data preparations, as are known in the art. The Export Station 610 controls these preparations.

f. Customer/User Subsystem

A Customer/User Subsystem is provided both to control and maintain customer and user access, and to maintain each customer's data integrity. The Customer/User Subsystem data resides on the output queue device 603 and the Customer/User subsystem is preferably operated on the output controller 602.

A Customer maintenance function is provided which allows a host system 8 operator to establish and maintain customers and accounts. When a customer is established in the host system 8, a customer directory is created, this directory may reside on the index database device 511.

Likewise, when an account is added, the Customer maintenance function automatically establishes a sub-directory for that account within the customer's directory. The Customer maintenance function also allows the entry and maintenance of users. Each new user added to the system is associated with an already existing customer and is assigned a directory on the output queue device 601. A password is established for each user. A list of the accounts the user is permitted to make requests against are maintained in a valid accounts file in the user's directory.

g. Mass Storage Considerations

Check images are uniquely identified by account number, check number and optionally amount. These three fields comprise the key to a single check/single file implementation. Performance limitations of the mass storage device, and in particular, the optical jukebox used in the preferred embodiment, make a single check/single file implementation infeasible for the present system. An optical jukebox is preferably used in the invention in order to provide large amounts of cost effective storage. Thus, a new implementation, i.e., multiple check/single file system, is provided by the invention.

In view of the limit on the number of files imposed by the AMASS 4.2.1 implementation of the UNIX File System used in the preferred embodiment (other file systems could be used), and in order to improve throughput in writing to the mass storage device 502, the invention implements a multiple check/single file database as follows:

Individual check image files (TIFF files 22) are grouped in batches (BLOBS 26) prior to being written to the image database 503 on the image storage device 502, thus effecting a multiple check/single file database. In accordance with the invention, by grouping, for example, fifty check image files (TIFF files 22) into a single larger file (BLOB 26) of approximately 1 MB, write time to the device 502 is reduced from approximately 20 seconds down to approximately 2 seconds.

In order to maintain access to each check in the fifty checks/single file model, a front-end database (index database 30) is utilized. The index database 30 is keyed by account number, check number and optionally amount. For each TIFF file 22, the index record 28 of the index database 30 points to the fifty check file (BLOB 26). This pointer is used to extract the 50 check file from the storage device 502. The particular TIFF file 22 is extracted from the BLOB 26 by pointers contained in a header in the BLOB 26 itself. In the preferred embodiment, to facilitate accessing a single TIFF file 22 from the BLOB 26, offset pointers are used to identify the starting offset of each of the TIFF files 22 in the BLOB 26. These offsets are maintained as a table at the start of the BLOB 26.

3. Customer Workstation 7

The host system 8 has now been described. The following description relates to the structure and function of a customer workstation 7, used by a customer to request and retrieve check images from the host system 8.

Referring again to FIG. 2, the customer workstation 7 comprises a workstation computer 701 coupled to a local storage device 702 and optionally to a printer 703. The workstation computer 701 is also coupled to a display 701A, a keyboard input device 701C, and preferably to a mouse or other pointing device 701B. The workstation computer 701 may be a 486 based personal computer running the Microsoft Windows™ operating environment. Another operating system could also be used, e.g. IBM OS/2 or Sunsoft Solaris. The local storage device 702 can be a local hard disk drive or a connection such as a network connection to other storage space which is accessible to the workstation computer 701. The storage device includes a plurality of directories 702A, 702B. Directory 702A stores files including the workstation software (not shown) and other data 710, 715, 720, 725, the details these files will be discussed in more detail, below. The workstation computer is preferably coupled to a modem 10 which can be used to communicate with the host system 8 over a dial-up telephone line 11. The customer workstation 7 can, however, be coupled to any suitable communication device instead of the modem 10, and thereby communicate with the host system 8.

In the preferred embodiment, each workstation computer 7 is a Microsoft Windows™ based system that allows users to request, receive, and display images of checks that have previously been captured and stored in the above described host system 8. It will be apparent to one of skill in the art that the described workstation software can be written for any window based or non-window based operating environment, and reference herein to the functionality of the workstation software as it pertains to Windows™ is merely for convenience. Furthermore, it is understood that the organization of the functions, menus and sub-menus of the workstation software was designed with the Windows™ operating environment in mind, and can be easily modified to accommodate and/or take advantage of any operating environment upon which one of skill in the art would implement it.

As already described, the host system 8 captures and stores images of checks for the customer's designated accounts and maintains them in an archive for up to seven years or more. Workstation software resides on the local storage device 702 and is accessible to the workstation computer 701. The workstation software allows the user to initiate requests for check images, download those images to the customer workstation 7, and view or print the downloaded images as desired. The workstation software also provides utilities to assist the user in managing the number of images retained on the local storage device 702. In addition, if the user has a word processor, for example, Microsoft Word™ or any other suitable word processing software, available to the workstation, the workstation software can be configured to allow automatic insertion of check images into pre-defined word-processing documents.

In a preferred embodiment, the workstation software provides all communication, logon, file transfer, display, and print capabilities the user will need to request, receive, display, and print the check images.

Microsoft Windows™ is a graphical environment that allows applications to run with a common set of procedures for organizing, controlling, and accessing the information on the screen. As well known, it utilizes a pointer, sizable windows, scroll bars, buttons, drop down menus, drop down boxes, icons, and a variety of other graphical user interface devices that give the user great flexibility in interacting with the workstation 7.

Windows™ is well-known and need not be addressed in detail here. For more information, the reader is referred to one of the many texts and manuals that have been written on the subject. However, a few general items should be noted. As will be evident from the following, Windows™ generally provides several different ways of performing most functions. To perform a given operation, the user may have the option of using one or more of the following: a mouse or other pointing device, the keyboard, function keys, toolbar buttons, etc., as well known. Often there are multiple ways of initiating or carrying out a given operation. The system of the invention follows this philosophy, and the descriptions in this patent application will not repeatedly describe all the methods for initiating or carrying out a given operation in the Windows™ environment. However, these methods generally include the use of a mouse or other pointing device or a keyboard to access a menu or toolbar, the latter discussed in more detail below.

Figure 6:
FIG. 6 shows the top level menu options presented at the workstation screen.

In the preferred embodiment, at the workstation 7, menus appear on a display device as a series of words across the top of a window, as shown, for example, in FIG. 6, displaying the top level menu, also known as the primary or main menu (as is customary in Windows).

Each selection on the menu has one of its letters underlined, and can be accessed with either the keyboard or the pointing device. As is customary in Windows™, only the functions currently available are displayed in dark type. Functions that are unavailable are "greyed" out (displayed in lighter type). A greyed function becomes darkened when it becomes available.

It is a general convention to reference a particular operation by listing each menu and option which must be selected to initiate that operation. For example, File/Exit means select the Exit option from the File menu. This nomenclature is well known in the art, and will be used, as appropriate, herein.

Additionally, graphical user interfaces such as Windows™ have "buttons." A button is a region of the screen which may look like a real button or key on a keyboard, and when pointed to and clicked upon using either the pointing device or keys on the keyboard, selects the option described by the screen button. Alternatively, a touch sensitive screen, as known in the art, could be used. Often an OK button is used to indicate that the input on a screen is accepted, or that one may continue. One button is normally programmed to be the default button; the default button is activated, as if it was clicked, when the <Enter> or <Return> key is depressed.

As in Windows™ generally, control buttons may be activated by appropriate devices, e.g., by clicking the left mouse button on the desired button or by pressing Alt and the underlined letter of the desired button, e.g., Alt-Y for Yes.

a. Startup

The workstation software is installed on the customer workstation, as is customary in Windows™. By default, the workstation software is stored in the default drive of the local storage device device 702 and resides in the default directory 702A. In the preferred embodiment, the installation process causes the operating environment to display an icon representative of the workstation software. This icon is displayed so that a user may easily access the workstation software.

The workstation software is started as is appropriate from the operating environment. In Windows™ this may usually be performed by "double clicking" on an icon representing the workstation software. In the preferred embodiment, when the workstation software is started, an initial screen is provided which displays the copyright and other information. Clicking on the OK button (the default button) or pressing rEnter>allows the user to proceed.

In the preferred embodiment, the initial screen is replaced with a prompt requesting the user to decide whether to perform image file maintenance at that time. A Yes and a No button are presented to the user. Image file maintenance provides an opportunity to purge old items and free up space on the local storage device 702. The user must select the Yes or the No button. Clicking the No button (the default button) or pressing <Enter> causes the workstation software to proceed to its main window as depicted generally in FIG. 8.

Clicking the Yes button proceeds to image file maintenance prior to going to the main window. In a preferred embodiment, image file maintenance can be performed at another time by choosing Options/Image File Maintenance from the main window. A discussion of image file maintenance and the main window can be found below.

b. General Procedure

Figure 27:
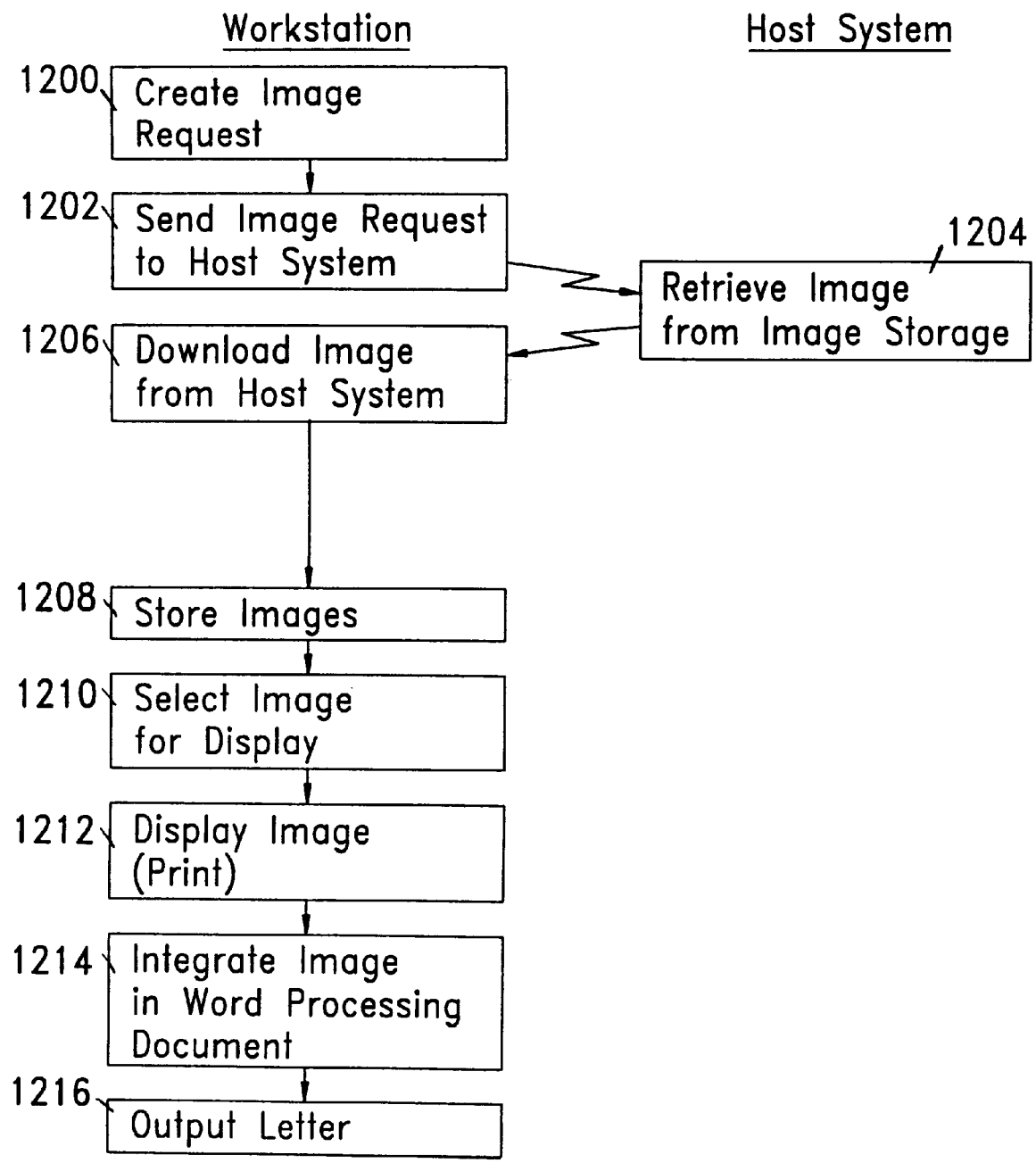
FIG. 27 shows the overall flow process of creating requests for checks at a workstation, retrieving check images, downloading the images to the workstation for display, and creation of correspondence incorporating the check images to be sent to a customer.

After startup, the general methodology for requesting and retrieving check images from the Workstation consists of the following general processes, as shown in the block diagram of FIG. 27.

1. Creating an image request file (1200);
2. Transmitting the request file to host system 8 (1202)
3. Awaiting retrieval of the requested images by the host system 8 (1204);
4. Downloading (1206) requested images from host system 8;
5. Storing the requested images on local storage (1208);
6. Selecting images for display (1210);
7. Displaying and/or printing selected images (1212);
8. Optionally merging the check images into a word processing template (1214); and
9. Optionally printing a letter comprising the check images (1216).

i. Local Storage Device 702

The local storage device 702 provides for storage and retreival of information relating to the workstation 7 operation. Preferably, the local storage device 702 has a default directory 702A which stores the workstation software, data files used by the workstation software, and .f and .b files as they are received. The storage device 702 also has an image directory 702B for storage of .f and .b files (front and back check images) once they have been processed by the workstation software. Preferably, the image directory 702B is a sub-directory of the default directory 702A.

The main data file 710, the account data file 715, the request file 720 and the service mode file 725 are all preferably stored in the default directory 702A. The main data file 710, for example in dBase format, preferably comprises a record 711 for every check image stored in the image sub-directory 702B and for each check request which has been entered by the user. The account data file 715 is used to store all of the current accounts, and the service mode file 725 is a list of available service modes, e.g., Overnight and Same Day. The request file 720 contains the most recently compiled list of requests for transmission to the host system 8, whether or not it had been transmitted.

To free disk space on the local storage device 702, the Options/Image File Maintenance procedure described below removes both unwanted check images and their associated references in the main data file 710. The database schema for each record 711 in the main data file 710 is reproduced:

ACCT_NO Account number associated with the check request.

CHECK_NO Check number associated with the check request.

AMT Amount of check, if entered by user in the check request.

SER_MODE Service mode selected by user, e.g. Overnight or Same Day.

DATE Date check image (.b and .f) files received for this request.

REQ_DATE Date the check request is entered into the system.

REF_NO User assigned reference field.

STATUS Status of the check request, e.g., Request, Pending, Received, Exported.

CHK_FRNT File name of the file containing the image of the front of the requested check.

CHK_BACK File name of the file containing the image of the back of the requested check.

When the user enters a request, at least CHECK_NO is supplied by the user, and, as described below, the ACCT_NO and SER_MODE fields have default values. Additionally, for each check request, the REQ_DATE is set to the date on which the request is entered and the STATUS is initially set to Request. When the request file 720 is successfully transmitted to the host 8, the STATUS field for each transmitted request is set to Pending.

As .b and .f files are received from the host 8, they are placed in the default directory 702A. As previously described, the .b and .f files are in TIFF format and contain tag fields containing data about the check. This data includes the account and check number and the check amount. Thus, after receiving a download from the host 8, the workstation software scans each of the newly received image (.b and .f) files, retreives the data about the check from the tag fields, and associates the files with a "Pending" request by matching account and check number, and if present, amount. When a match is found, the main data file 710 fields are updated as follows:

AMT If not entered by the user, this field is updated with the amount of the check.

DATE Todays date is stored in this field.

STATUS Is set to Received.

CHK_FRNT The file name of the .f file corresponding to this check is stored here.

CHK_BACK The file name of the .b file corresponding to this check is stored here.

If .f and .b files are found but cannot be correlated with any "Pending" request, a new record in the main data file is created, the .f and .b file names are entered, and the status is set to "Export". This indicates that the check was exported, as opposed to requested, from the host 8.

Finally, once the records 711 in the main data file 710 are updated, the .f and .b files are moved to the images subdirectory 702B.

In addition to occuring when a download is complete, this procedure also occurs when the workstation software is started. This permits the .f and .b files delivered on another media, e.g. a CD-ROM, to be copied to the default directory 702A and processed by the workstation software when it is started.

ii. Host 8/Workstation 7 Communication Protocol

To send or retreive data, the customer workstation 7, under the control of the workstation software, communicates with the host system 8 over a communication link 11 (see FIG. 2). In one embodiment, the customer workstation uses a modem 10 to establish a communication link 11 with the host system 8. Whether the customer workstation 7 connects with the host system 8 to send or retreive data, the host system 8 requires that the user log-in to the host. Once a user, via the workstation 7, is logged into the host system 8, the host system 8 provides a menu of choices to the workstation software. The workstation software selects send, receive or exit from the menu, and, following a typical communications protocol, delivers or retreives the desired data.

The complexity of the protocol is masked from the workstation 7 user by the workstation software, which only requires minimal interaction from the user.

To establish a communication session with the host system 8, the workstation software causes the modem 10 to dial the modem 604. The modem 604 is pre-programmed to answer, whereupon the modems 10, 604 negotiate and establish a connection, as is known in the art.

Figure 28:
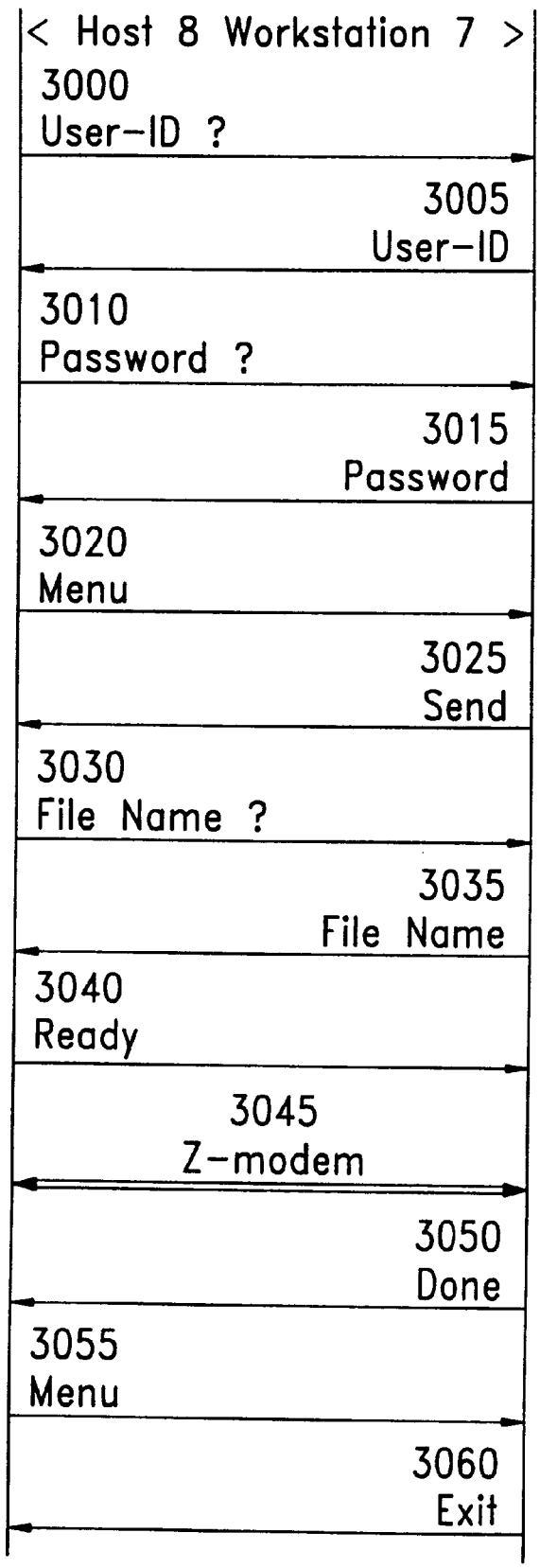
FIG. 28 depicts the communication protocol used between the host system and a customer workstation for transmitting requests to the host.
Figure 29:
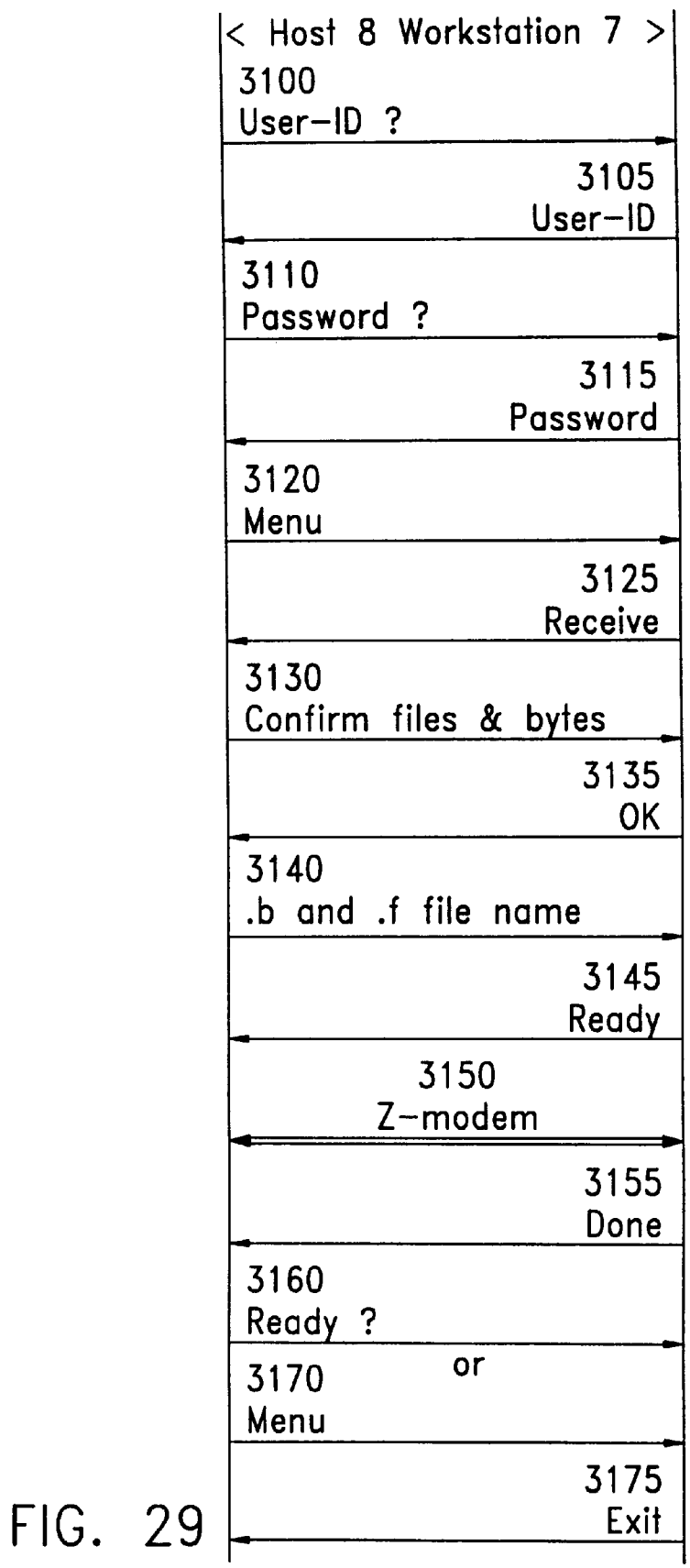
FIG. 29 depicts the communication protocol used between the host system and a customer workstation for downloading check images.

FIG. 28 pictorially shows the protocol between the host 8 and the workstation 7 for uploading the check request file 720, after a connection is established. FIG. 29 pictorially shows the protocol between the host 8 and the workstation 7 for downloading .f and .b files after a connection is established. Much of the protocol for send and receive is similar, and thus reference will be made to both figures where appropriate. Communications time-outs, as known in the art, are used in case of protocol failure.

Initially, the host system 8 sends a request for a user-ID to the workstation 7 (3000, 3100). Once this message has been received, as described above, the workstation software presents the user with a log-in screen, requiring the user to supply a user-ID and password. The workstation 7 then responds to the host 8 by transmitting the user-ID as it was entered on the log-in screen by the user (3005, 3105). Upon receiving the user-ID, the host 8 sends a request for a password to the workstation 7 (3010, 3100), which responds with the password as entered by the user (3015, 3115).

If the host system 8 is unavailable to send or receive data at the present time, it will respond with a message indicating that fact (not shown). The workstation 7 will notify the user that the host 8 is unavailable at this time, and disconnect. Otherwise, the host 8 verifies the user-ID and password with a database of user-IDs and passwords stored on the output queue device 601. If the user-ID and password are not accepted, the host 8 retransmitts a request for the user-ID to the workstation (3000, 3100). Accordingly, the workstation 7 will again obtain a user-ID and password from the user. This continues until a valid user-ID and password are received. Alternatively, the host system 8 terminates the connection when a prespecified number of invalid user-ID/password combinations are received from the workstation 7.

Once the user-ID and password are verified, the host 8 transmits a menu to the workstation 7 (3020, 3120). The transmitted menu provides the workstation 7 options to send to, receive from, or exit the host system 8.

Now, with reference to FIG. 28 showing the upload specific portions of the protocol (i.e., transmissions between the workstation 7 and the host 8 to forward requests to the host 8), the workstation 7 transmits the menu selection indicating it will send a file (3025). The host 8 responds by requesting the name of the file to be transmitted (3030). The workstation 7 then transmits the name of the request file 720 it will transmit (3035).

As discussed above, prior to dialing into the host 8, the workstation 7 assembles the untransmitted requests into a request file 720 to be transmitted to the host 8.

Upon receiving the file name, the host 8 transmits a ready signal to the workstation 7 (3040) and a file transfer is initiated, e.g., using the Z-modem protocol, transmitting a copy of the request file 720. Z-modem file transfer is well known and will not be discussed herein. Once the workstation determines that the file transfer has been successfully completed, it transmits a signal to the host indicating that it is done (3050) and the host 8 responsively transmits the menu (3055). The workstation then responds to the menu by choosing to exit (3060), and terminates the connection, as is known in the art, by instructing the modem to hang up.

If the file transfer is successfully completed, the workstation software will appropriately update the status field in the records 711 of the main database 710 from Request to Pending. If the transfer is not successfully completed for any reason, the status fields in the records 711 of the main database 710 are not updated. The status database 710 will be discussed in more detail below.

Now, with reference to FIG. 29 and the image download specific portions of the protocol, the workstation 7 transmits the menu selection indicating it will receive a file (3125). The host 8 responds, if there are files awaiting download, by transmitting the number of files to be transmitted and the total size of the transmission, requesting confirmation of the transmission from the workstation 7 (3130).

If no files are awaiting download, the host 8 transmits a message indicating this (not shown). The workstation 7 responds with an acknowledgement (also not shown), and the host 8 transmits the menu (3170). Since no files are available to download, the workstation 7 transmits an exit (3175) and disconnects.

Preferably, prior to connecting with the host, and in any event prior to responding to the hosts message (3130) the workstation software determines the space on the local database 702 available to store incoming data. Determining the amount of space available on a storage device is well known in the art. The workstation software then determines whether the local database 702 has the available capacity to store the host 8 transmission. If sufficient storage capacity is available, the workstation software indicates to the user the magnitude of the download, and requests confirmation. If sufficient space is unavailable, or if the user chooses to abort the download, the workstation 7 transmits a message indicating it is not ready to accept a download (not shown). The host 8, therefore, retransmits the menu (3170) and the workstation 7 then transmits an exit (3175) and disconnects.

If, however, there is sufficient space to store the download, and the user chooses to download data now, the workstation 7 transmits a confirmation of the download to the host 8 (3135). Once confirmed, the host 8 sends the names of the front and back of the first check to be transmitted (3140), and the workstation acknowledges receipt by indicating that it is ready (3145). A file transfer protocol, e.g., Z-modem, is now used to transport the .f and .b files from the host system 8 to the workstation 7 (3150), where the incoming files are stored in the default directory 702A.

The workstation 7 indicates that it has detected completion of the file transfer by sending a message to the host 8 (3155). If more files are ready to be transmited, the host 8 transmits a ready message (3160) to which the workstation responds, as above, with a confirmation of the download to the host 8 (3135). This is repeated (3135–3160) until all ready files are transmitted. When all files are transmitted, instead of the ready message (3160), the host 8 re-transmits the menu (3170). The workstation 7 responds with an exit (3175) and disconnects from the host. Following disconnect, the records 711 in the main database 710 are updated as described above.

c. The Main Window

Figure 7:
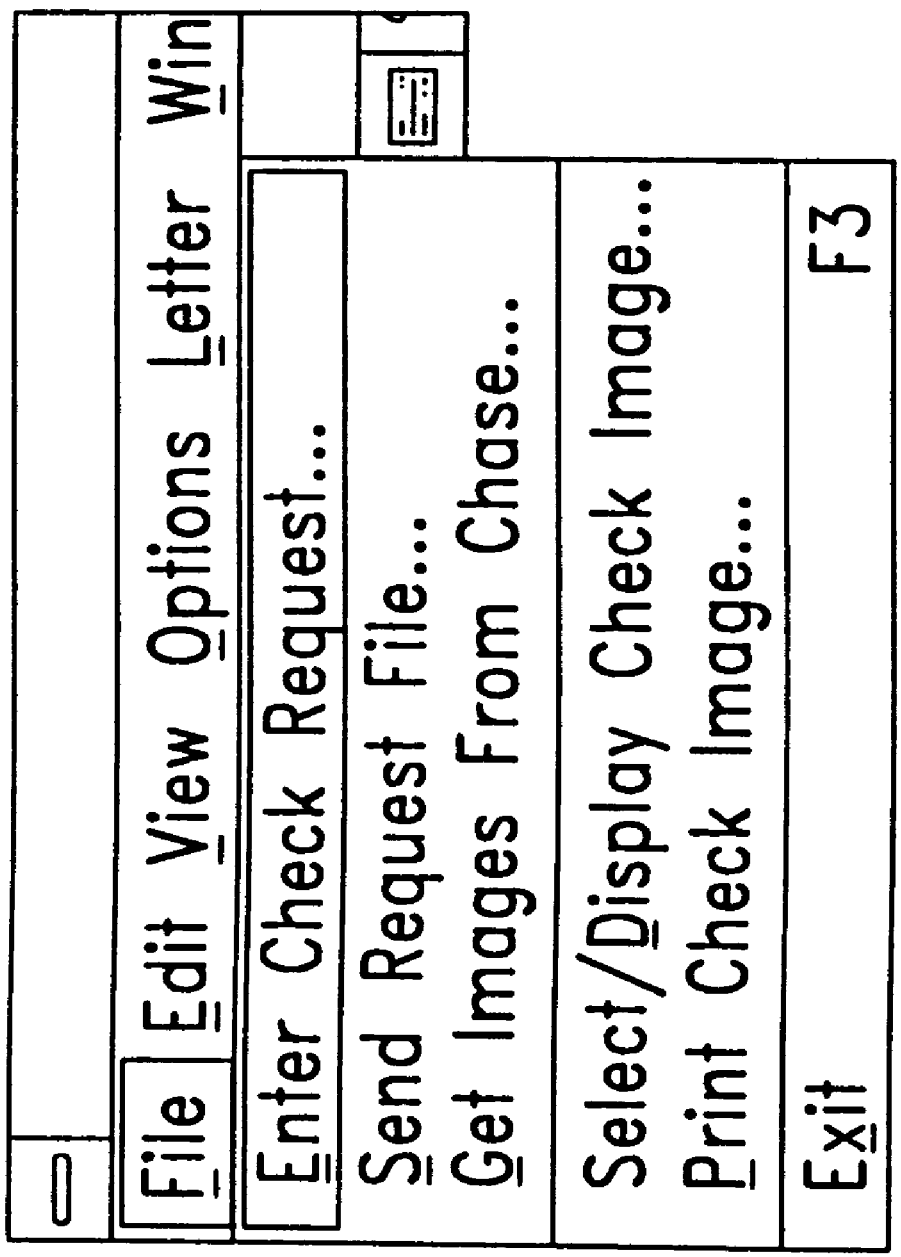
FIG. 7 shows functions under the "File" option in the top-level menu of FIG. 6.
Figure 8:
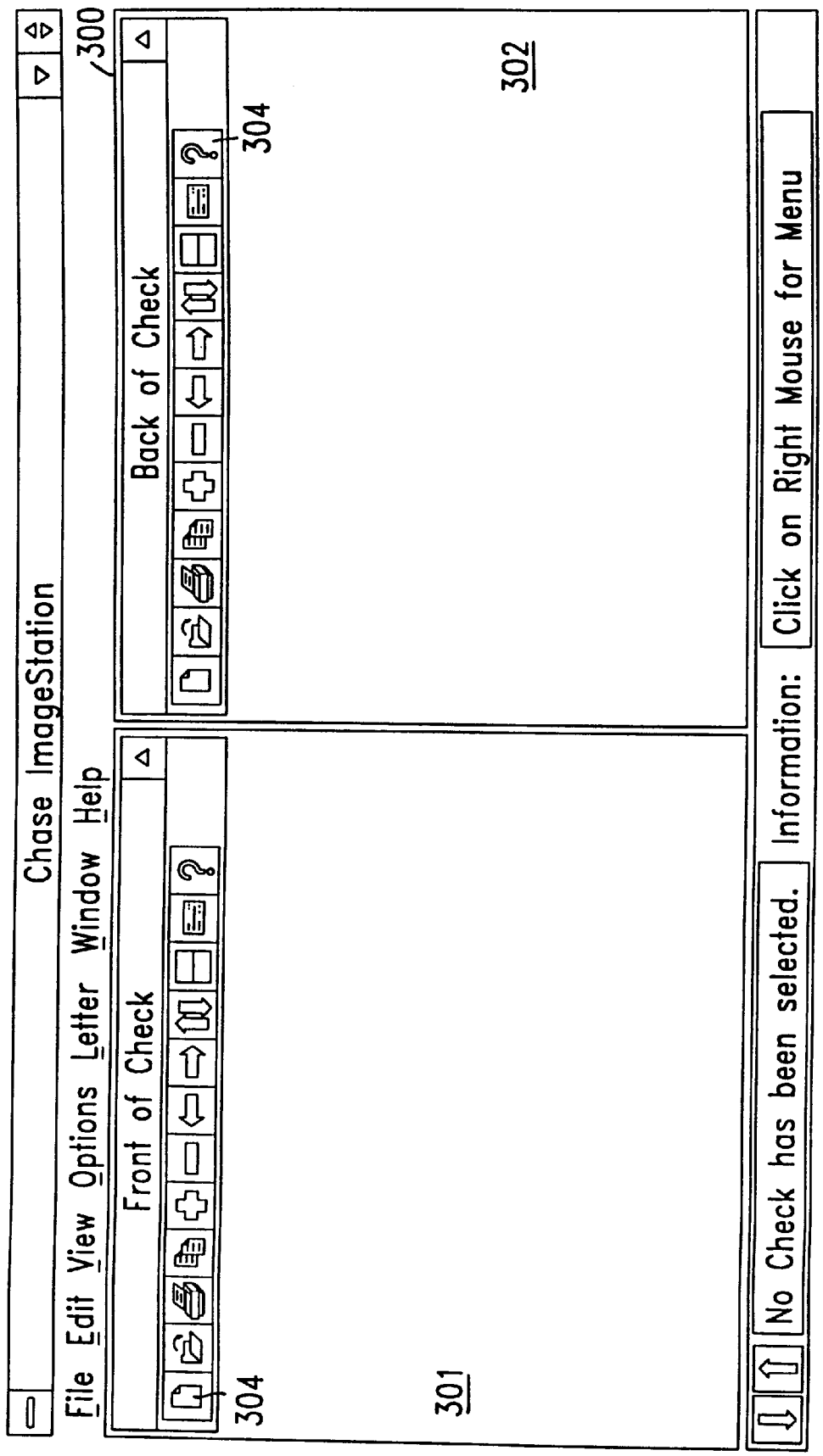
FIG. 8 shows the front and back check image window screen.

As is customary in Windows™, the workstation software runs in a parent window or main window 300 which is generally depicted in FIG. 8. The main menu portion of the main window is also shown in FIG. 6. As is conventional in Windows™, when selected (or clicked on), each menu option displays a box containing another menu, sometimes called a sub-menu, containing options. FIG. 7, for example, shows the sub-menu of the File selection on the main menu.

The main window 300, shown in FIG. 8, contains two sub-windows 301 and 302, one for the front and one for the back of the check. Each sub-window has its own toolbar 304 containing buttons that can be selected to perform various file and image manipulation functions. As will be discussed in more detail below, all the functions available in the toolbar 304 are also available within the parent window 300 menu structure. As is the ordinary case in Windows™, only one sub-window can be active at a time. A window (main or sub) can be made active in the ordinary ways in which it is done in Windows™, for example, by clicking a mouse pointer anywhere inside the window. A window will indicate that it is active by its title bar and border turning to the "active" color, as conventional in Windows™.

The menus are generally organized to reflect the above general order of processing flow.

A list of each sub-menu option and a short description follows:

File

Enter Check Request . . . Allows the user to enter data necessary for requesting a check image.

Send Request File . . . Allows the user to transmit check requests created with Enter Check Request to the host system 8.

Get Images From Chase . . . Allows the user to retrieve check image files corresponding to the transmitted check requests from the host system 8.

Select/Display Check Image . . . Allows the user to select a check image from all those resident in the user's hard disk and display that image on the screen.

Print Check Image . . . Causes the front and back of the check image displayed to be printed.

Exit Exit the workstation software.

Edit

Copy Copies the check image in the active window to a temporary storage area, e.g., the Windows™ clipboard.

View Image manipulation functions that will only affect the active sub-window.

Enlarge Check Enlarges the image in the window from which it was activated. Preferably function key F4 or the "+" key also enlarges the image.

Reduce Check Reduces the image in the window from which it was activated. Preferably function key F5 or the "−" key also reduces the image.

Rotate Image Right Rotates the image 90° to the right in the window from which it was activated. Preferably function key F6 also rotates the image to the right.

Rotate Image Left Rotates the image 90° to the left in the window from which it was activated. Preferably function key F7 also rotates the image to the left.

Invert Image Rotates the image 180° in the window from which it was activated. Preferably function key F8 also inverts the image.

Reverse Video Toggle the image to/from reverse video, i.e., white on black, in the window from which it was activated. Preferably function key F9 also produces the same result.

Normal Reset, or returns the image to normal, i.e., size, orientation, and video. Preferably function key F11 also returns the image to normal.

Next Check Using the presently selected sort order, displays the check image of the check following the displayed check. Preferably the key combination control-X also displays the next check.

Previous Check Using the presently selected sort order, displays the check image of the check preceding the displayed check. Preferably the key combination control-P also displays the previous check.

Options

Setup . . . Allows the user to configure workstation software.

Account Maintenance . . . Allows the user to add and delete accounts for which checks can be requested.

Image File Maintenance . . . Allows user to free disk space by removing image files that are no longer needed/wanted.

Letter

Select Document . . . Allows user to create a letter containing check images.

Options Permits selection of default mode, view or print, for letter containing check images.

Window

Cascade Resizes and layers the front and back windows.

Tile Resizes and arranges the front and back windows side by side.

Arrange Icons If sub-windows are "minimized," arranges the icons for the sub-windows within the main window.

1 Back Makes the back of check window active.

2 Front Makes the front of check window active.

Help As well known, in computer programming, it is conventional to provide a help facility which can provide information to a user in the event the user needs assistance in operating the program. In a preferred embodiment, the help option provides the following:

Contents Invokes a table of contents for the help function.

Search for help On . . . Allows user to search for a topic on which help is desired.

Using Help allows user to select assistance by topic.

About Chase Imagestation . . . Display credit screen and version number.

As discussed above, menu and sub-menu options that are currently available are shown in dark type on the menus and sub-menus. The inactive options are "greyed" out. An inactive option will become active, and it will be displayed in dark type, when appropriate.

d. The Toolbar

Figure 9:
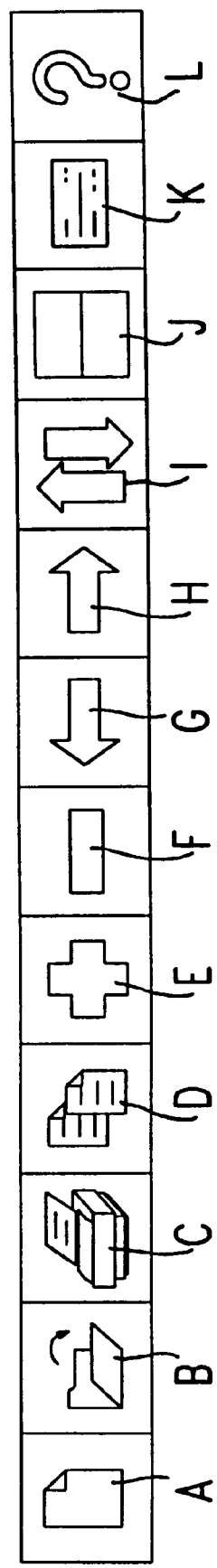
FIG. 9 shows the tool-bar displays shown in FIG. 8.

As discussed, each display sub-window of FIG. 8 has a toolbar as shown in more detail in FIG. 9. Toolbar buttons can be used as another way to perform the same functions that can be performed by selecting the menu and sub-menu selections. The toolbar is for the user's convenience; since it is often easier to access a toolbar button than the menus, the toolbar contains many frequently used functions. To select a toolbar button, the mouse or other pointing device 701B is placed on that button and the appropriate pointing device button (usually the left mouse button) is clicked. In the preferred embodiment, the toolbar buttons are programmed to correspond to sub-menu functions. The toolbar buttons may also configured by the user, permitting the user to select which buttons (and therefore which functions) are available on the toolbar. Further, the toolbar buttons may be automatically reconfigured by the workstation software to correspond to the most frequently used functions, and the user vary the number of buttons on the toolbar.

The toolbar buttons and their equivalent menu options are listed below:

| Reference: | Menu Command |
| --- | --- |
| A | File/Enter Check Request |
| B | File/Select/Display Check Image |
| C | File/Print Check Image |
| D | Edit/Copy |
| E | View/Enlarge Check |
| F | View/Reduce Check |
| G | View/Rotate Image Left |
| H | View/Rotate Image Right |
| I | View/Invert Image |
| J | View/Reverse Video |
| K | View/Normal |
| L | Help/Contents | e. Description of Menu and Sub-menu Items

The following is a description of selected main menu options and their sub-menu options. The order generally follows the structure of the menus shown. The menu items not covered in the following description are features that are readily understood from the description above taken in conjunction with standard Windows™ features and the context of the workstation software functions described herein.

i. File

As mentioned previously, the File sub-menu options are organized to reflect the general order of processing flow, and are shown in FIG. 7.

These options are described in the following sections.

(1) File/Enter Check Request

The File/Enter Check Request function allows the user to create the file of check requests to be transmitted to the host system 8. Data can be entered in a spread-sheet like screen (FIG. 16). The program functions necessary to generate the screen of FIG. 16 are well known to those of skill in the art, and need not be described in detail herein. Once data is entered, items can be added, modified, or deleted as desired. The data can be printed as a hard copy report. Moreover, the requests need not be entered all at once: the user may enter some items, exit this function, and return at a later time to enter more. The file will remain available for editing at the workstation 7 until it is transmitted to the host system 8.

Figure 10:
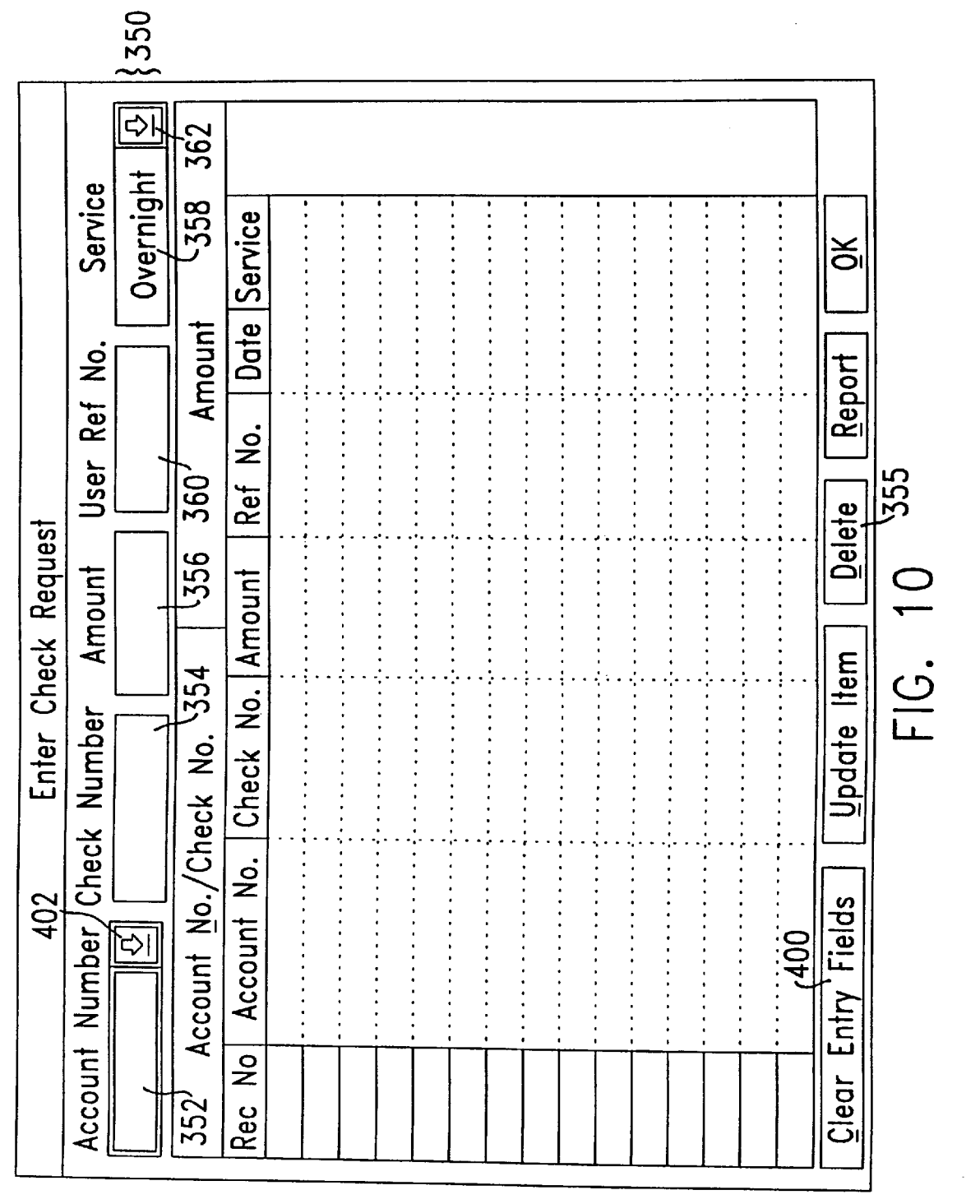

Once this function is invoked, the user is presented with an empty screen as shown in FIG. 10. The screen shown in FIG. 16 has had some data entered. A request is entered by completing the data entry fields 350 at the top of the screen. Once completed, the request may be added to the list of checks shown in FIG. 16. A request is completed by entering the account number 352 and check number 354. The amount of check 356 and the reference field 360 may optionally be entered. Preferably, the service field 358 defaults to Overnight (indicating that requests will be fulfilled the next day) and, thus, need not be modified by the user. The active field is indicated, as is customary in Windows™, to distinguish it from the other fields. The data entry function will proceed, as is customary in Windows™, from left to right. If the user wishes to jump back or forward to a given field, he need only, for example, place the mouse 701B pointer on that field and click the left mouse button (or other pointing device function, as appropriate). The data in the field can then be re-typed. This simplifies correction of errors before the data is added to the list.

(a) Enter New Check Request

In the preferred embodiment, when entering a check request on the check request screen, unlike the standard Windows™ interface, the <Enter> key acts like the tab key. This is provided so as to prevent confusion in users who are not familiar with Windows™. Thus, the enter key moves to the next input field rather than selecting the default button.

To enter a new check request or item to the list, the user does the following:

1. Clicks the Clear Entry Fields button 400 to clear the entry fields. The label on the button will change to "Add To List".
2. One of the valid account numbers will appear in the entry field. The account number may be changed by selecting the Account field 352 and changing the account number. To change the account number, as is customary in Windows™, the user clicks on the [↓] button 402 to the right of the account number entry field. A drop down box or window listing the valid account numbers will be displayed. The user then chooses the appropriate account number. The user can select an account number from the drop down box as is customary in Windows™, e.g. click on the one desired or use the arrow keys to select the desired entry and press <Enter>. The selected account number will appear in the entry field 352 and the cursor will move to the Check Number field 354.
3. To complete a request, the user must type the check number in the check number field 354. If the user presses the <Enter> key or the tab key, the cursor will move to the Amount field 356.

Once the user has entered a check number 354, all the required information for requesting a check image is present on the screen: account number (default), check number, and class of service 358 (which defaults to Overnight). At any time that the required information is present, the request can be immediately added to the list by clicking the Add to List control button 400 or pressing a suitable keyboard key, e.g., Alt-A.

4. Amount 356 is an optional field. If it is entered, the host system 8, according to the preferred embodiment, will use it in its search of the index database 30. Consequently, if it is mistyped, the host system 8 will not be able to locate and retrieve that item. Therefore, the use of the Amount field 356 should be limited to situations in which, because of check number rollover, there may by multiple checks for a given account number and check number. The user enters the amount or skips the amount field as is standard in Windows™. Pressing <Enter> or the tab key will cause the cursor to move to the Reference No. field 360.

5. The Reference No. field 360 is a user defined field that accepts alpha-numeric characters. Its use is entirely optional. It is meant to provide a mechanism to the user for internal tracking of requests and images. It has no meaning or significance to the host system 8 other than as a user provided label that will stay with the request throughout its journey and be returned to the user with the image. The user may enter a reference number or skip the Reference No. 360 field in the customary way.

6. "Overnight" appears by default in the service entry field 358; to accept this choice, the user presses <Enter>. Like the account number field 352, the service entry field 358 has a Windows™ standard drop down box accessed by the button 362. The user may access the drop down box to select same day service in the customary way, by pressing the [↓] 362 button to the right of the service entry field 358 and choosing "Same Day".

As indicated above, at any time the request is complete, the user may click on the Add to List control button 400 or press a suitable keyboard button, e.g., Alt-A to, add the request to the list. When the service entry field 358 is selected, the user may also press <Enter> to add the request to the list. After the request is added to the list, the label on the leftmost control button 400 will change back to "Clear Entry Fields".

7. To add more items, the user repeats steps 1–7. The user must clear the entry fields by clicking the Clear Entry Fields button 400 (step 1, above) before entering the next item. FIG. 16 is an example of the Enter Check Request Screen after entry of four checks.

(b) Modify Item

To change an item that has already been entered, the user does the following:

1. Selects the item to be modified by either clicking the mouse pointer anywhere on the row of the desired item, or using the arrow keys to move the reverse video box to the desired item (again, any field of the desired item will suffice). The data for that item will now appear in the data entry fields 350 at the top of the screen.
2. Clicks on the data entry field of the particular data to be changed. For example, if the check number is wrong, the user clicks on the Check Number data entry field 354, and the field may be edited as is customary in windows.
3. Types the new data in the field using the keyboard 701C and presses the delete key to eliminate any unwanted characters.
4. Clicks the "Update Item" button 463. The item in the list has now been changed with the corrected data.

(c) Delete Item

To delete an item that has already been entered, the user does the following:

1. Selects the item to be deleted by either clicking the mouse pointer anywhere on the row of the desired item, or using the arrow keys to move the reverse video field to the desired item (again, any field in the row of the desired item will suffice). The data for that item will now appear in the data entry fields 350 at the top of the screen.
2. Clicks the Delete 355 button. The item has now been deleted from the list.

(d) Sort Buttons

When the File/Enter Check Request screen first appears, the checks will be displayed in account number/check number sequence, as shown in FIG. 16. By clicking either the Account No./Check No. or Amount sort button 465, the checks may be resorted by the Account number/check number or Check amount.

As with other control buttons, these sort buttons can be activated by clicking the left mouse button on the desired sort button or by pressing the Alt key and the underlined letter of the desired sort button, e.g., M for Amount sort.

(e) Report

The invention allows the generation of a hard copy report of the request list. To generate a report, the user clicks the Report button 460. The workstation software preferably has a built-in report writer that will format and display a report as shown in FIG. 12. As is customary in Windows™, the report may be previewed on the screen before it is printed. If the report is larger than the display window, the remaining sections can be brought into view, as is customary, using the horizontal and vertical scroll bars. To print the report, the mouse pointer is placed on the button 461 showing a printer icon, and the left mouse button is clicked. The remaining button icons shown in FIG. 12 are used as would be customary.

(f) OK Button:

When the user has finished or chooses to stop entering check requests, the OK button 464 (FIG. 16) is clicked. Since the check request file will only be transmitted to the host 8 at the user's command (see File/Send Request File, below), more requests can be added to the current request list at a later time.

(2) File/Send Request File

This function allows the user to log into the host system 8 and transmit the request file in its present state. Preferably, the connection is made by the workstation software through a dial-up line 11 and a modem 10. However, any communication configuration can be used. Successful completion of this function requires that the user enter a valid user-ID and password, as described above.

This function can be invoked by choosing the File/Send Request File menu option. See FIG. 7. When this function is invoked the workstation software attempts to detect the modem 10, as is known in the art. When the modem 10 is ready, the user will be presented with a prompt window with the following options:

Continue Proceed with the request file for transmission to the host.

Review Review the request file before sending it. This function will return the user to the request file input screen (FIG. 16) in which items can be added, modified, or deleted. When that screen is exited, the user will be returned to this window.

Cancel Abort the transmission and return to the main screen depicted in FIG. 8.

To continue with the transmission, the user clicks the Continue button. A "Dialing. Please Wait . . . " or similar message will be displayed at which time a new request file 720 is constructed and the connection is made to the host 8.

The request file 720 is constructed from information contained in the main database 710. The request file 720 name is created using the user-ID entered in the Options/Setup screen, which is given a ".SND" extension. The request file 720 is an ASCII file having the following format:

| REQUEST FILE LAYOUT | | |
|---|---|---|
| Field | Type | Description |
| Record Type | Req | "00" - Header Record |
| Field Separator | Req | "\|" |
| Company ID | Req | Company ID |
| Field Separator | Req | "\|" |
| Creation Date | Req | File Creation Date (YYMMDD) |
| Field Separator | Req | "\|" |
| Creation Time | Req | File Creation Time (HHMMSS) |
| Field Separator | Req | "\|" |
| Request Record | | |
| Record Type | Req | "01" |
| Field Separator | Req | "\|" |
| Level of Service Requested | Req | "A": Same Day "N": Overnight |
| Field Separator | Req | "\|" |
| Work Station ID | Req | Work Station ID |
| Field Separator | Req | "\|" |
| User ID | Req | User ID |
| Field Separator | Req | "\|" |
| Account number | Req | Account number of requested check |
| Field Separator | Req | "\|" |
| Check Number | Req | Check number of requested check |
| Field Separator | Req | "\|" |
| Check Amount | Opt | Amount of requested check |

-continued

| | | | |
|---|---|---|---|
| Field Separator | Req | "\|" | |
| FAX Number | Opt | FAX number | |
| Field Separator | Req | "\|" | |
| Attention Of | Opt | Person to receive FAX | |
| Field Separator | Req | "\|" | |

Trailer Record

| Data Element | Type | Maximum Size | Description |
|---|---|---|---|
| Record Type | Req | 2 | "99" - Trailer Record |
| Field Separator | Req | 1 | "\|" |
| Request Record Count | Req | 7 | Number of request records in file |
| Field Separator | Req | 1 | "\|" |
| Record Count | Req | 7 | Total number of records in file (including header and trailer) |
| Field Separator | Req | 1 | "\|" |

A request record is created in the request file 720 for each request record 711 on the main database which has the "REQUEST" status.

If, upon dialing, a busy signal is encountered, the workstation software instructs the modem 10 to retry the call, i.e., redial. The number of retries is displayed for the user, who may, at any time prior to connect, press an Abort button to abort the attempted connection to the host system 8.

Figure 13:
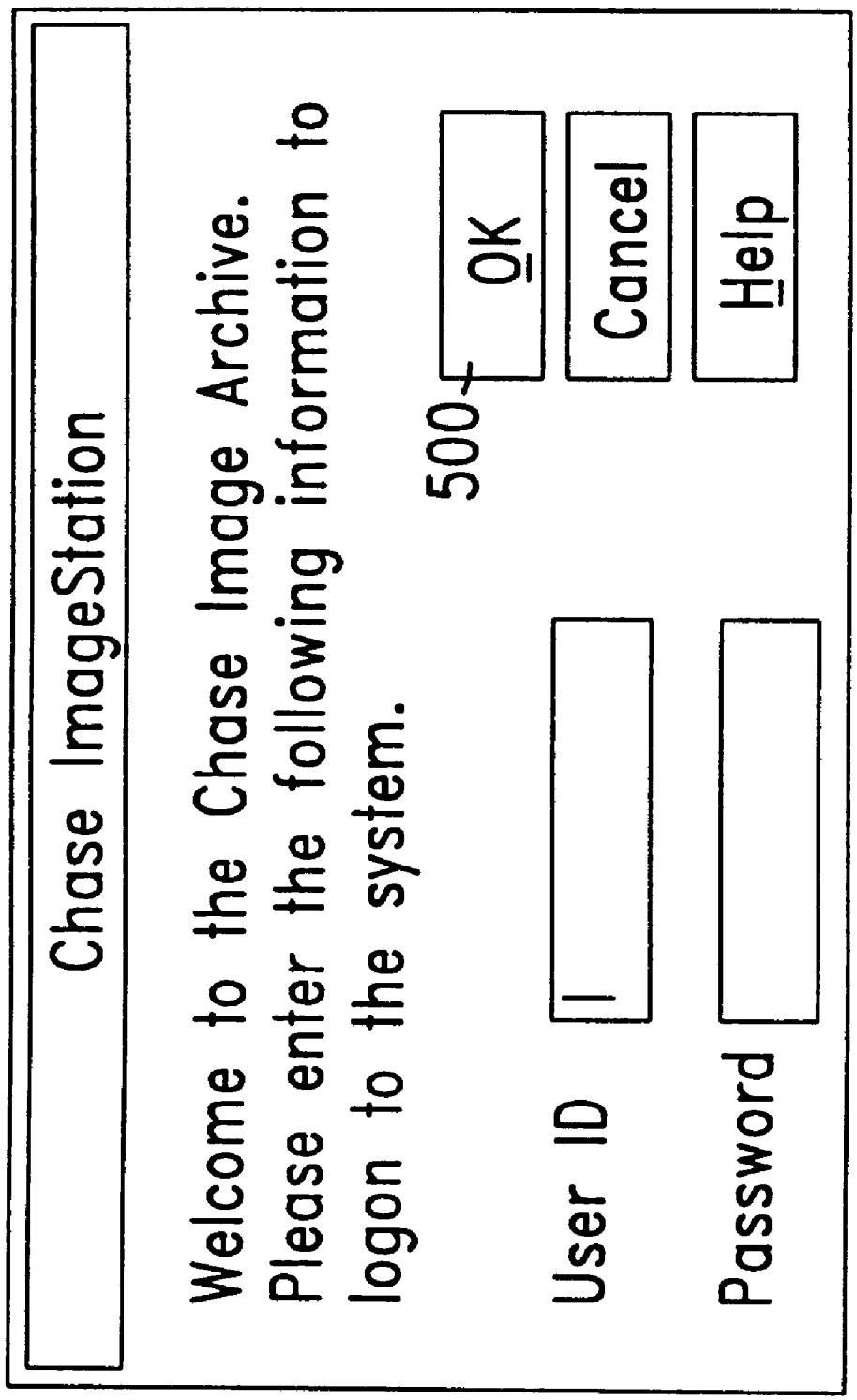
FIG. 13 shows the screen employed to allow log-on to the host system by a user.

If the connection is completed, a host log-on window will be displayed as shown in FIG. 13. The user then types his User ID, presses the tab key, types a Password and presses <Enter> or clicks the OK button 500. Alternatively, the user may press Cancel, at which time the workstation software instructs the modem 10 to hang up, the connection is dropped, and the user is returned to the main screen (FIG. 8). If the user-ID and password are entered, the workstation software transmits them to the host system 8 for verification. The host system 8 compares the user-ID and password with the records maintained on the output queue device 601 and, if invalid, sends a reject message back to the workstation 7. Responsively, the workstation software displays "Login incorrect, Please try again" or similar message to the user, who may subsequently re-enter the user-ID and password.

Once logged in successfully, with a valid user-ID and password, the workstation software transmits the check request file using the modem file transfer protocol, as is known in the art.

A status window will then appear showing the status of the file during transmission. When the request file has been transmitted to the host system 8, a message indicating that the user is exiting the host system 8 will be displayed, and an "UPLOAD REQUEST COMPLETED" or similar message will briefly appear. The user will then be returned to the main menu screen (FIG. 8), and the transmission procedure to the host is completed.

(3) File/Get Images From Chase (host system 8)

This function allows the user to download the retrieved images that it requested from the host 8 to the local workstation 7. This function proceeds in a very similar manner to the File/Send Request File transmission described above. The connection is made through a dial up line 11 and a modem 10, or other suitable communication connection. The function requires the user to enter a valid User-ID and Password.

Similar to the File/Send Request File function, a "Dialing. Please Wait . . . " or similar message will be displayed while the connection is made to the host. The workstation now determines the amount of storage space available for the storage of downloaded check images. The connection may take upwards of 20 seconds to establish during which time a static-like sound may be heard from the modem 10. When the connection is made, a log-on is required, as discussed above for File/Send Request File (see FIG. 13). If no checks have yet been retrieved from the archive, the host system transmits a message to inform the workstation that no checks are ready to download, and the workstation software displays a "NO CHECKS READY TO DOWNLOAD" message. The download operation may be tried at a later time. If any checks have been retrieved and they are ready to download, the host system 8 calculates and transmits to the workstation 7 the check image files (.f and .b) ready to be transmitted. If this is greater than the amount of storage space available for storage of downloaded images, the workstation displays a message, indicating this to the user, and requiring the user to select an OK button. When the user selects OK, the workstation software proceeds directly to the Options/Image File Maintenance function. If, however, there is sufficient space, a message box describing the size of the download in kilobytes and number of checks as shown in FIG. 15 will appear.

Figure 15:
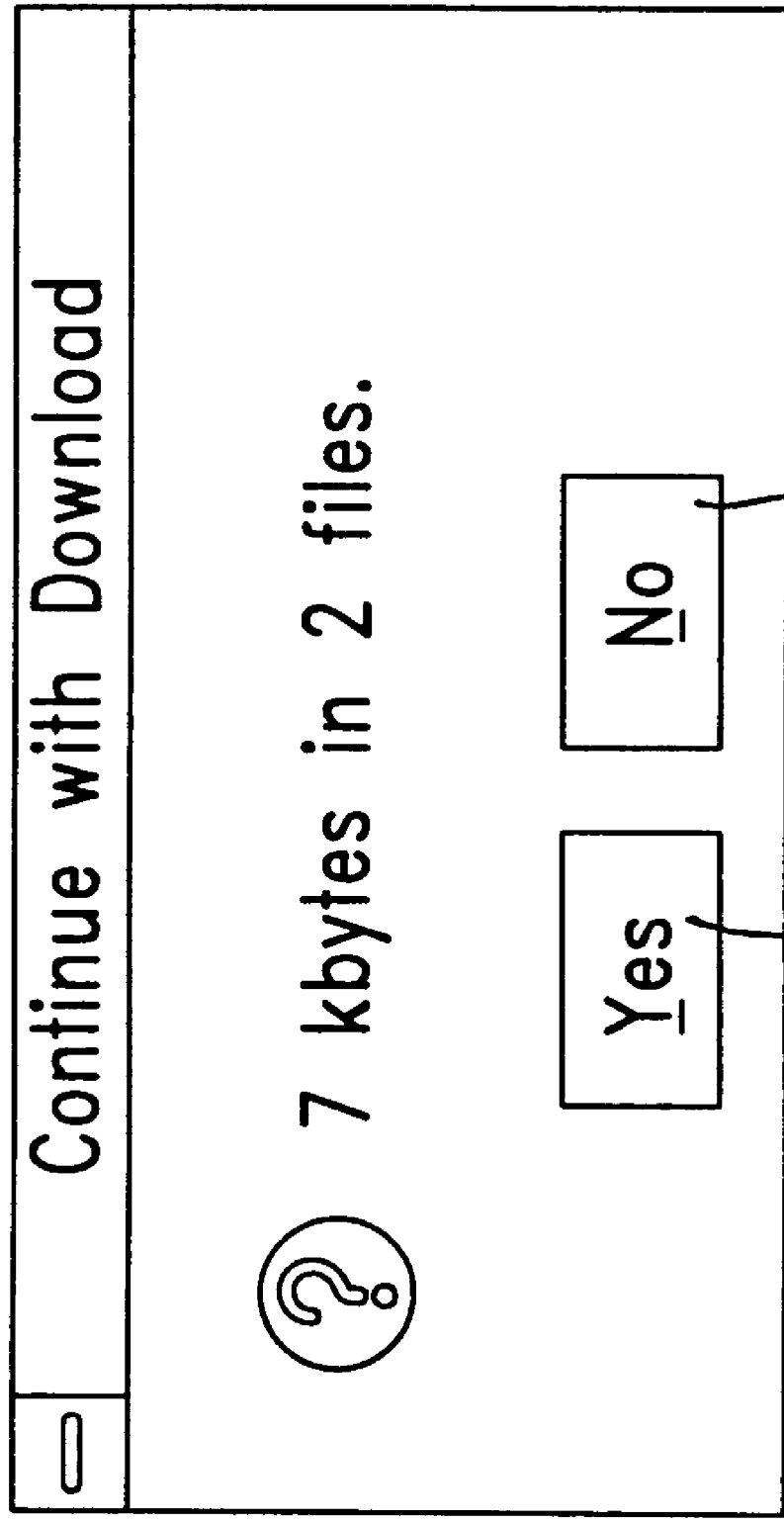
FIG. 15 is another prompt screen to ensure that the user has sufficient download capacity.

The window of FIG. 15 is presented to the user so that the user may decide to abort (No) the transmission to the workstation 7. If the user chooses the No button, the download is terminated, a "DOWNLOAD CANCELLED BY OPERATOR" message is displayed, and the workstation software disconnects from the host system 8 and returns to the main menu.

If the user chooses the Yes button 532, the download is initiated. A status window will appear showing the status of each check file during transmission. When all the files have been transmitted, a message indicating that the workstation software is exiting (logging off) the host system 8 will be displayed. When the log off is completed, a "DOWNLOAD COMPLETED" or similar message will briefly appear, followed by an "UPDATING LOCAL DATABASE" message, while the data on the local storage device 702 is updated. The user will then be returned to the main menu screen, and the procedure is complete.

(4) Select/Display Check Image—Print Check Image

These functions allow the user to select a check image from those resident on the local storage device 702 and display that image on the display 701A of the workstation 7, and optionally, to print the image on the printer 703. The display checks function is invoked by choosing the File/Select/Display Check Images menu option. The Select/Display Check Images Screen is shown in FIG. 11.

For each request that has been transmitted to the host computer 8, this screen will list, in a scroll window, information pertaining to that request. If there are more checks than will fit within the window, the additional items may be brought into view by using the scroll bar at the right of the window. Likewise, the hidden columns to the right of the window may be brought into view with the bottom scroll bar. For each check request transmitted to the host computer 8, the scroll window will display the following fields:

Account No.
  Self-explanatory
Check No.
  Self-explanatory
Amount
  Self-explanatory
User Reference No.
  User defined field, for user internal tracking
Status
  "Received": Requested Check image has been downloaded from host.
  "Not Found": Host unable to locate requested image.
  "Pending": Request sent to host, but image not downloaded yet.
  "EXPORTED": Check image downloaded from host without request. (e.g. Bulk Download)
Requested
  Date the requested item was sent to host
Received
  Date the retrieved image was downloaded from host
Service
  Level of service selected by the user: "Overnight" or "Same Day"

(a) Sort Buttons

When the File/Select/Display Check Images screen first appears, the checks will be displayed in account number/check number sequence, as shown in FIG. 11. Using the sort buttons 450 at the top of the list, the checks may be re-sorted by Date (descending), Account number/check number, Check amount, User reference number, Status, or Date images were received from the host (ascending).

As with other control buttons, these sort buttons can be activated either using the mouse 701B by clicking the left mouse button on the desired sort button or by pressing Alt and the underlined letter of the desired sort button on the keyboard 701C.

The sort buttons only affect the order in which the checks and requests are displayed; the data stored on the local storage device 702 remains unaffected.

(b) Selecting A Check

To select a check, the user can use any of the customary Windows™ selection features, including: pointing to any field in the row of the desired checks and using the pointing device 701B, e.g., the mouse, double-clicking the left mouse button; pointing to the field in the row of the desired checks and single clicking the left mouse button, followed by the selected item turning reverse video at which point the "Enter" key is pressed; or using the arrow keys on the keyboard 701C to move the reverse video to the row of the desired checks followed by pressing the "Enter" key.

Figure 17:
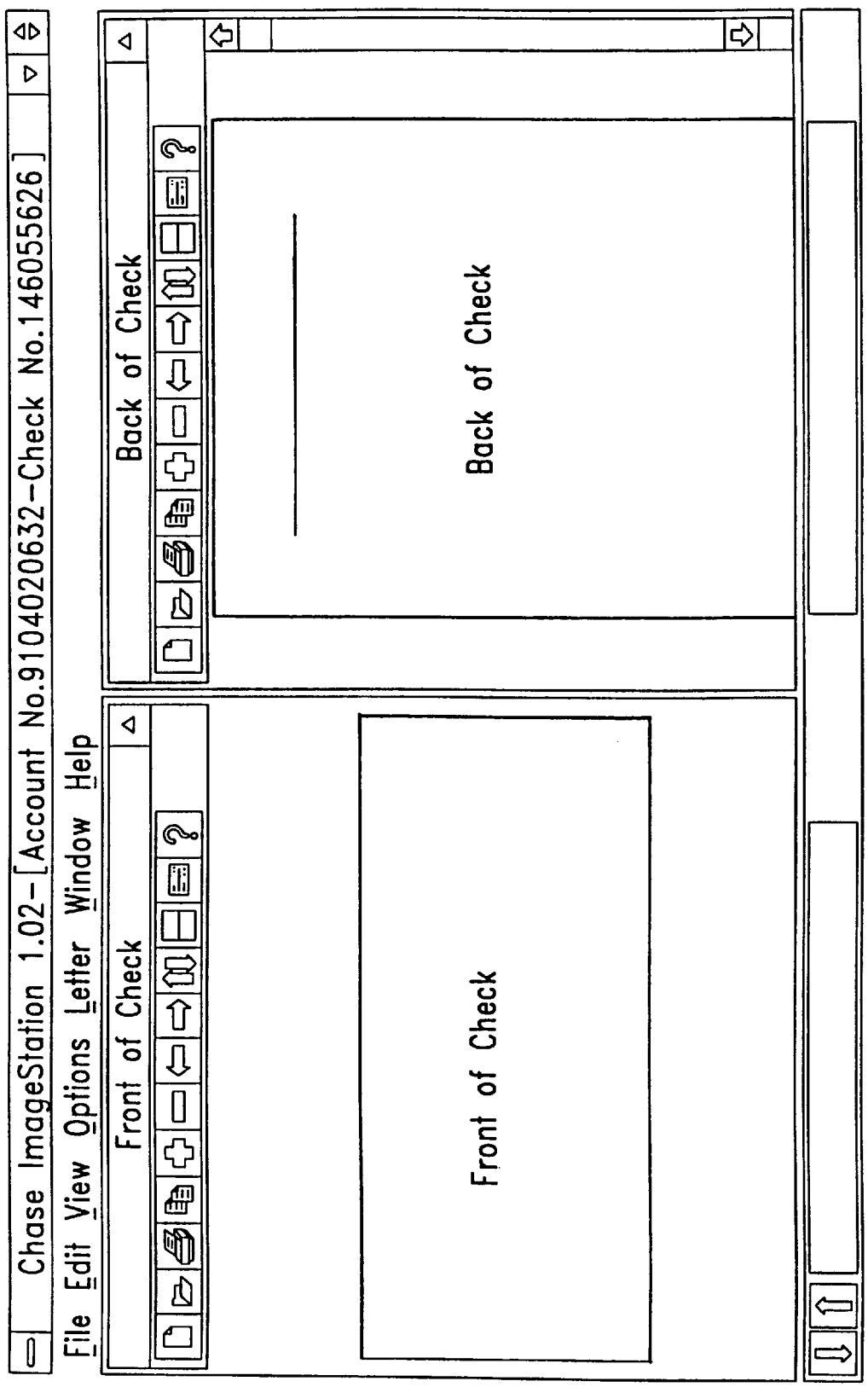
FIG. 17 shows the front and back check image screens showing the front and back image of a representative check.

The front and back of the check will then appear in the display windows, as shown in FIG. 17. The following parameters are defined for the front and back check images: height, width, horizontal and vertical resolution, and horizontal and vertical scroll bars. The front of the check is displayed horizontally so that the full image appears in the window. The back of the check is positioned vertically and enlarged so the endorsement area is clearly visible. Associated with each front and back check image are the image height, width, horizontal and vertical resolution and horizontal and vertical scroll bars. The entire front of the check is displayed horizontally, to permit the user to review the information thereupon easily, utilizing the maximum width of the sub-window for the front image. Preferably, only a portion of the back image is displayed. Specifically, the back image is rotated to cause the writing in the endorsement area to be readable normally to the user. The back image is enlarged to occupy, essentially the entire sub-window's width, thus, making the lower portion of the check image, which usually contains less important information, not initially present on the screen (see FIG. 17). With this check oriented display in mind, it can be seen that the position and size of the check sub-windows can be oriented in a number of useful ways. For example, the front image sub-window could be initially oriented to use the entire width of the main window with an aspect ratio similar to that of the check. The back image sub-window could be initially oriented therebelow, having an aspect ratio approximating that of the endorsement area. In the preferred embodiment, the sub-windows are resizable and the images are scalable, thus allowing great flexibility in the review of check images. Portions of the check image not appearing in the image sub-windows can be viewed by scrolling or panning the image within the window. The means for accomplishing these functions are known to those of skill in the art.

ii. Edit (1) Edit/Copy

The Edit/Copy function allows the user to copy the check image in the active window to a temporary storage area, e.g., the Windows™ Clipboard. The Windows™ clipboard is a utility application that acts as a temporary storage area permitting data transfer e.g. from one application to another. In the system according to the inventions, it is preferably supported by the workstation software to allow users to incorporate check images into other applications, particularly other Windows™ based applications. As discussed above, this function can also be accomplished using toolbar button D (see FIG. 9).

iii. View

Once a check is displayed on the screen using, for example, the File/Select/Display function discussed above, the View function provides the ability to manipulate the displayed check images on the screen. The front and back check images may individually be enlarged, reduced, and rotated. The functions available under View are also available through the function keys, and the toolbars at the top of each display window.

Figure 18:
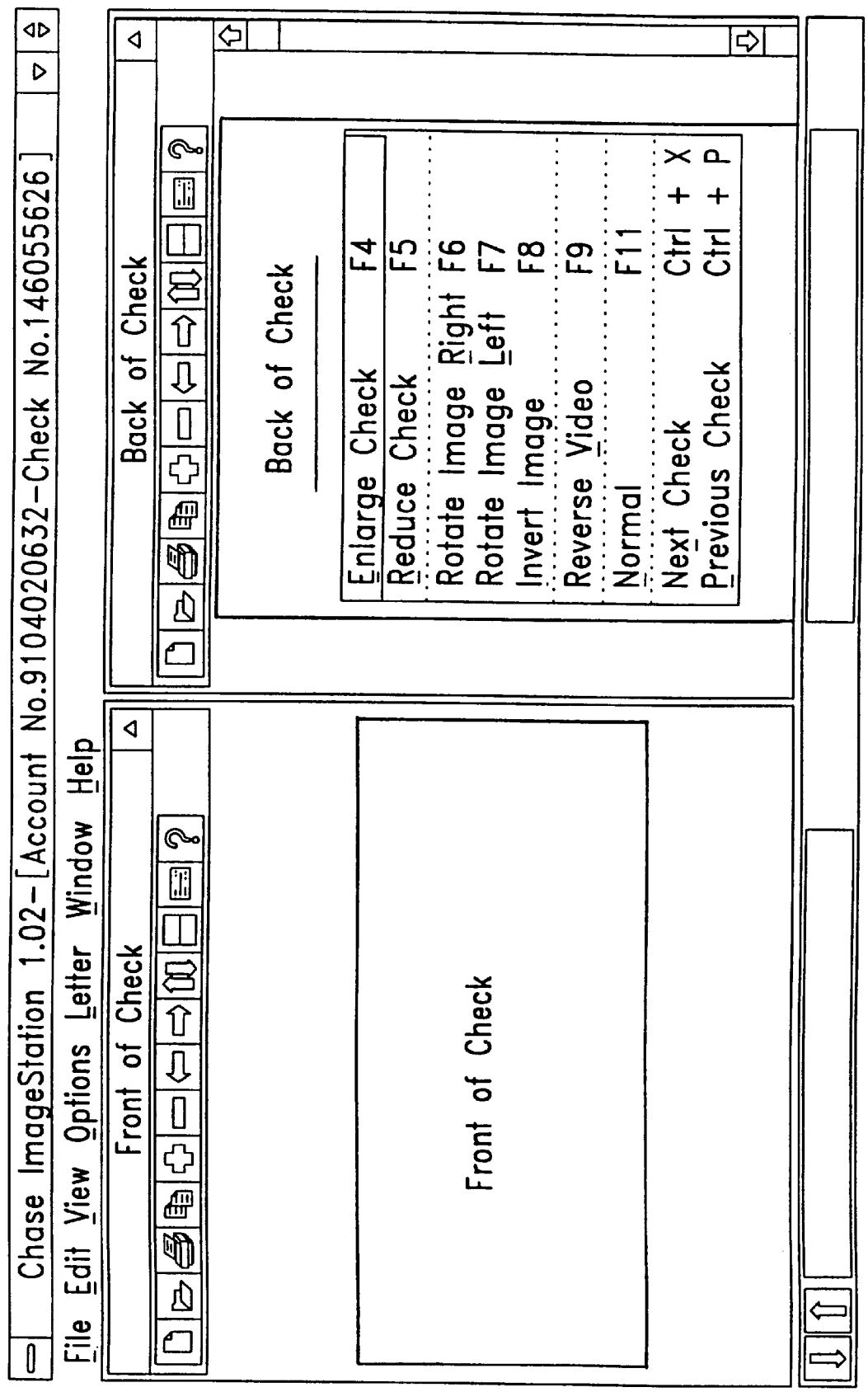
FIG. 18 shows the check image screen with a pop-up window showing the options under the View option of the top level menu.

In addition to the View sub-menu being available by selecting View from the top level menu, the same menu can be invoked as a pop-up window by clicking the right mouse button of the pointing device 701B anywhere within the check image sub-window. The View options are shown in FIG. 18.

Figure 19:
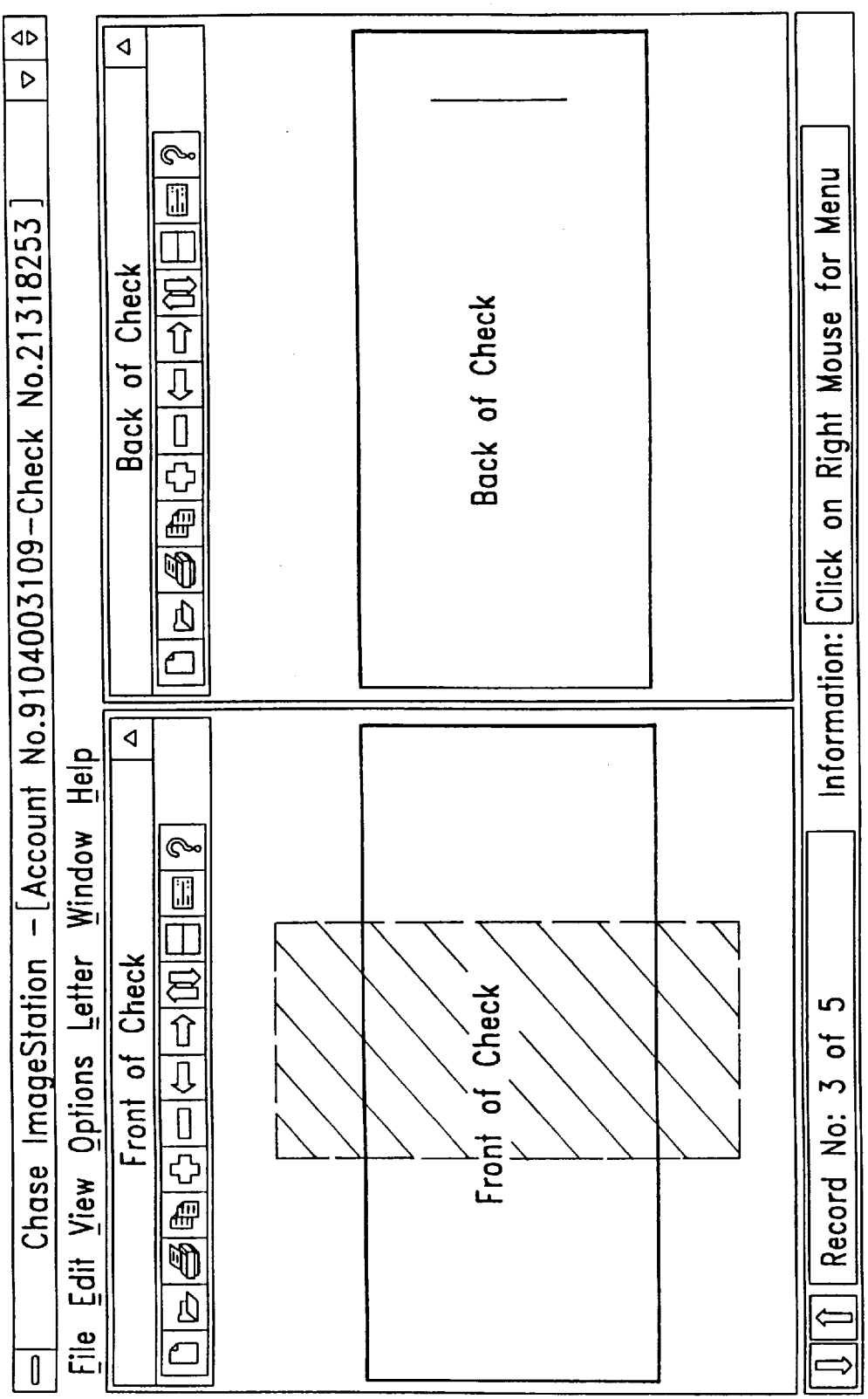
FIG. 19 shows the use of the highlight and enlarge facility of the system showing how check images can be highlighted and thereby enlarged by the user on the screen, as well as showing the rotate facility in the "BACK OF CHECK" window.

The image view options are described below:

Enlarge Check: This function enlarges the image in the active window. This operates the same as toolbar button E [(+)] (FIG. 9). Preferrably, function key F4 or the "+" key also enlarges the image. In a preferred embodiment, the image can also be enlarged using a graphical interface, for example, by dragging a pointing device (moving the pointing device 701B with the right button depressed) across a region of an image (see FIG. 19), whereupon that region is enlarged to fill the window. Preferably, where the aspect ratio of the region is not the same as the image sub-window, the region is enlarged so that it is the maximum size that will fit entirely within the image window. Programs for performing zoom type functions such as enlargement and reduction of graphical information, such as check images, are known in the art, and need not be discussed in detail herein.

Reduce Check: This function reduces the image in the active window. This operates the same as toolbar button F [(-)] (FIG. 9). Preferably function key F5 or the "-" key also reduces the image.

Rotate Image Right: This function rotates the image 90° to the right in the active window. This operates the same as toolbar button H [→]. Preferably function key F6 also rotates the image to the right. As with zoom functions, procedures for performing rotation of graphical images are well known and need not be duscussed in detail herein.

Rotate Image Left: This function rotates the image 90° to the left in the active window. This operates the same as toolbar button G [←]. Preferably function key F7 also rotates the image to the left.

Invert Image: This function rotates the image 180° in the active window. This operates the same as toolbar button I. Preferably function key F8 also inverts the image. This is shown in the front of Check Window in FIG. 19.

Reverse Video: This function toggles the image to/from reverse video, i.e., white on black, in the active window. This operates the same as toolbar button J. Preferably function key F9 also produces the same result.

Normal: This function returns the image to normal, i.e., size, orientation, and video. This operates the same as toolbar button K. Preferably function key F11 also returns the image to normal.

Next Check: Using the presently selected sort order, this function displays the check image of the check following the displayed check.

Previous Check: Using the presently selected sort order, this function displays the check image of the check preceding the displayed check.

iv. Options

Figure 20:
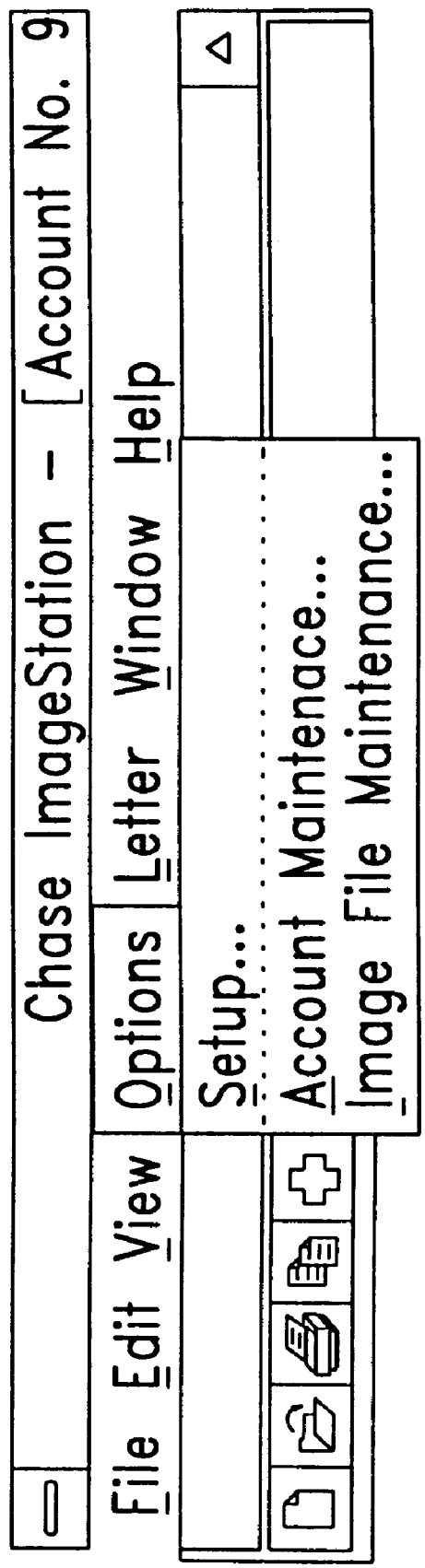
FIG. 20 shows the options available under the Options Menu of the top level menu.

The Options menu is shown in FIG. 20. According to the preferred embodiment the Options menu provides functions to setup and configure the workstation software. It also provides facilities for the ongoing maintenance of the information stored on the local storage device 702.

(a) Setup

The Options/Setup parameters shown in FIG. 21 are entered during the workstation software installation process. These parameters generally need not be changed once they are installed. In the preferred embodiment, the parameters may be stored on the local storage. device 702, for example, in the "WIN.INI" file or in another file used specifically for this purpose the workstation software.

The setup options are as follows:

Company ID: The company ID is configured on the host system 8 to identify a company accessing it. The company ID must be correctly set in the workstation software to identify the workstation 7 properly when it communicates with the host system 8. This is set at installation time, and generally requires no user modification.

Workstation ID: The workstation ID is configured on the host system 8 to identify the customer workstation 7 accessing it. The workstation ID must be correctly set to a the proper ID in the workstation software so that the host system 8 may properly identify the customer workstation 7 during communication therebetween. This is set at installation time, and generally requires no user modification.

User ID: The user ID entered in Setup is used as a name for the request file 720 when it is transmitted to the host system 8.

Host Archive Phone Number: This is the phone number that Workstation will dial to communicate with the host system 8. The phone number is entered, as is well known in the art, e.g., in a Hayes command type format (not including the instruction prefix e.g., ATD or ATDT), using commas to indicate a pause in dialing. This is set at installation time, and generally requires no user modification.

Word Processor: Specifies the word processor to be used (if any) for automatic integration of images into pre-defined documents. Preferably, the word processor is specified by its full path and file name. This is an optional feature which can be setup at installation time. If the location of the word processor is changed on the local storage device 702, or if the user desires to specify a new word processor for use with the workstation software, this entry will be modified.

Installation and Document Directory: This is the path/directory where the workstation software is installed and pre-defined documents are stored. This is set at installation time, and generally requires no user intervention.

No. of Days to Retain Image File: Set by user to set the number of days to retain an image before it appears on the deletion list displayed in Options/Image File Maintenance, as discussed below. Preferably, this value can be changed by the user at any time, as desired. As is customary in Windows™, the pointing device 701B button may be clicked on the adjoining up or down arrow to increase or decrease the number respectively. In a preferred embodiment, the value must be set to between 1 and 31 days.

Default State: Sets the default state that will appear in the data input screen for the header information of pre-defined letters which will incorporate check images. This is set by the installer to an initial default state. This value can be changed by the user whenever desired. To choose or change the state, as is customary in Windows™, the drop box, accessed by clicking on the down arrow to the right of the field, for example, may be used, thus permitting the user to scroll to and select the desired state.

As is customary in Windows™, to exit this screen, using the pointing device 701B, the user either clicks on the OK button to save any changes made to the data, or clicks the Cancel button to exit without saving the changes.

(b) Account Maintenance

This function allows the user to define account numbers which may be used for check requests. These account numbers are accessed from the drop box for the Account Number field (see FIG. 16) during the File/Enter Check Request function and must be pre-defined (e.g., prior to use on that screen). In another embodiment, the Account Number field (FIG. 16) could accept new account numbers, and simply add them to the list of account numbers, thus only requiring this operation, Options/Account Maintenance, for deletion of account numbers from the list.

Figure 22:
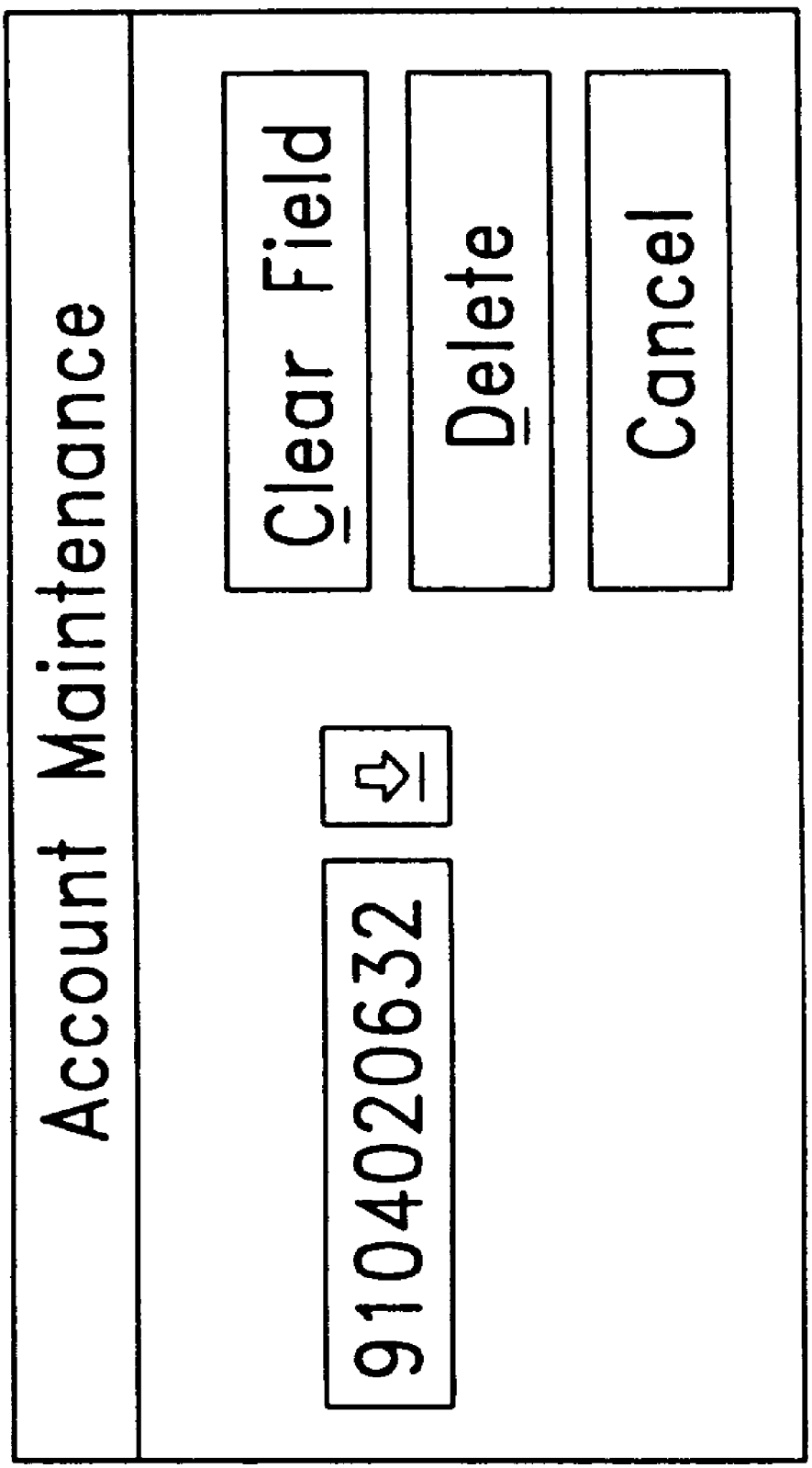
FIG. 22 shows the Account Maintenance screen.

Account numbers may be added at the time the workstation software is installed. Account numbers may be added or deleted at any time, for example, when a new account is opened with the bank. In the preferred embodiment, the Account Maintenance screen is a dialog box as shown in FIG. 22.

To add an account, the user performs the following:
1. Clicks on the Clear Field button;
2. Enters the account number, whereupon, the Clear Field button changes to an Add to List button; and
3. Clicks on the Add to List button.

The process (1–3 above) may be repeated to add another account.

To delete an account, the user performs the following:
1. Selects the account to be deleted, which may be done by typing the account number or selecting it from a drop down box containing all of the presently existing account numbers;
2. Clicks on the Delete button.

The process (1–2 above) may be repeated to delete additional accounts.

To exit, the Cancel button is clicked using the pointing device 701B. The Cancel button does not cancel the user's activities of adding or deleting accounts. Instead, it permits the user to "cancel" making more changes and exit the account maintenance screen.

(c) Image File Maintenance

When invoked, the Options/Image File Maintenance function lists all checks on the user's system older than a specific number of days on the maintenance screen (FIG. 23). The specific number of days is the Number of Days to Retain an Image (see FIG. 21) which may be set by the user using Options/Setup, as discussed above. The user may delete the .f and .b files, and any database references thereto for any, all, or none of the items on this list. The function is provided to permit the user to dispose of unneeded check images that are stored on the local storage device 702, thus allowing the user to prevent the local storage device 702 from running out of storage space. In another embodiment of the customer workstation 7, the .f and .b files could be deleted automatically when they reach a certain age.

When the maintenance screen is invoked (Options/Image File Maintenance) OK (which exits the maintenance screen) is the default button. Thus, if <Enter> is pressed, the function will be exited. Clicking on the sort buttons (or pressing e.g., Alt-M for Amount) will immediately cause the list to be resorted. The OK button remains the default; so if <Enter> is pressed after a sort, the function will again be exited. This is designed to minimize the possibility of inadvertent deletion of images.

Data relating to any single check, or the entire list of checks, may be deleted. Note that the data relating to a check comprises the .f and .b files and information stored on the local storage device 702 associated therewith. The .f and .b files cannot be deleted individually. In the example shown in FIG. 23, checks are listed that are older than 31 days. To delete the entire list at once, the user can click the Delete All button. To delete data relating to only a single check, the user selects the data relating to that check by clicking once on any field in the row for that check. The selected field will turn reverse video. The user may then click on the Delete button, to effect deletion. Prior to actual deletion, a confirmation message is displayed, requiring the user to confirm or cancel the deletion. Again, this is designed to minimize the possibility of inadvertent image deletion.

When the user clicks on the OK button, the workstation software exits the Options/Image File Maintenance function and returns to the previously displayed screen.

v. Letter

Figure 14:
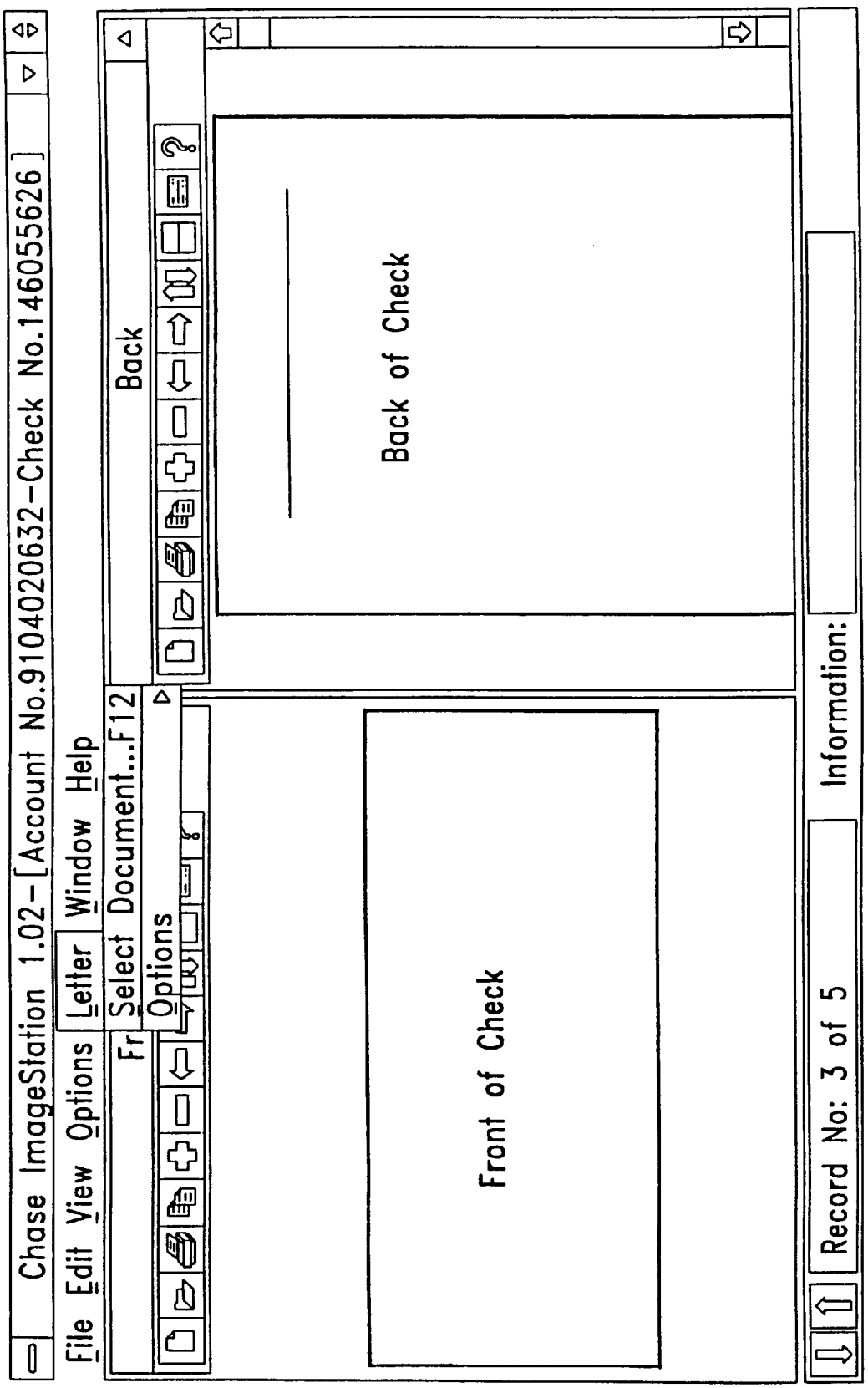
FIG. 14 shows a screen which is employed in generating correspondence with a client incorporating the check images.

Turning to FIG. 14, the Letter menu allows the user to select options which will insert the front and back of the check image into a pre-defined word processing template. In the preferred embodiment, Microsoft Word™ was chosen as the word processor. Any other suitable word processing function can be employed. As one of skill in the art will easily recognize, this feature may be implemented in Windows™ by taking advantage of the various operating environment tools designed to permit application programs to share information, such as DDE (dynamic data exchange) or OLE (object linking and embedding). Of course, this feature can be implemented without the use of these specific operating environment tools.

(a) Select Document

Choosing Letter/Select Document permits the user to create a pre-formatted letter incorporating the front and back images of a selected check. This option will initially present the user with the customer information screen (FIG. 24). Choosing the OK button from this screen will cause the workstation software to invoke the designated word processor, and proceed to create a letter within that word processor, and optionally print that letter. Choosing the Cancel button will return the user to the previous screen.

The customer information screen (FIG. 24) permits the user to enter information which will be merged into the letter. The information to be entered includes form of address, First Name, Last Name, Street Address (two lines), City, State, Zip Code, etc., as can be seen in FIG. 24. The entry of this data is accomplished as is normal in Windows™. The entered information will be inserted into the header of a pre-defined letter (to be selected in the next step).

If the operator chooses the Cancel button from the customer information screen, the operation is aborted, and the user is returned to the previous screen. When the data is entered as desired, however, the user may press the <Enter>key or click the OK button to continue. In the preferred embodiment, the workstation software displays a dialog box, for example, similar to the one shown in FIG. 26, from which the user may select the document or template containing the pre-formatted letter.

Figure 26:
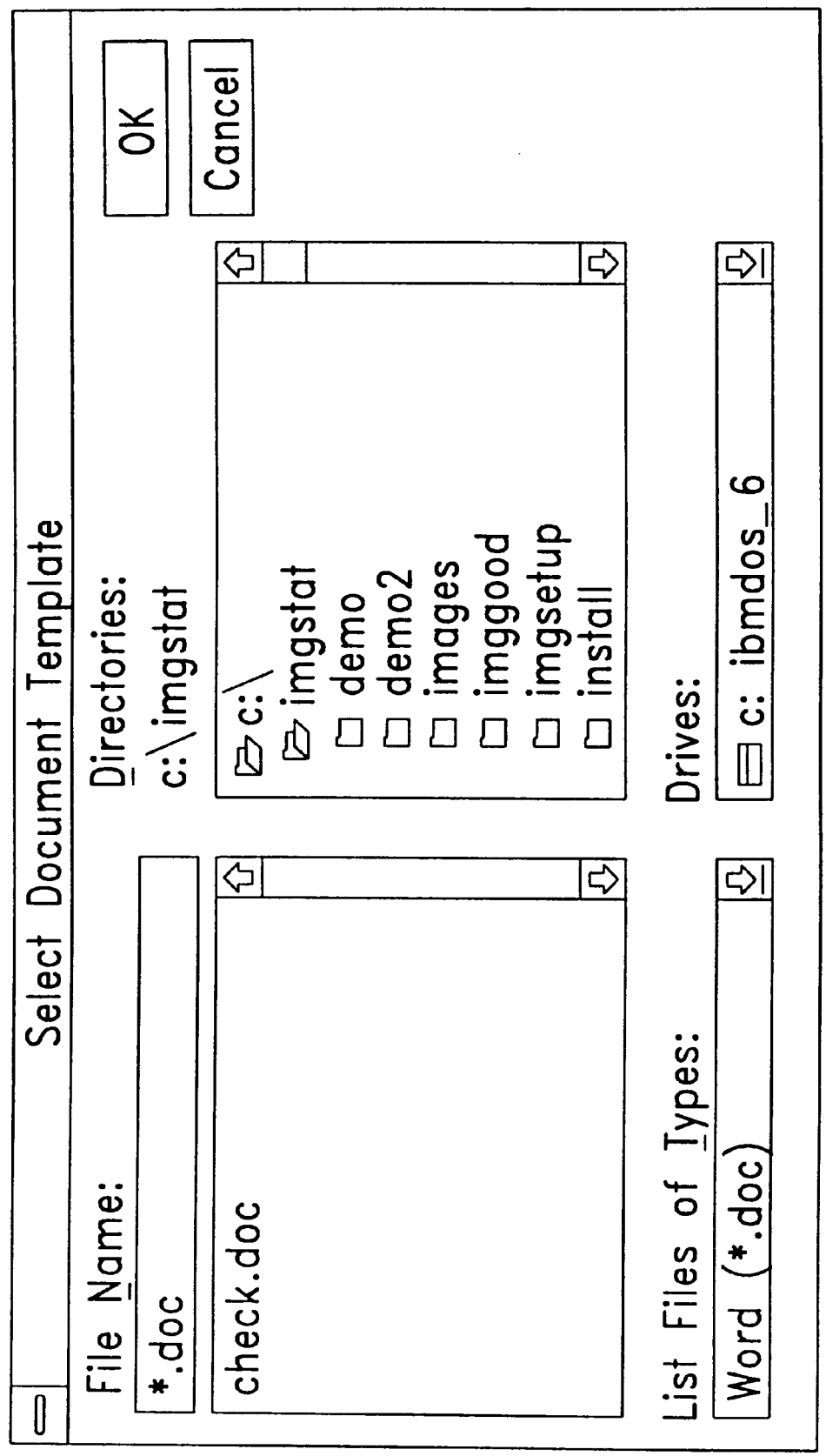
FIG. 26 shows such a letter from a template.

In the example of FIG. 26, there is one document stored in the default directory 702A (C:\IMGSTAT in FIG. 26). By default, the documents in default directory 702A (as selected as the Installation and Document Directory in the Options/Setup function) will be displayed. For ease of use, pre-defined documents are stored in the default directory 702A. The user may select the document as is customary in Windows™. If the user chooses Cancel, the workstation software may return to the customer information screen (FIG. 24) or in another embodiment, to the main screen (FIG. 8).

Once a template is selected, the workstation software will cause the word processing software to be invoked, loading the selected document into the word processor, and inserting the header information (FIG. 24) and front and back check images into it (FIG. 25). If the View option is selected (described below), the document can then be edited and printed as any other word processed document. If the Print option is selected (also described below), the document is printed prior to being editable in the word processor. Finally, the user may exit the word processor in the customary way, and, as will be understood by one of skill in the art, the user must take care not to save the letter under its pre-defined name. If the operator desires to save the just created letter, it can be saved under another name, as the operating environment and word processor permit, for example by using the File/Save As function in Word to give it a new name.

The document, once opened, may be given a unique name, thus preventing the unintentional overwriting of the template document. Alternatively, the document will be opened as an unnamed document, and the template document imported, again preventing the unintentional overwriting of the template document. The template document can also be protected from being overwritten by a write-protect, such as setting the document to "read-only" mode within the operating environment.

In creating the document in the preferred embodiment, the customer information screen data is placed in a Word™ document utilizing a Word™ function known as bookmarks, wherein each field of information in the customer information screen corresponds to a particular "bookmark" that has been inserted into the pre-defined document/letter. Although reference may be had to one of the many books which discuss the use of "bookmarks" in Word™, creating the pre-defined letters with the appropriately placed bookmarks is briefly discussed in a later section. Alternatively, a word processor merge function can be used to merge the information with a pre-defined document/letter.

When the just created document is displayed, both the workstation software and the word processor will be open at the same time. The user can toggle back and forth between the two applications in any of the ways that are customary in Windows™, for example, by pressing and holding the Alt key and repeatedly pressing the Tab key. Each time the Tab key is pressed a small window will appear on the screen with the name of an open application, e.g., the word processor or the workstation software. If the user releases the Alt key at the point where the desired name of the desired application appears in the small window, that application will become the active one and it will be displayed on the screen.

Further, to return to the workstation software the user may exit Word, which, as is customary, Windows™ will cause the workstation software to become the active application. For reasons that are understood by one skilled in the art, this method may be advisable from a procedural point of view.

(b) Options

Choosing Letter/Options permits the user to select either a Print or View option or mode. The Print and View options affect the behavior of the word processor which is used to edit and print the letter. The Print or View option, once set, will remain in effect for all letters until changed by the user.

If the View option is selected, when the document is created in the word processor, the letter is displayed in an active window of the word processor. The letter can then be manipulated and/or printed as any other document in the word processor.

If the Print option is selected, after creating the letter in the word processor, the workstation software causes the word processor to print the letter on the printer, and subsequently, to exit, returning to the workstation software. In another embodiment, when the Print option is selected, after creating the letter in the word processor, the workstation software could cause the letter to be printed, but not terminate the word processor. The post-printing active window could be either the word processor or the workstation software.

Creating A Pre-formatted Letter

This section relates to creating a pre-formatted form letter. Many methods of creating merged output of data from two separate sources are well known in the art. These methods include, but are not limited to: bookmarks, as discussed herein; a merge, also known as a mail merge, wherein data in named fields is merged into a document containing references to those fields; an application program which formats a letter, reading text from two or more pre-existing files; or the sequential entry of data items at markers in a stream of data.

For clarity and brevity, creating a pre-formatted letter is discussed herein with reference to the preferred embodiment. The functions discussed in this section are those of the Microsoft Word™ word processor, not the workstation software.

To create a pre-formatted letter, a normal document must be created in Word™. To position the data from the input screen and the check image itself, the following bookmarks (spelled exactly as shown below) should be inserted in the desired locations:

Addressee
Company
StreetAddress
CityStateZip
Salutation

Front_Of_Check
Back_Of_Check

Figure 30:
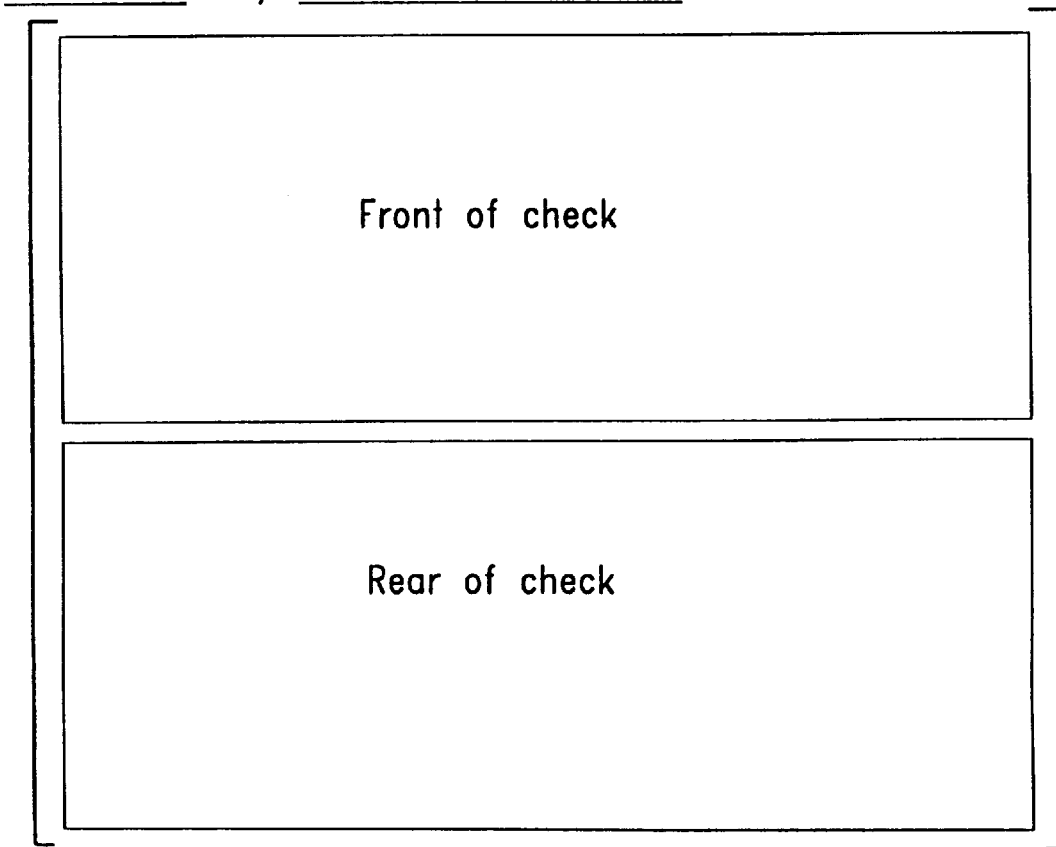
FIG. 30 shows a sample letter template.

For example, the positions of the bookmarks in a sample letter template are shown in FIG. 30.

The template is then saved in the directory specified in the Installation and Document Directory specified in the Options/Setup screen.

As can be seen by one of ordinary skill in the art, the names of the bookmarks are dictated by those "expected" by the workstation software. In another embodiment, the workstation software could permit the operator to determine the names. In another embodiment, the data could be inserted into a document at specified marks, like bookmarks, that are not unique, but instead, are sequence dependent. In yet another embodiment, as can be seen by one of skill in the art, the workstation software could create, print and permit editing of the form letter without the use of an auxiliary word processor such as Word™.

g. Requesting Check Images

The following is a general overview of how to use the customer workstation 7 to request one or more check images. Reference is made to the functions described above.

At any time the user is at the main menu of the workstation software, the user may choose File/Enter Check Request, as shown in FIG. 7. Thereafter, the user is presented with a screen which permits entry of a request for one or more check images. An empty screen for the requests is shown in FIG. 10. If the user has previously stored, but not transmitted, a list of requests, these will appear in the window, these may be modified, and new requests may be entered. The list of requests may be printed, reviewed, and edited as desired. When the user enters a request, eg. clicks "ADD TO LIST" button, in the File/Enter Check Request function, the individual request is stored in a request file.

When the user is satisfied with the requests and desires to transmit the image request file to the host, the menu option: File/Send Request File may be selected. The workstation software then establishes a communication link with the host system 8, and as above, permits the user to log-in. Once the user is logged-in the workstation software transmits the image request file to the host system 8.

The host system 8 receives and queues the request file on the output queue device 601 for later processing, and once the host system 8 has processed the requests (discussed above), the images are queued on the output queue device 601 for on-demand return to the customer workstation 7.

h. Download Requested Images

Some time after a request has been transmitted to the host system 8, the user may select File/Get Images (see FIG. 7), which causes the workstation software to again establish a communications link with, and requires that the user log-in to the host system 8. If images have been queued on the output queue device 601 these images are downloaded. Requested images will generally be available for downloading later in the day for 'Same Day Requests', or the following morning for 'Next Day Requests'. The time required to fulfill requests varies with the processing load of the host system 8. At off peak times, requested images may be ready for download in just a few minutes or less.

For each requested check, one .f file one a .b file is returned. The downloaded .f and .b files are stored on the local storage device 702 of the customer workstation 7. The .f and .b files, as discussed above, are named with unique sequence numbers and each contains TIFF images of one side of the check and other data stored within the TIFF files as tag fields.

Each pair of files, i.e. .f and .b files of a given name, are associated with a single request. The non-image tag fields are used to associate the .f and .b files with their associated request. This can be done either at the time the files are received from the host system 8 or at the time a user requests to view the results of request. Further, an association database can be created, at download or another time, which contains the information required to associate the .f and .b files with the requests. Such an association database may be indexed on the account and check number, and reference the file name of the .b and .f files. Thus, when a request is made to view a check, the account and check number can be used to search this database to determine the file name of the .f and .b files associated therewith.

i. View or Print Check Images

After the images have been downloaded, they reside on the local storage device 702. The user may select an image for display, File/Select/Display Check Image or printing, File/Print Check Image, as desired. A viewed file can be manipulated using the functions available in the View menu.

In addition, the workstation software preferably allows the user to select a previously created Microsoft Word™ (or other suitable word processor) document as a template, and incorporate the image of the front and back of the check directly into the text of the document.

Although the present invention has been described in relation to particular embodiments thereof, many other variations and modifications and other uses are and will become apparent to those skilled in the art. Therefore, the present invention should be limited not by the specific disclosure herein, but only by the appended claims.

What is claimed is:

1. A method for storing electronic images of documents having printed or written indicia thereon and further having a magnetic ink code line, the method comprising:
   forming an electronic image of each document;
   electronically reading and decoding said magnetic ink code line to form decoded magnetic ink coded data;
   merging said electronic image and said decoded magnetic ink coded data into a tagged image file format (TIFF) file, with the decoded magnetic ink coded data stored in a tag field in the TIFF file, each document being associated with a TIFF file; and
   storing the TIFF file in an electronic storage device.

2. The method recited in claim 1, further comprising storing said TIFF file in a queue prior to transmitting the TIFF file to the electronic storage device.

3. The method recited in claim 2, further comprising forming a plurality of said TIFF files for respective documents and storing said plurality of TIFF files in said queue, further comprising grouping a plurality of said TIFF files into a binary large object (BLOB) and transmitting said BLOB to said electronic storage device.

4. The method recited in claim 3, further comprising forming a plurality of BLOBs and transmitting each said BLOB to the electronic storage device.

5. The method recited in claim 4, further comprising generating a BLOB record for each BLOB, and storing each BLOB record in a BLOB index.

6. The method recited in claim 5, further comprising storing each BLOB record in a further electronic storage device.

7. The method recited in claim 6, wherein the step of generating a BLOB record comprises generating the decoded magnetic ink coded data for each document, a BLOB pointer to the BLOB containing the image of a particular document and a TIFF pointer providing information regarding the location of the TIFF for a particular document in a BLOB.

8. The method recited in claim 7, wherein the step of generating the decoded magnetic ink coded data for each check comprises decoding the check number, account number and amount of each check.

9. The method recited in claim 8, further comprising inserting a user defined reference field entered by a user at the user interface device into the BLOB record and maintaining the association of the user defined reference field with a respective check.

10. The method recited in claim 1, wherein said step of storing the TIFF file in the electronic storage device comprises bundling a plurality of said TIFF files together in a grouping and storing said grouping as a unit in said electronic storage device, thereby to increase the speed at which the images can be stored in and retrieved from said electronic storage device.

11. The method recited in claim 7, wherein the documents comprise checks and further comprising searching said electronic storage device for the requested electronic image, said step of searching comprising searching said BLOB index by using the account number and check number of the requested check, thereby determining the BLOB containing the image of the check and the TIFF pointer to the check in the BLOB and using said determined BLOB and TIFF pointer to find the check image in the electronic storage device.

12. The method recited in claim 11, further comprising verifying each request for a check to insure that the user placing the request is authorized.

13. The method recited in claim 12, further comprising compiling a list of authorized account numbers associated with a requester, and comparing an account number in the request to the list to determine if the requester is authorized to make requests from the account specified by the account number.

14. The method recited in claim 13, wherein the electronic storage device comprises a plurality of storage platters, and said step of searching said electronic storage device for the requested electronic image further comprises
determining the platter associated with each request and forming a listing of the requests for each platter;
determining if there is a request for an image corresponding to any electronic images on a platter currently being searched of said electronic storage device, and if so, retrieving the image;
once all images on the plate currently being searched have been retrieved or if there is no request corresponding to any electronic image on the platter currently being searched, determining the platter associated with the most image requests and searching the platter associated with the most image requests for the requested images and retrieving the requested images; and
searching each other platter associated with image requests in an order determined by the number of requests per platter such that a platter having the most requests is searched first.

15. The method recited in claim 14, wherein each platter is two sided, and further comprising determining if there is a request associated with a second side of the platter, and if so, searching the second side of the platter for a request prior to searching another platter.

16. The method recited in claim 1, wherein said step of forming an electronic image comprises forming an electronic image of two sides of a two sided document.

17. The method recited in claim 1, wherein the step of storing each electronic image in an electronic storage device comprises storing the electronic image in a mass storage device.

18. The method recited in claim 17, wherein the step of storing in a mass storage device comprises storing each electronic image in an electronic optical storage device.

19. The method recited in claim 1, wherein the document comprises a two-sided check, and further comprising generating a TIFF file for each side of each check.

20. Apparatus for storing electronic images of documents having printed or written indicia thereon and further having a magnetic ink code line, comprising:
a document imaging machine for forming an electronic image of each document;
a magnetic ink reader for decoding said magnetic ink code line to form decoded magnetic ink coded data;
a memory comprising a tagged image file format (TIFF) file having said electronic image merged with the decoded magnetic ink coded data, with the decoded magnetic ink coded data stored in a tag field in the TIFF file, each document being associated with a TIFF file, the TIFF file being stored in the memory.

21. The apparatus recited in claim 20, further comprising a queue for storing said TIFF file prior to transmitting the TIFF file to the electronic storage device.

22. The apparatus recited in claim 21, further comprising a plurality of said TIFF files for respective documents, each of said plurality of TIFF files stored in said queue, and further wherein a plurality of said TIFF files are grouped into a binary large object (BLOB) for storage on said electronic storage device.

23. The apparatus recited in claim 22, further comprising a plurality of BLOBs stored on the electronic storage device.

24. The apparatus recited in claim 23, further comprising a BLOB record for each BLOB, and a BLOB index for storing each BLOB record.

25. The apparatus recited in claim 24, wherein the BLOB index for storing each BLOB record comprises a further electronic storage device.

26. The apparatus recited in claim 25, wherein the BLOB record comprises said decoded magnetic ink coded data for each document, a BLOB pointer to the BLOB containing the image of a particular document and a TIFF pointer providing information regarding the location of the TIFF for the particular document in the BLOB.

27. The apparatus recited in claim 26, wherein the decoded magnetic ink coded data for each check comprises the check number, account number and amount of each check.

28. The apparatus recited in claim 27, further wherein the user interface device is adapted to insert a user defined reference field into the BLOB record, the user defined reference field being associated with a respective check.

29. The apparatus recited in claim 20, wherein the electronic storage device comprises a plurality of sectors, a plurality of said images being bundled together in a grouping and stored as a unit in each sector of said electronic storage device, thereby to increase the speed at which images can be stored in and retrieved from said electronic storage device.

30. The apparatus recited in claim 26, wherein the documents comprise checks, and further comprising a computer for searching said electronic storage device for the requested electronic image comprising means for searching said BLOB index by using the account number and check number of the requested check, thereby determining the BLOB containing the image of the check and the TIFF pointer to the image of the check in the BLOB, said computer using said determined BLOB and TIFF pointer to find the check image in the electronic storage device.

31. The apparatus recited in claim 30, further comprising means for verifying each request for a check to insure that the user placing the request is authorized.

32. The apparatus recited in claim 31, further comprising a memory containing a list of authorized accounts associated with a requester, and means for comparing the account number in the request to the list to determine if the requester is authorized to make requests from the account specified by the account number.

33. The apparatus recited in claim 32, wherein the electronic storage device comprises a plurality of storage platters and said computer for searching said electronic storage device for the requested electronic image further comprises means for determining the platter associated with each request and forming a listing of the requests for each platter;

means for determining if there is a request for an image corresponding to any electronic images on a platter currently being searched of said electronic storage device, and if so, for retrieving the image;

once all images on the platter currently being searched have been retrieved or if there is no request corresponding to any electronic image on the platter currently being searched, means for determining the platter associated with the most image requests and searching the platter associated with the most requests for the requested images and for retrieving the requested images; and means for searching each other platter associated with image requests in an order determined by the number of requests per platter such that a platter having the most requests is searched first.

34. The apparatus recited in claim 33 wherein each platter is two sided, and further comprising means for determining if there is a request associated with a second side of the platter, and if so, for searching the second side of the platter for a request prior to searching another platter.

35. The apparatus recited in claim 20, wherein said electronic image comprises an electronic image of two sides of a two sided document.

36. The apparatus recited in claim 35, wherein the electronic storage device comprises a mass storage device.

37. The apparatus recited in claim 36, wherein the mass storage device comprises an electronic optical storage device.

38. The apparatus recited in claim 20, wherein the document comprises a two-sided check, and further comprising a TIFF file for each side of each check.

39. The method recited in claim 1, further comprising providing a further storage device for temporary storage of images prior to storage in said electronic storage device.

40. The method recited in claim 39, further comprising the step of coupling said electronic storage device to said further storage device over a local area network (LAN) and using said further storage device for temporary storage of images in the event said LAN is defective, thereby allowing image processing to continue.

41. The apparatus recited in claim 20, further comprising a further storage device for temporary storage of images prior to storage in said electronic storage device.

42. The apparatus recited in claim 41, further comprising a local area network (LAN) coupling said electronic storage device to the further storage device being provided for temporary storage of images in the event said LAN is defective, thereby allowing image processing to continue.

* * * * *

UNITED STATES PATENT AND TRADEMARK OFFICE
CERTIFICATE OF CORRECTION

PATENT NO. : 5,917,965
APPLICATION NO. : 08/435748
DATED : June 29, 1999
INVENTOR(S) : Thomas Cahill et al.

Page 1 of 1

It is certified that error appears in the above-identified patent and that said Letters Patent is hereby corrected as shown below:

Title page, item [75] inventor: John J. McMonagle of Bayonne, NJ is hereby deleted from the field.

Signed and Sealed this

Twenty-sixth Day of May, 2009

JOHN DOLL
*Acting Director of the United States Patent and Trademark Office*